US009430470B2

(12) United States Patent
Lord

(10) Patent No.: US 9,430,470 B2
(45) Date of Patent: Aug. 30, 2016

(54) AUTOMATED REPORT SERVICE TRACKING SYSTEM AND METHOD

(71) Applicant: Content Catalyst Limited, Castleford (GB)

(72) Inventor: Daniel J. Lord, Huddersfield (GB)

(73) Assignee: Content Catalyst Limited, Leeds (GB)

( * ) Notice: Subject to any disclaimer, the term of this patent is extended or adjusted under 35 U.S.C. 154(b) by 231 days.

(21) Appl. No.: 14/488,668

(22) Filed: Sep. 17, 2014

(65) Prior Publication Data

US 2015/0006552 A1 Jan. 1, 2015

Related U.S. Application Data

(63) Continuation-in-part of application No. 13/035,356, filed on Feb. 25, 2011, now Pat. No. 8,843,814, which is a continuation-in-part of application No. 12/787,519, filed on May 26, 2010, now Pat. No. 8,769,392.

(60) Provisional application No. 61/887,784, filed on Oct. 7, 2013.

(51) Int. Cl.
*G06F 17/24* (2006.01)
*G06F 17/30* (2006.01)
*G06F 17/26* (2006.01)

(52) U.S. Cl.
CPC ... *G06F 17/30011* (2013.01); *G06F 17/30289* (2013.01); *G06F 17/30477* (2013.01); *G06F 17/30716* (2013.01); *G06F 17/30864* (2013.01)

(58) Field of Classification Search
CPC ................................. G06F 17/30477
USPC ....................................... 715/200
See application file for complete search history.

(56) References Cited

U.S. PATENT DOCUMENTS 5,715,441 A * 2/1998 Atkinson ............... G06F 3/0605
707/700
5,832,494 A 11/1998 Egger et al.
(Continued)

FOREIGN PATENT DOCUMENTS

WO WO01/97085 A1 12/2001

OTHER PUBLICATIONS

Taylor, Allen G.; Crystal Reports 2008 for Dummies; 2008; Wiley Publishing, Inc.; Chaper 12 Combining Report Elements with OLE.; 14 pages.
(Continued)

*Primary Examiner* — James J Debrow
(74) *Attorney, Agent, or Firm* — Davis, Malm & D'Agostine, P.C.

(57) ABSTRACT

A computer implemented system and method in a client-server environment, is provided for document research, aggregation, and compilation. The system and method includes a server having a search module configured to generate a search interface displayable to a client communicably coupled to the server, and responsive to instructions received via the search interface, to search and sort selections of interest within a plurality of source documents. A customized report module is configured to generate a custom report interface displayable to the client, and responsive to user selection instructions received via the custom report interface, to extract and aggregate the selections of interest into a customized report. Format modules are configured to respectively enable source documents in mutually distinct formats such as the PDF, PPT, and XLS formats, to be searched, sorted, and aggregated by the search module and customized report module. A service tracking module is configured to automatically track client requests and service provider activity to facilitate billing for services rendered.

58 Claims, 48 Drawing Sheets

(56) References Cited

U.S. PATENT DOCUMENTS

| | | | |
|---|---|---|---|
| 5,893,125 A * | 4/1999 | Shostak | G06F 17/30595 715/205 |
| 6,014,680 A | 1/2000 | Sato et al. | |
| 6,023,715 A | 2/2000 | Burkes et al. | |
| 6,138,129 A | 10/2000 | Combs | |
| 6,324,545 B1 | 11/2001 | Morag | |
| 6,424,980 B1 | 7/2002 | Lizuka et al. | |
| 6,516,308 B1 | 2/2003 | Cohen | |
| 6,732,102 B1 | 5/2004 | Khandekar | |
| 6,826,557 B1 | 11/2004 | Carter et al. | |
| 7,069,501 B2 | 6/2006 | Kunitake et al. | |
| 7,069,504 B2 | 6/2006 | Mani et al. | |
| 7,200,605 B2 | 4/2007 | Baker | |
| 7,865,510 B2 | 1/2011 | Hillary et al. | |
| 8,769,392 B2 | 7/2014 | Lord | |
| 2002/0065824 A1 | 5/2002 | Rosenfelt | |
| 2002/0116366 A1 | 8/2002 | Magouirk et al. | |
| 2002/0129058 A1 | 9/2002 | Story et al. | |
| 2007/0043689 A1 | 2/2007 | So | |
| 2008/0162498 A1 | 7/2008 | Omoigui | |
| 2009/0077658 A1 | 3/2009 | King et al. | |
| 2009/0119283 A1 * | 5/2009 | Muehlbauer | G06F 17/30864 |
| 2009/0150169 A1 | 6/2009 | Kirkwood et al. | |
| 2009/0234818 A1 | 9/2009 | Lobo et al. | |

OTHER PUBLICATIONS

"Report", Microsoft Computer Dictionary, May 1, 2002; Microsoft Press; Fifth Edition; Table of Contents; R-p. 565; http://academic.safaribookonline.com.

Publish Interactive, "End-user Features & Benefits", brochure, published on or about Oct. 2012, 6 pgs, Content Catalyst Limited, Castleford, UK.

Publish Interactive, "The Ultimate ePublishing Platform", brochure, published 2008, 16 pgs, Content Catalyst Limited, Castleford, UK.

Publish Interactive, "Release notes: v.4.4-v4.6", brochure, published on or about Jul. 2013, 6 pgs, Content Catalyst Limited, Castleford, UK.

iReports—4th Generation; Mar. 19, 2012; Publishinteractive.com; 1-2.

Client letter; Live Systems; Jan. 27, 2007; Publishinteractive.com; pp. 1-2.

* cited by examiner

| USER TABLE | | | | |
|---|---|---|---|---|
| USER ID | NAME | ADDRESS | PHONE # | SUBSCRIPTION STATUS |
|  |  |  |  |  |
| 61 | 63 | 65 | 67 | 69 |

| ReportID | VersionID | ID | Type | XML content | ReferencedID |
|---|---|---|---|---|---|
| 1 | 2 | 1001 | Heading 1 | xyz.... | NULL |
| 1 | 2 | 1002 | Text | NULL | 753 |
| 1 | 2 | 1003 | Figure | NULL | 754 |
| 1 | 2 | 1004 | Text | xyz.. | NULL |
| 2 | 5 | 1005 | PDF page | xyz.. | NULL |
| etc.. | etc.. | etc.. | | | |

| 60 | 97 | 98 | 99 |
| --- | --- | --- | --- |
| ReportID | VersionNumber | Date | UploadedByUserID |
| 1 | 1 | 1-Oct-09 | 324 |
| 1 | 2 | 1-Mar-10 | 646 |

| ID | Reply ToID | To | From | Message | DateTime | Read |
|---|---|---|---|---|---|---|
| 1 | NULL | daniel@client.com | frank@another.com | We could use this data in the new report | 10/10/2010 10:00 | 1 |
| 2 | 1 | frank@another.com | daniel@client.com | Looks good but it's two years old | 10/11/2 10 00:00 | 1 |
| 3 | 2 | daniel@client.com | frank@another.com | It's the most up to date data we have | 10/12/2010 10:00 | 1 |
| 4 | 3 | frank@another.com | daniel@client.com | Can we forecast to next year? | 10/13/2010 10:00 | 1 |
| 5 | 4 | daniel@client.com | frank@another.com | Yes, that should work | 10/14/2010 10:00 | 0 |
| etc.. | etc.. | etc.. | etc.. | etc.. | etc.. | etc.. |

| UserID | AdminUserID | JobType | Message ID | Comment ID | Date | Cost | Credits |
|---|---|---|---|---|---|---|---|
| daniel@client.com | frank@publisher.com | Custom report | | 1 | 10/10/2010 | 250 | |
| daniel@client.com | frank@publisher.com | Correspondence | 2 | | 10/11/2010 | | 1 |
| daniel@client.com | frank@publisher.com | Correspondence | 3 | | 10/12/2010 | | 1 |
| daniel@client.com | frank@publisher.com | Content license | 4 | | 10/13/2010 | 500 | |
| daniel@client.com | frank@publisher.com | Correspondence | 5 | | 10/14/2010 | | 1 |
| etc.. | etc.. | etc.. | etc.. | etc.. | etc.. | etc.. | etc.. |

| AdminUserID | Fee rate | Credit rate | Skills list | Category |
|---|---|---|---|---|
| frank@publisher.com | 150 | 2 | Sales forecasting | Forecasts |
| toby@publisher.com | 250 | 3 | Healthcare industry specialist | Healthcare |
| sandra@publisher.com | 200 | 3 | Account manager | Sales |
| evan@publisher.com | 75 | 1 | Economics | Macro |
| lana@publisher.com | 225 | 3 | Russia expert | International |
| etc.. | etc.. | etc.. | etc.. | etc.. |

AUTOMATED REPORT SERVICE TRACKING SYSTEM AND METHOD

RELATED APPLICATION

This application claims the benefit of U.S. Provisional Patent Application Ser. No. 61/887,784, entitled Report Generation System Enhancements, filed on Oct. 7, 2013. This application also claims priority, and is a Continuation-In-Part of co-pending U.S. patent application Ser. No. 13/035,356, entitled Automated Report Service Tracking System and Method, filed on Feb. 25, 2011, which claims priority, and is a Continuation-In-Part of co-pending U.S. patent application Ser. No. 12/787,519, now U.S. Pat. No. 8,769,392, entitled Searching and Selecting Content from Multiple Source Documents Having a Plurality of Native Formats, Indexing and Aggregating the Selected Content into Customized Reports, filed on May 26, 2010, the contents all of which are incorporated herein by reference in their entireties for all purposes.

BACKGROUND

1. Technical Field

This invention relates to web-enabled transactions, and more particularly to an automated system for document research, aggregation, and report generation.

2. Background Information

Existing publishing systems provide mechanisms for searching and navigating through a library of documents. Such systems, however, are limited in their ability enable users to repurpose content from source documents into their own project reports. For example, business consulting firms typically spend considerable staff time assembling relevant findings from various sources into a report that is specifically tailored to a particular client's project. This task often requires considerable human operator time to: identify and assemble relevant content from a range of source material types; convert each to a common file format; maintain a record of the source documents, including author, publisher, publication dates, terms of use, etc.; provide output of aggregated content in desired output file formats; facilitate peer review and provide reference to the original sources; and retain selection criteria and other records in order to regenerate the report at a later date based on updated source documents.

Moreover, conventional approaches used to automate portions of this process have faltered in their attempts to convert the source material from their various native formats into a common format to facilitate manipulation. These approaches have either been unable to convert some formats (e.g., from image formats into text), or have done so in a manner that has been prone to errors including loss of original content and/or loss of original formatting including pagination, line numbering, and visual integrity errors, etc. Moreover, because such errors are generated early in the process, on the source material, they tend to be propagated to all users of that material, and may also be compounded during subsequent reformatting into the desired output format.

Moreover, while publishers routinely provide general advice to their customers via a finite range of publications, they may also wish to provide advice that is specific to the needs of a particular customer via a consulting project. However, this tends to create administrative overhead that makes such projects prohibitive for smaller ad-hoc queries. The lack of a mechanism to meet this customer need means that publishers have a valuable pool of expertise and knowledge, but limited options in how to employ it to the benefit of their readers.

Thus, a need exists for a system and method that addresses the foregoing limitations.

SUMMARY

One aspect of the invention includes a computer implemented system in a client-server environment, for document research, aggregation, and compilation. The system includes a server having a search module configured to generate a search interface displayable to a client communicably coupled to the server, and responsive to instructions received via the search interface, to search and sort selections of interest within a plurality of source documents. A customized report module is configured to generate a custom report interface displayable to the client, and responsive to user selection instructions received via the custom report interface, to extract and aggregate the selections of interest into a customized report. A plurality of format modules are configured to respectively enable source documents in a plurality of mutually distinct formats to be searched, sorted, and aggregated by the search module and customized report module. A service tracking module is configured to automatically track client requests and service provider activity to facilitate billing for services rendered.

Another aspect of the invention includes a method for automated document research, aggregation, and compilation, in a client-server environment. The method includes generating, with a server computer, a search interface displayable to a client communicably coupled to the server. The method further includes searching and sorting, with the server computer in response to instructions received via the search interface, selections of interest within a plurality of source documents. A custom report interface displayable to the client is generated with the server computer. The selections of interest are extracted and aggregated into a custom report, in response to user selection instructions received via the custom report interface. In response to user selection instructions, the server computer enables documents in a plurality of mutually distinct formats, such as the PDF, PPT, and XLS formats, to be searched, sorted, extracted and aggregated into the customized report. A service tracking module is configured to automatically track client requests and service provider activity to facilitate billing for services rendered.

Yet another aspect of the invention includes an article of manufacture for automated document research, aggregation, and compilation, in a client-server environment. The article of manufacture includes a computer usable medium having a computer readable program code embodied therein for generating a search interface displayable to a client communicably coupled to the server. Computer readable program code is also provided for searching and sorting, in response to instructions received via the search interface, selections of interest within a plurality of source documents. The program code is also configured for generating a custom report interface displayable to the client, and extracting and aggregating, in response to user selection instructions received via the custom report interface, the selections of interest into a customized report. Program code is also provided for enabling, with the server computer in response to user selection instructions, documents in a plurality of mutually distinct formats, such as the PDF, PPT, and XLS formats, to be searched, sorted, extracted and aggregated into the customized report. A service tracking module is configured to automatically track client requests and service provider activity to facilitate billing for services rendered.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which:

FIG. 3 is a diagrammatic representation of one embodiment of a user table within the database;

FIGS. 4A-4G are diagrammatic representations of an embodiment of various data tables within the database;

FIGS. 8-15 are exemplary representations of various interfaces provided by the objects of FIG. 6;

FIGS. 17-19 are diagrammatic representations of an embodiment of various additional data tables within the database;

FIGS. 20-22 are exemplary representations of other interfaces provided by the objects of FIG. 6.

DETAILED DESCRIPTION

Figure 1:
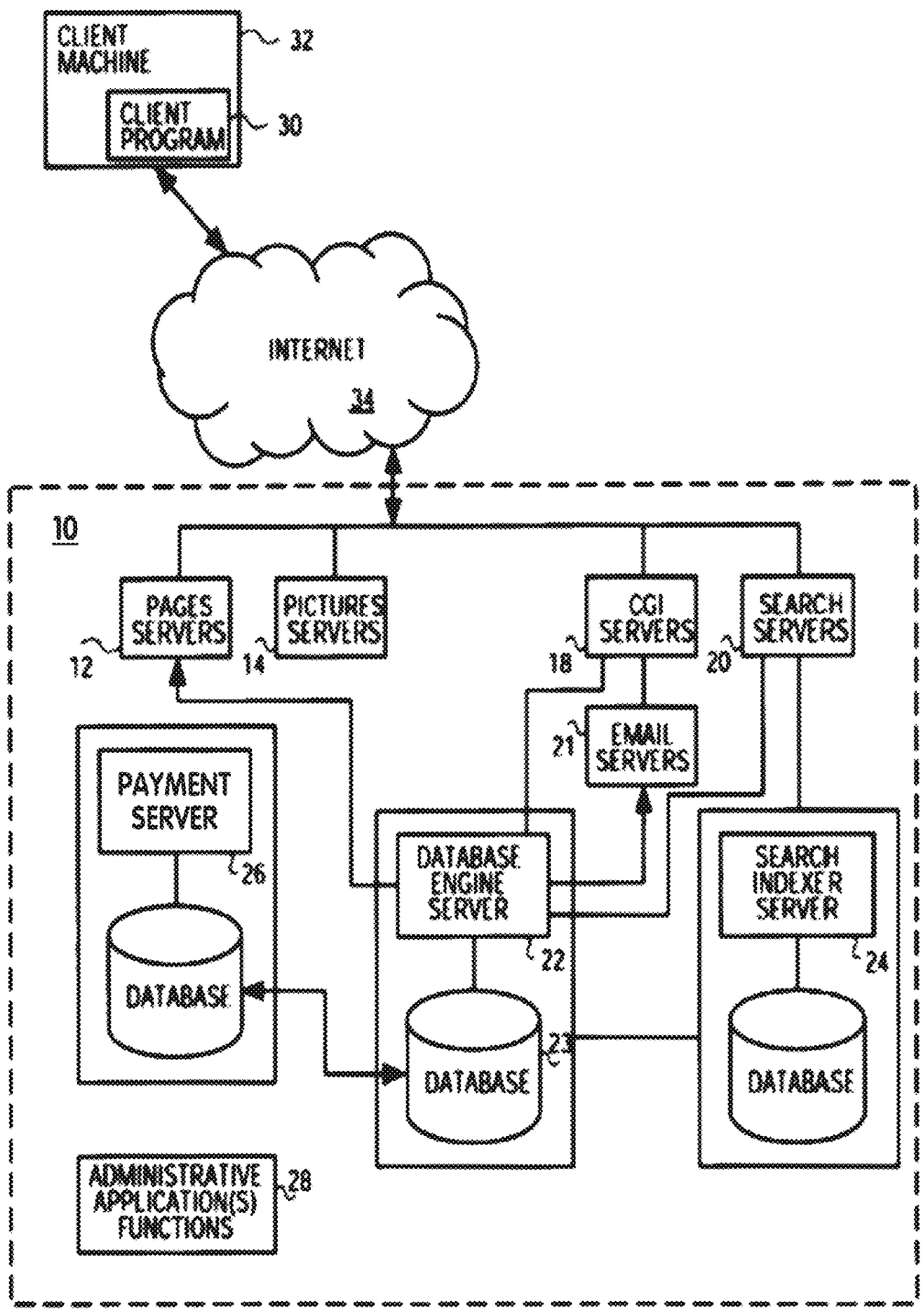
FIG. 1 is a block diagram of one embodiment of a network-based transaction facility of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

General Overview

A method and apparatus for providing automated document research and report generation in a network-based transaction facility are described. In the following description, for purposes of explanation, numerous specific details are set forth in order to provide a thorough understanding of the present invention. It will be evident, however, to one skilled in the art that the present invention may be practiced without these specific details.

Embodiments of the present invention effectively automate the report generation process by: enabling users to automatically search and select sections of relevant reports based on the user's search criteria; enabling selected sections of distinct file formats (including .doc, .ppt, .xls and .pdf files, images, etc.), to be stored and indexed in their native formats; assembling the sections into a single, customized publication (report) that tracks the source of the sections for proper attribution, terms of use, etc.; and enables the customized publication to be viewed online by colleagues for comment, etc.

In particular, while some of these aspects may be at least partially provided by conventional systems, the present invention has overcome a significant problem in the prior art, namely that of enabling file portions of various mutually distinct formats to be conveniently aggregated, while maintaining accurate records of the source(s) of those file portions (sections), including their location(s) within the source documents. Embodiments of the invention provide this capability by operating contrary to the accepted practice of converting source material of various native formats into a common format prior to use. Instead of attempting such conversions, these embodiments generate and store a definition of a user's custom report in the form of a sequence of references to the source material portions in their native formats (e.g., .doc, .ppt, .xls, .pdf, etc.). Each selected source document portion is thus parsed/tracked using units/parameters that are appropriate to those formats, such as slide numbers (for POWERPOINT), cell coordinates (for .xls), paragraph numbers (for .doc), or rectangles having particular position coordinates on a page (for images, .pdf, etc.).

The system then uses the selected source document portions in their native formats (effectively inserting them 'as-is' into the custom report/publication), while tracking the particular units/parameters in a data table linked to the custom report. This approach thus conveniently and accurately permits source documents of substantially any native format to be conveniently incorporated into the custom report without generating format conversion errors. Moreover, in the event the user wishes to save the custom report into a particular output format, such as WORD™ (Microsoft Corp., Redmond, Wash.), PDF, or other format such as an electronic book (eBook) format (e.g., the ePub format developed by the International Digital Publishing Forum, IDPF), to facilitate webpage display, such a conversion occurs only after the custom report has been generated, so that each source document portion is re-formatted at most only once. This approach thus tends to minimize reformatting errors by effectively preventing errors from being compounded by multiple format conversions such as may otherwise occur in the event a source document were converted to a common file format prior to report generation, and then re-formatted into a user-selected output format.

In a non-limiting, simplified example, an embodiment of the present invention may be used to build a report by selecting a portion of a page from a WORD (DOC) text file (which is identified as ID:3456), and a portion of a page of a PDF file (which is identified by page number and coordinates of the clipped section as PDF:p45{20,20:400,800}). The user may also select a table from an EXCEL® (Microsoft) file (in the XLS format, identified by worksheet and cell coordinates as XL:Sheet1{1,1:20,5}). This custom report may thus be stored as a sequence of these identifiers/references to the source material in its native format.

The user may then view the custom report online, and/or save it to a project (output) file, such as a WORD doc. In this latter instance, any source data not natively in the target (e.g., .doc) format, would be reformatted into .doc. Thus, in this example, the first selected portion would then be simply inserted as WORD text, image or table; the PDF section may be converted to an image and inserted as an image; and the EXCEL® excerpt would be inserted as a table in the final WORD doc. Each of these sections may include a reference link in the final WORD doc to permit the user to link to the original source content in its native format.

In addition, the foregoing architecture permits particular embodiments of the invention to conveniently provide for enhanced version control. Publishers often need to provide continuous updates to their reports, and would like their users to sign up for subscriptions to receive these updates, rather than simply make one-off purchases of reports. There are also many other applications, such as legal guidelines, etc., which would benefit from being able to compare different dates/versions of the same report, to see what's new, or to see which rules were in effect when a particular issue arose. The embodiments described herein enable reports to evolve with a virtually unlimited number of revisions. For example, when a new revision is uploaded, these embodiments do not simply save the full report, but rather, add the new sections. The old sections are also retained, with every section stored with a unique ID code, date and version. This allows the system to reconstruct the report as it was at any date, or to compare the versions at particular dates.

In particular embodiments, this version control may be used in connection with a user's subscription expiration, such as to allow users to continue to access the latest version of the custom report at the point their subscription expired. The publisher may then, for example, encourage those users to renew their subscriptions by providing them with a customized summary of the updates they would be able to access if they choose to renew.

TERMINOLOGY

For the purposes of the present specification, the term "transaction" shall be taken to include any communications between two or more entities and shall be construed to include, but not be limited to, commercial transactions including data searching, aggregation, and presentation, including sale and purchase transactions. The terms "computer" and "end-user device" are meant to encompass a workstation, personal computer, personal digital assistant (PDA), wireless telephone, or any other suitable computing device including a processor, a computer readable medium upon which computer readable program code (including instructions and/or data) may be disposed, and a user interface. Terms such as "server", "application", "engine" and the like are intended to refer to a computer-related component, including hardware, software, and/or software in execution. For example, an engine may be, but is not limited to being, a process running on a processor, a processor including an object, an executable, a thread of execution, a program, and a computer. Moreover, the various components may be localized on one computer and/or distributed between two or more computers. The terms "real-time" and "on-demand" refer to sensing and responding to external events nearly simultaneously (e.g., within milliseconds or microseconds) with their occurrence, or without intentional delay, given the processing limitations of the system and the time required to accurately respond to the inputs. Terms such as "component," "module", and the like are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server (or control related devices) can be components. One or more components may reside within a process and/or thread of execution and a component may be localized on one computer and/or distributed between two or more computers or control devices.

Programming Languages

The system and method embodying the present invention can be programmed in any suitable language and technology, such as, but not limited to: C++; Visual Basic; Java; VBScript; Jscript; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400.

Transaction Facility

FIG. 1 is a block diagram illustrating an exemplary network-based transaction facility in the form of an Internet-based report generation facility 10. The report generation facility 10 includes one or more of a number of types of front-end servers, namely page servers 12 that deliver web pages (e.g., markup language reports), picture servers 14 that dynamically deliver images to be displayed within Web pages, CGI (Common Gateway Interface) servers 18 that provide an intelligent interface to the back-end of facility 10, and search servers 20 that handle search requests to the facility 10. Communication (e.g., e-mail) servers 21 provide, inter alia, automated e-mail (or other) communications to users of the facility 10, and/or between users of facility 10 and service providers associated with facility 10, as discussed hereinbelow. The back-end servers may include a database engine server 22, a search index server 24 and a payment (e.g., credit card and/or subscription) database server 26, each of which may maintain and facilitate access to a respective database. Facility 10 may also include an administrative application server 28 configured to provide various administrative functions.

The network-based report generation facility 10 may be accessed by a client program 30, such as a browser (e.g., the INTERNET EXPLORER distributed by Microsoft) that executes on a client machine 32 and accesses the facility 10 via a network such as, for example, the Internet 34. Other examples of networks that a client may utilize to access the report generation facility 10 include a wide area network (WAN), a local area network (LAN), a wireless network (e.g., a cellular network), or the Plain Old Telephone Service (POTS) network.

Database Structure

Figure 2:
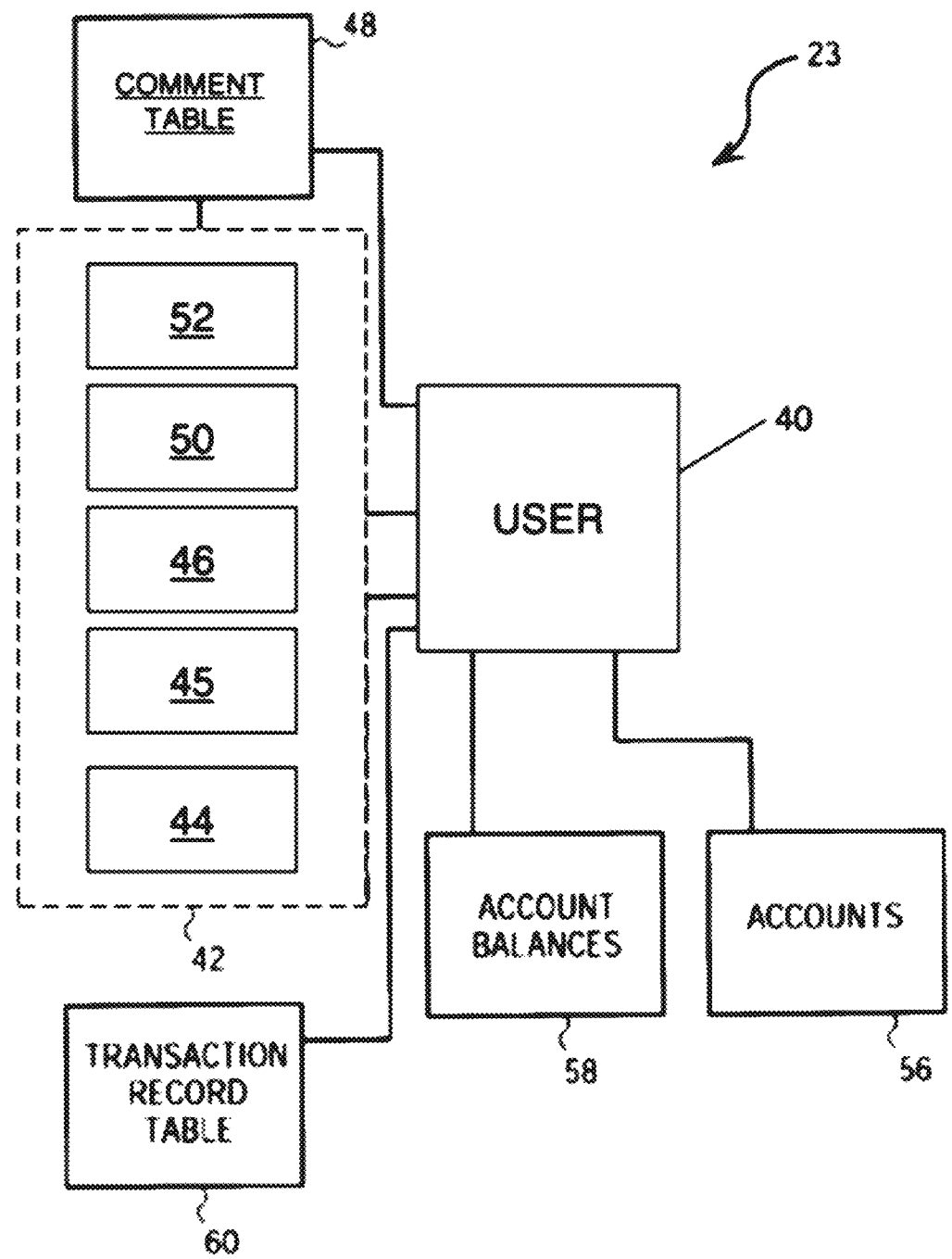
FIG. 2 is a block diagram of one embodiment of a database maintained by a database engine server of the embodiment of the present invention.

FIG. 2 is a database diagram illustrating an exemplary database 23, maintained by and accessed via the database engine server 22, which at least partially implements and supports the report generation facility 10. The database 23 may, in one embodiment, be implemented as a relational database, and includes a number of tables having entries, or records, that are linked by indices and keys. In an alternative embodiment, the database 23 may be implemented as collection of objects in an object-oriented database.

As shown, central to the database 23 is a user table 40, which contains a record for each user of the report generation facility 10. The database 23 also includes tables 42 that may be linked to the user table 40. Specifically, the tables 42 may include source material (e.g., source document) content table 44, archive table 45, translation table 46, custom report tables 50 and 51, and version table 52. A user record in the user table 40 may be linked to multiple reports that are being, or have been, generated via the facility 10 and for which records exist within the report tables 42. The database 23 also includes a comment table 48 populatable with comment records that may be linked to one or more report records within the report tables 42 and/or to one or more user records within the user table 40. Each comment record within the table 48 may include, inter alia, a comment, description, history or other information pertaining to a report being generated via the report generation facility 10. A number of other tables may also be linked to the user table 40, such as an accounts table 56, an account balances table 58 and a transaction record table 60.

FIG. 3 is a diagrammatic representation of an exemplary embodiment of the user table 40 that is populated with records, or entries, for each user of the report generation facility 10. As shown, table 40 includes a user identifier column 61 that stores a unique identifier for each user. A name column 63 may store a first name, a middle initial and a last name for each user. An address column 65 may store full address information and/or other contact information for each user, e.g. a street name and number, city, zip code, state, email address, etc. A phone number column 67 stores a home phone number for each user. A subscription status column 69 may store, for each user, a value identifying the user's subscription status. That is, different values may be assigned to indicate whether a user has a currently valid subscription, has an expired subscription (and which provides limited access to facility 10), and/or is accessing the facility on a pay-as-you-go basis such as via credit card, etc. It will be appreciated that any information other than that described above may populate the user table 40 without loss of generality.

Figure 4A:
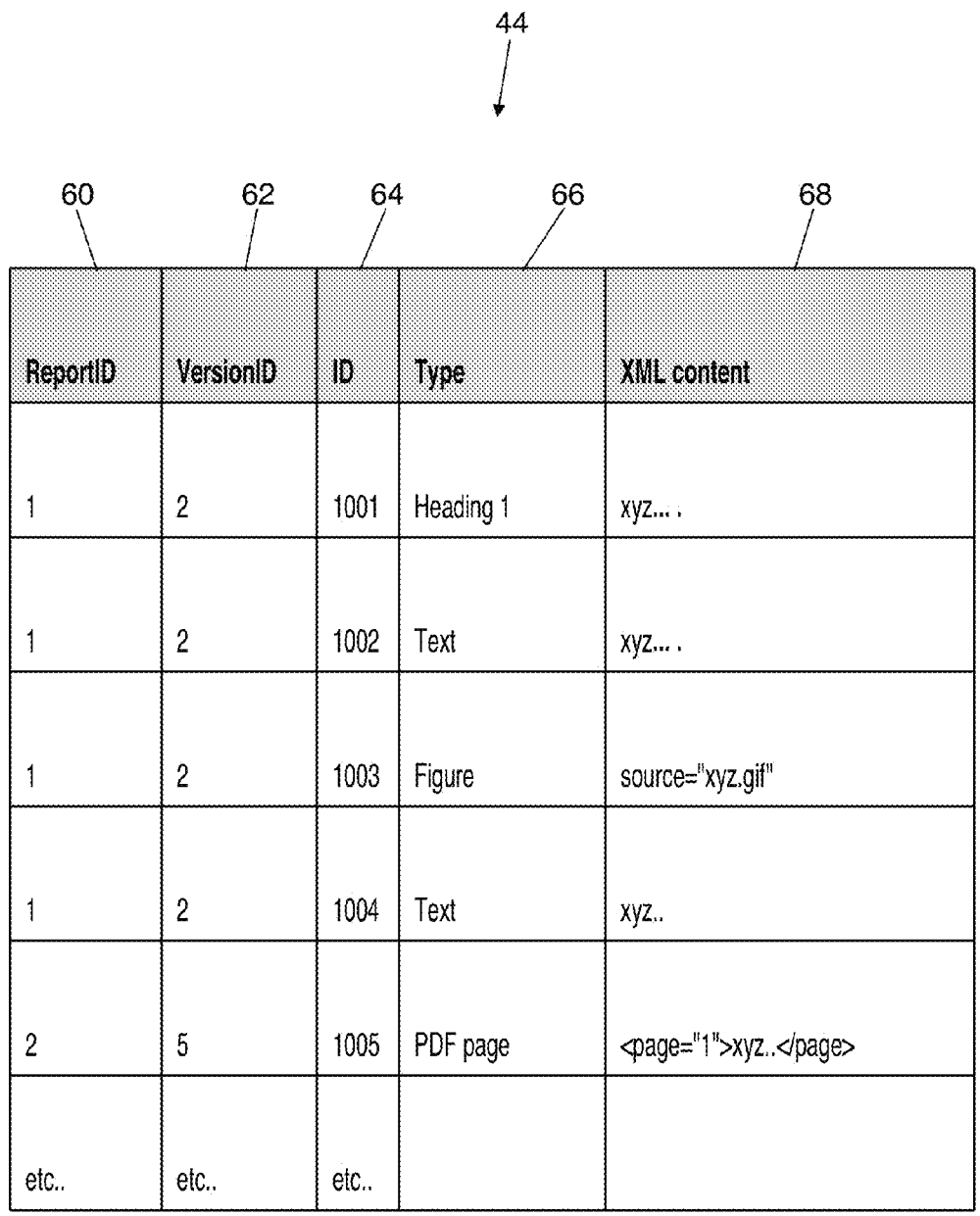

FIGS. 4A-4F are diagrammatic representations of exemplary embodiments of tables 44, 45, 46, 48, 50, 51 and 52 which are populated with document/report records during use of the report generation facility 10. Referring now to FIG. 4A, source material (document) table 44 is configured to store the content of source documents. This table includes a report ID column 60 to identify the particular source document, a Version ID column 62 to track versions, an ID column 64 to provide a unique reference to each section of the document, a Type column 66 which provides the section type, such as text, heading, table, figure etc. for each section. For extended file types, such as PDF, etc., this column may be used to provide the file type. Content column 68 is populated with the actual content (e.g., XML) of the particular section. Any text capable of being extracted from particular file types such as PDF/PPT/XLS, i.e., from the particular page/slide/worksheet, respectively, is maintained in this column 68 for use by the search and translate functions, etc., as will be described in greater detail hereinbelow. This Content column 68 may also include variables to further define the source of the section content, including author, publisher, publication dates, copyright notices and terms of use.

Turning now to FIG. 4B, content archive table 45 enables the system to track multiple versions of the same document. This table 45 is substantially similar to content table 44, except that a ReferencedID column 70 is added, and content column 68 may be populated as NULL, in which case the ReferencedID column 70 maps to a previous entry with a non-null (e.g., XML) content. So in the event the (XML) content is unchanged relative to a previous version, column 70 is populated with the ID (from column 64) of the previous version of the particular section. The content archive table can be used to restore prior versions of a report, by retrieving all the XML content for that ReportID and VersionID. Where the XML content is NULL, this means it's unchanged from previous versions, and the system 10 uses the ReferencedID to identify the original text in an older version.

Figure 4C:
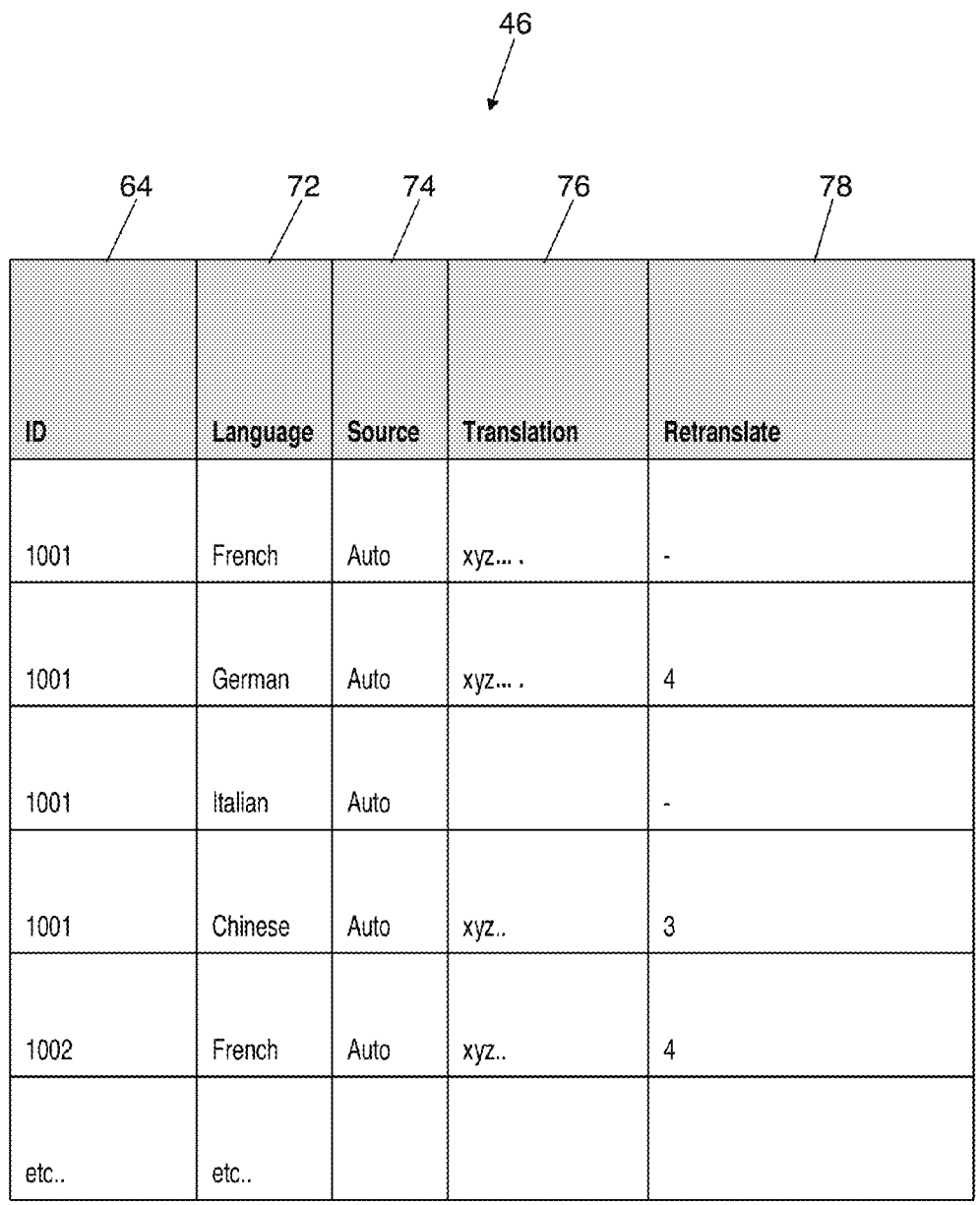

As shown in FIG. 4C, the translation table 46 is used to store the content that has been translated into foreign languages. This table includes an ID column 64, a language column 72 to identify the particular language of the translated section, and a translation source column 74. Column 74 is used to track the translator, such as for quality control and/or to facilitate the upgrade of machine translated text to human-translated text. A translation column 76 is populated with the translated content, and the retranslate column 78 may be populated by a user to flag text that may have been poorly translated, for re-translation by a professional.

Figure 4D:
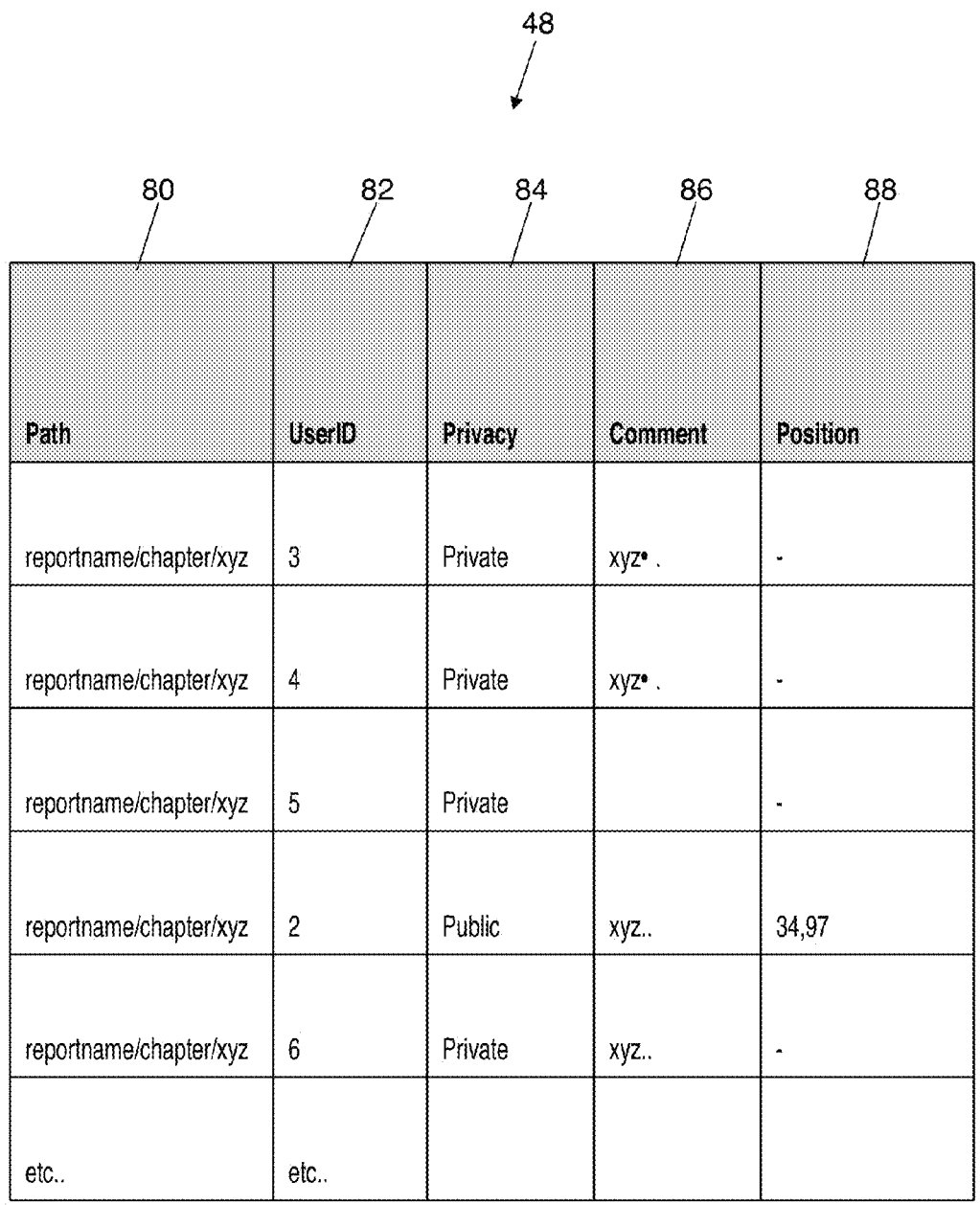

Referring to FIG. 4D, the comments table 48, as mentioned above, may be used to retain users' comments on particular sections of documents. Table 48 includes a path column 80 which, instead of using an ID 64 to link to the content table 44, is populated with a path of heading titles (e.g., filenames) to point to the correct section. Although IDs 64 may be used to point to the comments, use of the heading title paths effectively sticks the comments to sections even in the event IDs change in a revised document. (In this regard, IDs 64 may be created automatically by the database as new rows are inserted in the various tables. If a document is updated then original content may be removed after the new content has been inserted and the differences tracked, as discussed hereinabove. Thus, the IDs 64 for material used in a particular section may change, which illustrates the advantage of using heading title paths to link comments to a particular section.) UserID column 82 is used to identify the user who inserted a particular comment. Privacy column 84 is used to identify the scope of the comment, e.g., for private use, company-wide use, or public use. Comment column 86 is used to store the text of the actual comment. Position column 88 may be used to facilitate use in connection with extended file formats such as PDF, PPT, XLS, etc. This column 88 may thus be used to retain the co-ordinates of where the user inserted the comment on the particular page, slide, worksheet, etc.

As also shown, table 48 may be optionally provided with a Comment ID column 130 and a Message ID column 132. Comment ID column 130 may be populated with unique Comment IDs for each of the comments stored in column 86. These Comment IDs may be used in particular embodiments by the Fee Tracking Table 142 discussed hereinbelow. Message ID column 132 may be populated with Message IDs from Message Table 140, which will also be discussed hereinbelow. Column 132 may thus be populated with the Message IDs of messages from Message Table 140 which are to be linked to the particular sections pointed to by the paths populated in Path column 80.

Figure 4E:
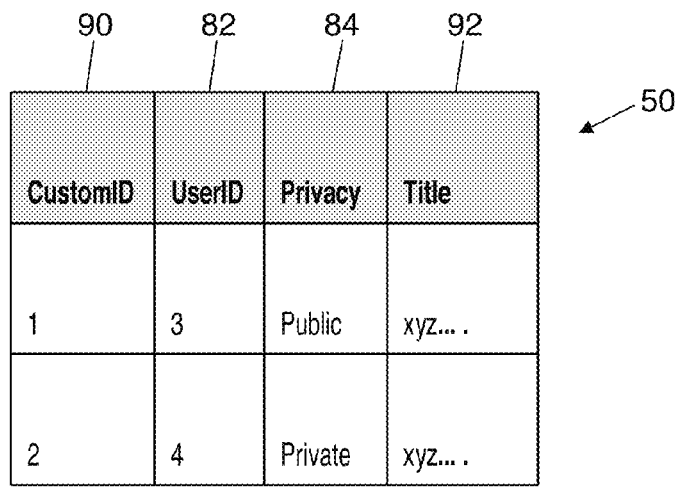
Figure 4F:
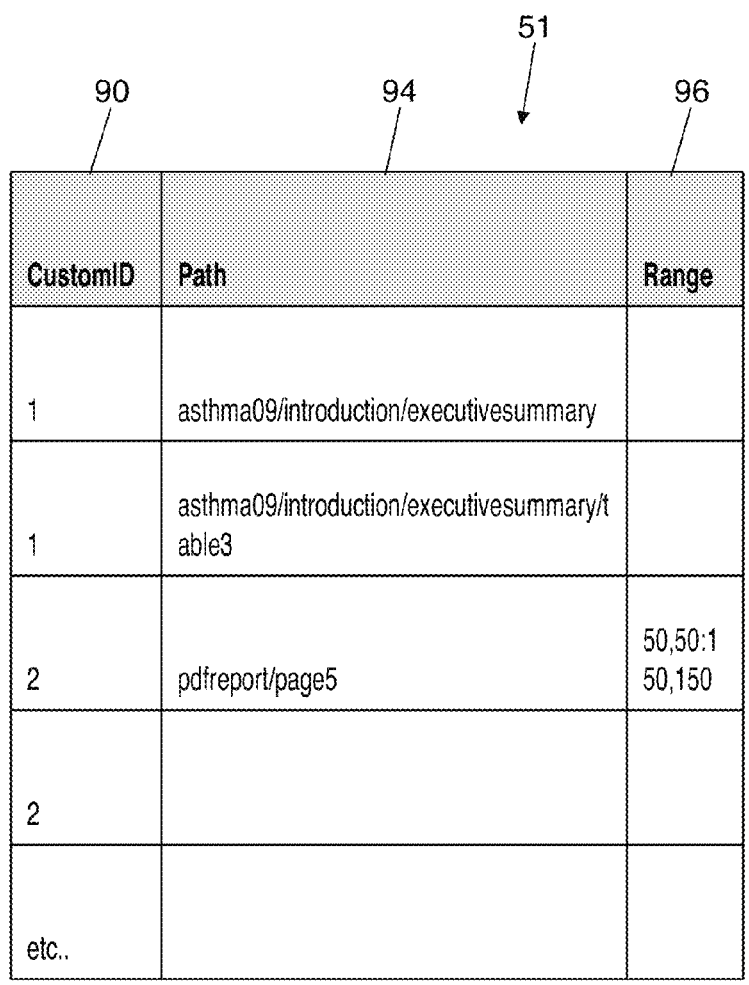

Custom report tables 50 and 51, as shown in FIGS. 4E and 4F, allow users to rearrange document content into their own customized reports. Table 50 includes a CustomID column 90 which is populated with the ID of the particular user-generated custom report. UserID and Privacy columns 82 and 84 are provided as described above. Title column 92 identifies the title of the custom report.

Custom report table 51 is a custom detail table which includes a Path column 94 used to provide a pointer to each particular section (e.g., to the particular location in the table storing the selected content) used in the custom report. Note that in the example shown, Path column 94 stores a pointer in the form of a file path to the particular section of interest. However, any suitable pointer may be used, including for example, the section ID 64 of table 44. A Range column 96 is used to facilitate use of content in extended file formats such as PDF, PPT, XLS, etc., to retain the co-ordinates of the selected content on the particular page, slide, worksheet, etc. As shown, this is usually a range defining the top left and the bottom right coordinates of a rectangle bordering the selection.

As shown in FIG. 4G, version table 52 is used to map version numbers to particular dates in time. Table 52 includes a ReportID column 60, a VersionNumber column 97, a Date column 98, and an UploadedByUserID column 99.

Referring now to FIGS. 17-19, particular embodiments may include a Message table 140, Fee Tracking table 142, and Advisor (Service Provider) table 144. Message table 140 is used to record communications between individuals using the system, such as between users and service providers communicating via communication servers 21 (FIG. 1). As mentioned above, Message table 140 includes a Message ID column 150 used to record unique Message IDs associated with such messages. A ReplyToID column 152 records the Message IDs to which a particular message is replying. To and From columns 154 and 156 record the Usernames of message recipients and senders, respectively. The contents of the message, or salient portions thereof, are recorded in Message column 158. DateTime column 160 records the date and time the message is sent, while the Read column 162 may be populated with a flag indicating whether the message was read, and/or the date/time it was read.

As shown in FIG. 18, Fee Tracking table 142 may be used to enable the operator of the system to track and bill for consulting/analyst (e.g., service provider) time. This table 142 may also be used to track various one time or "pay-as-you-go" (e.g., non-subscription) fees, such as content license fees for access to materials used to generate a particular custom report. For example, a user may engage a service provider to assist with preparation of a custom report on an hourly basis, while also purchasing a one time license to particular content which the service provider may then access for use in the custom report. As shown, table 142 includes a User ID column 166 to record the individual users requesting the various services. An AdminUser ID column 168 records the username of the analyst, salesperson, or other service provider who fulfills the service. Job Type column 170 records the type of service (or access, etc.) rendered. As mentioned above, the Message ID and/or Comment ID columns 172, 174, respectively, may be used to record the particular message or comment in which the particular service was requested or agreed-upon. Date column 176 records the date of the message or comment of columns 172, 174. The Cost and/or Credits columns 178, 180, may be used to record the agreed-upon fee for the particular service/access, in either currency or credits, respectively. It should be recognized that column 178 may be used to record costs in conventional currency (e.g., dollars or pounds, etc.), while alternatively, or in combination, fees may be paid by use of service credits that may have been previously granted or awarded to a particular user. For example, repeat users may be awarded credits as part of an affinity program of the type commonly associated with airlines (frequent flyer miles) and credit card issuers.

As shown in FIG. 19, Advisor (Service Provider) table 144 lists analysts, sales people, or other service providers who are available to assist the user. Table 144 may also be used to record data associated with each service provider, which may be displayed to help the user identify a service provider who is a good match for a particular project. For example, table 144 may include an AdminUser ID column 168 as described above. A Fee rate column 184, and a Credit rate column 186, may be populated with hourly (and/or flat fee) rates associated with each particular service provider listed in column 168. The service providers' skills may be listed in Skills list column 188, while general categories in which the service providers have expertise is shown in Category column 190.

Report Generation Process

As mentioned hereinabove, embodiments of the present invention provide an automated system and method for generating reports from source documents of various types/formats, including text (e.g., DOC), image, PDF, PPT, XLS, and other formats. These embodiments enable such report generation in a real-time, web-based, client-server environment, such as on a subscription or pay-as-you-go basis. While the present invention is discussed within the environment of the exemplary report generation facility 10, it will readily be appreciated that the present invention may be used in any number of environments including network and on-line based transaction facilities in business-to-business, business-to-consumer and consumer-to-consumer applications.

Figure 5:
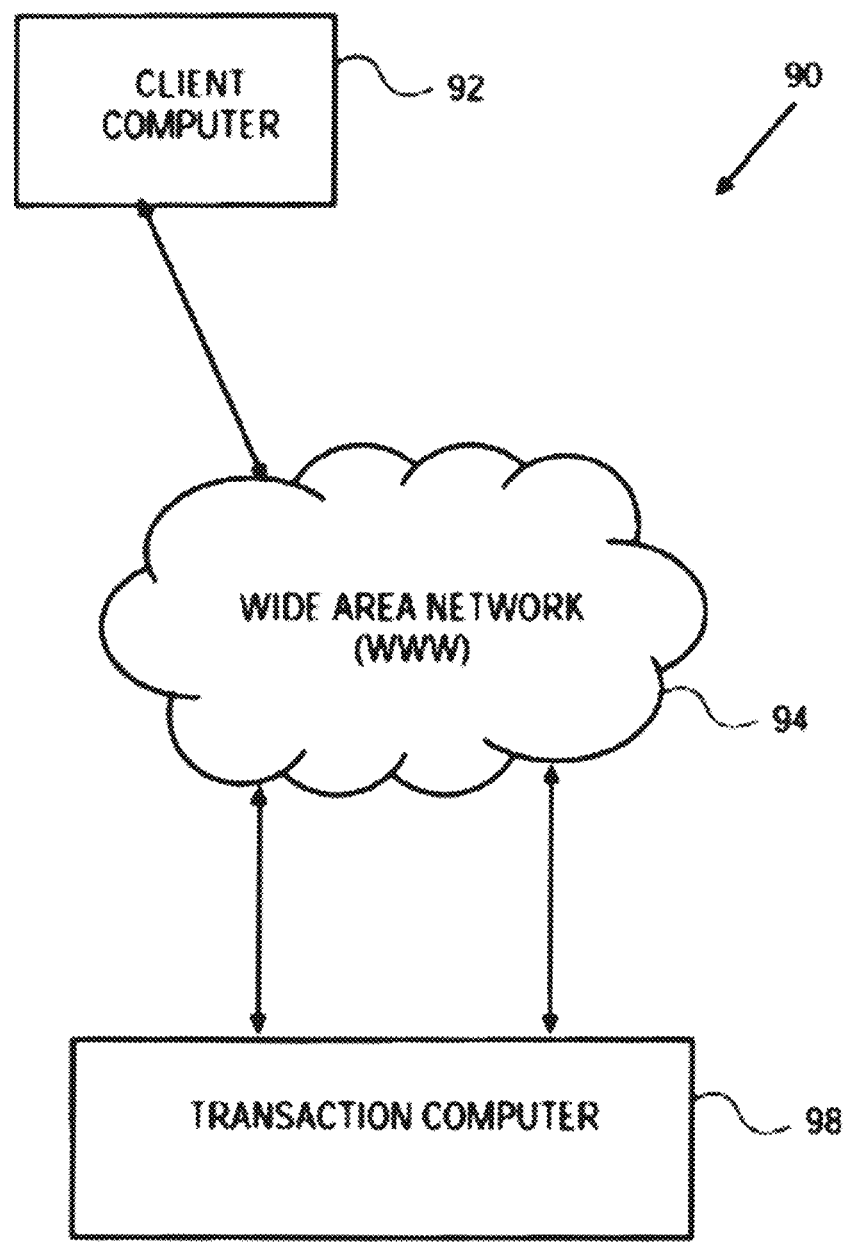
FIG. 5 is a simplified block diagram of one embodiment of a system of the present invention including a transaction facility.

FIG. 5 is a simplified block diagram of a system 90 for generating reports in accordance with an exemplary embodiment of the present invention. In this embodiment, a client computer 92 is coupled to a transaction computer 98 via a communications network (e.g. a wide area network) 94. The client computer 92 represents a device that allows a user to interact with the report generation facility 10 or any other transaction facility 98. In one embodiment, the client computer 92 presents to the user a report generation interface for searching and aggregating content within one or more libraries of source documents associated with the transaction computer 98.

The transaction computer 98, which supports a report generation facility such as shown at 10 of FIG. 1, handles transactions between various participants of the facility 10 including the user of the client computer 92. In one embodiment, the transaction computer 98 may initially receive the personal information of the participant from the client computer 92, and generate a subscription result which determines whether, and to what extent, the user is granted access to the facility 10. The transaction computer then facilitates the generation of custom reports in accordance with various user interfaces presented by the computer 98, via the client computer 92, to the user.

Figure 6:
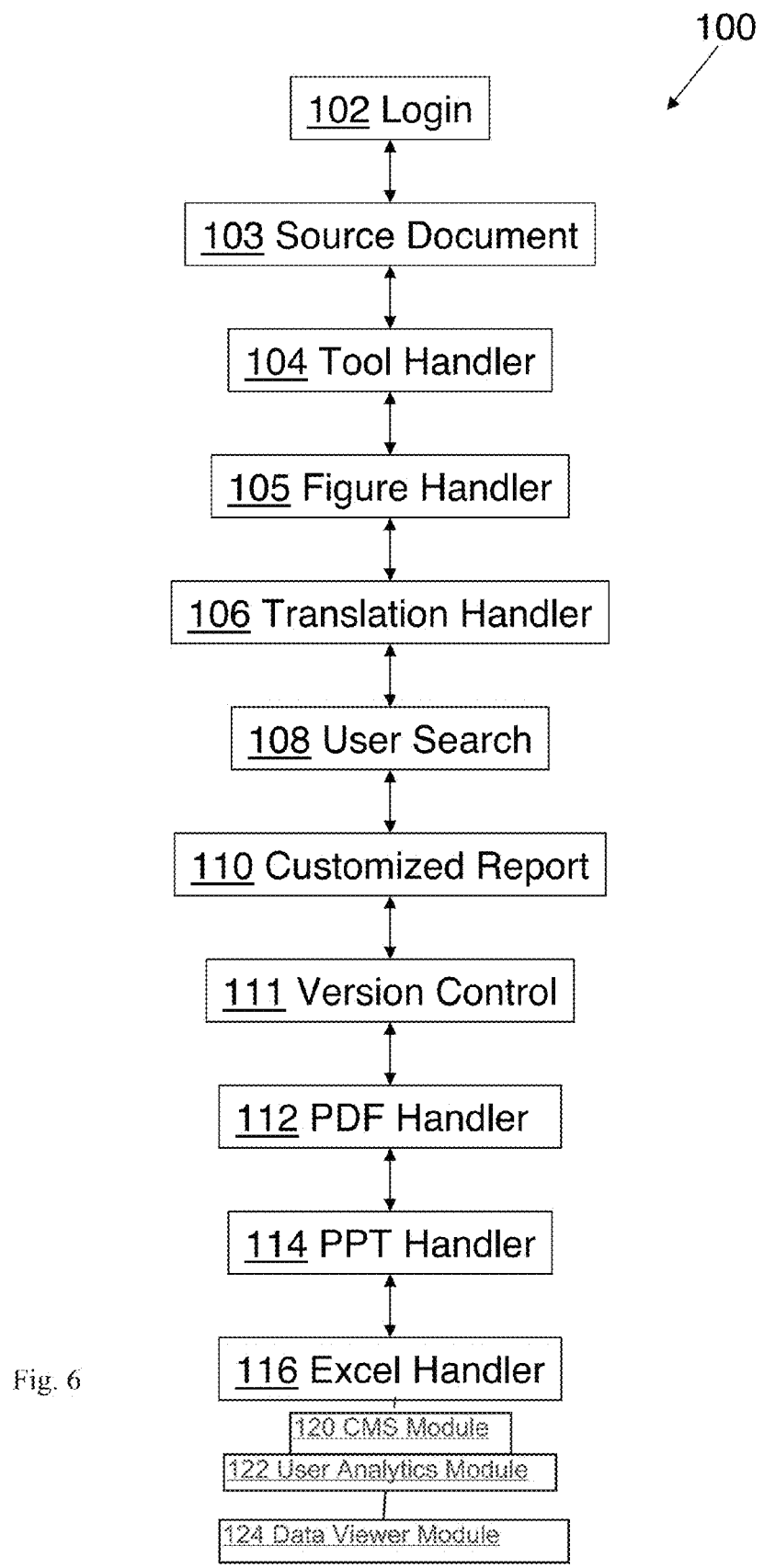
FIG. 6 is a functional block diagram of objects within an embodiment of a transaction facility of the present invention.

FIG. 6 shows a series 100 of interfaces/modules, such as may take the form of a series of objects (or methods), that may be implemented by the report generation facility 10, e.g., in combination with the various tables of database 23, for the purposes of generating one or more custom reports.

The series 100 of interface modules shown in FIG. 6 will be described with reference to exemplary representations of the various interfaces as shown in FIGS. 8-11.

As shown, series 100 includes a login module 102, configured to generate a login interface through which a user of the facility 10 provides at least a user identifier and associated password. The user may also be requested to pay a fee for the subscription process.

Figure 8:
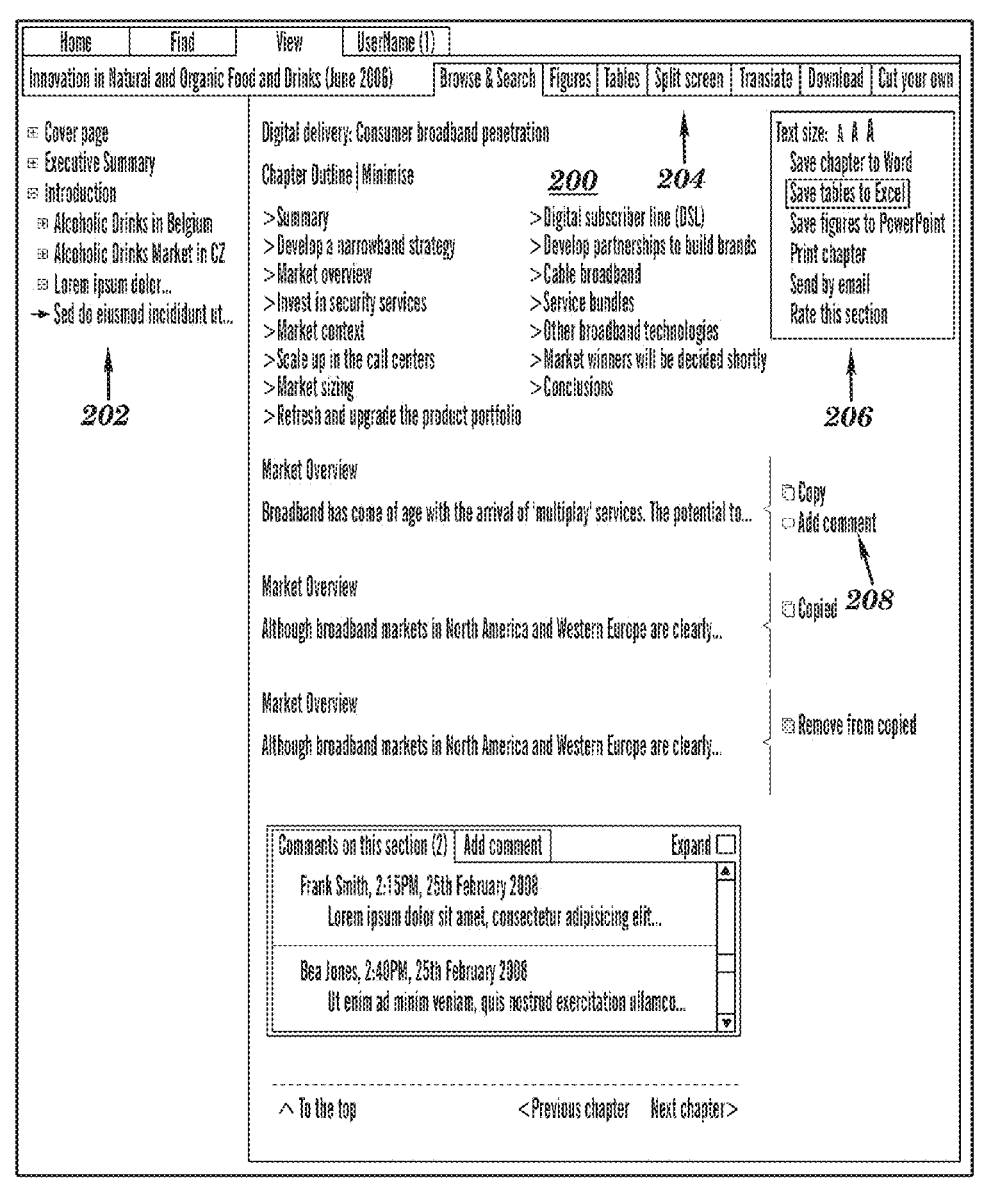

A source document module 103 is configured to generate a source document interface, such as shown at 200 in FIG. 8. Module 103 interacts with the various tables of database 23 (FIG. 1) to enable interface 200 to display various source documents in an interactive format. In particular, a collapsible document tree 202 is provided to enable a user to open sections, or to highlight the location of search matches. Function tabs 204 are provided to search within the document, extract the figures, tables, compare sections with split screen, translate or 'cut your own' personal report. A toolbox 206, generated by a tool handler 104, is provided for operations involving the currently displayed content—e.g. extract to WORD™ POWERPOINT® (Microsoft), EXCEL®, prepare a printer friendly version, or email it to a colleague. Within the displayed document, interface 200 provides function buttons 208, also via tool handler 104, to copy individual sections (e.g., to the user's personal library) or to add comments that can be shared with other users. In particular embodiments, source document module 103 and interface 200 are configured to handle source documents in text file formats, such as DOC or ASCII, etc., while source documents in other formats, such as images (figures), XLS, PPT, PDF, etc., may be handled in conjunction with other optional modules, such as handlers 105, 112, 114 and 116, as discussed hereinbelow.

Figure 9:
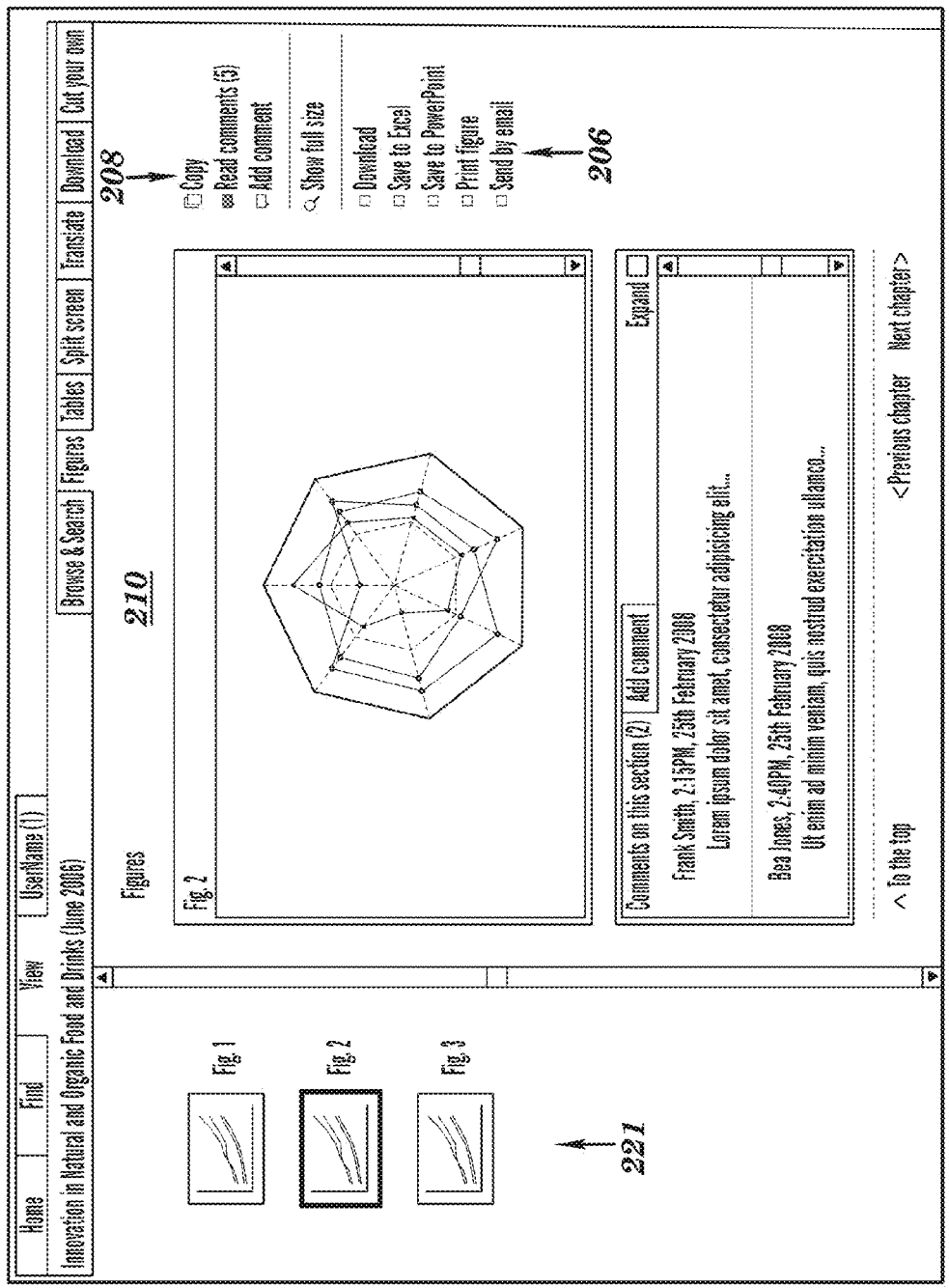

Returning to FIG. 6, figure handler 105 is configured to generate a figure interface such as shown at 210 of FIG. 9. This exemplary figure interface 210 illustrates how the storage format of the various tables facilitates flexible reproduction of the original document. In the example shown, the user is only interested in figures, so the system, via interface 210 has identified all the figures within a particular source document, e.g., shown in thumbnail form at 221, with the highlighted thumbnail shown enlarged in the center of the interface 210. As with all of the user interfaces shown and described herein, toolbox 206 and buttons 208 are provided, via tool handler 104, to enable the user to comment on figures, or save to Office or the user's own online personal library etc.

Figure 10:
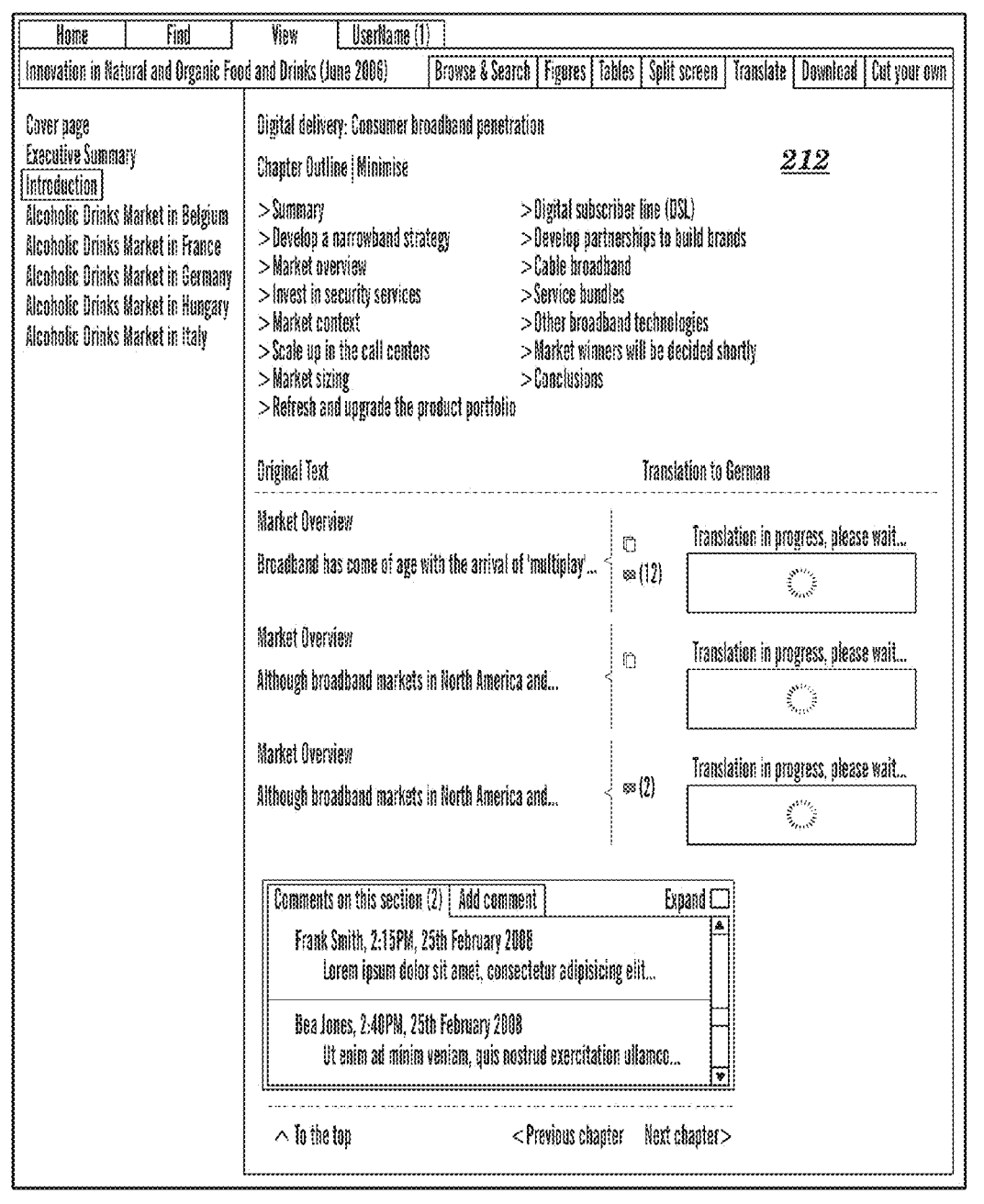

Translation handler 106 is configured to generate a translation interface such as shown at 212 of FIG. 10. Translation handler 106 operates in conjunction with the aforementioned translation table 46 to display foreign translations, e.g., side-by-side with the corresponding sections of the source document, as shown. It is noted that handler 106 checks for a copy of the translated section in the database 23. If the translation is not found, then the system requests the section be translated from an external translation service. In particular embodiments, this happens in real time and the translation interface 212 displays a please wait icon to the user. The translation for each section may be displayed as soon as it's received from the external system. The translated section may then be saved in the database 23, so that the translation will be shown immediately if the same translation is requested by another user in the future.

Figure 11:
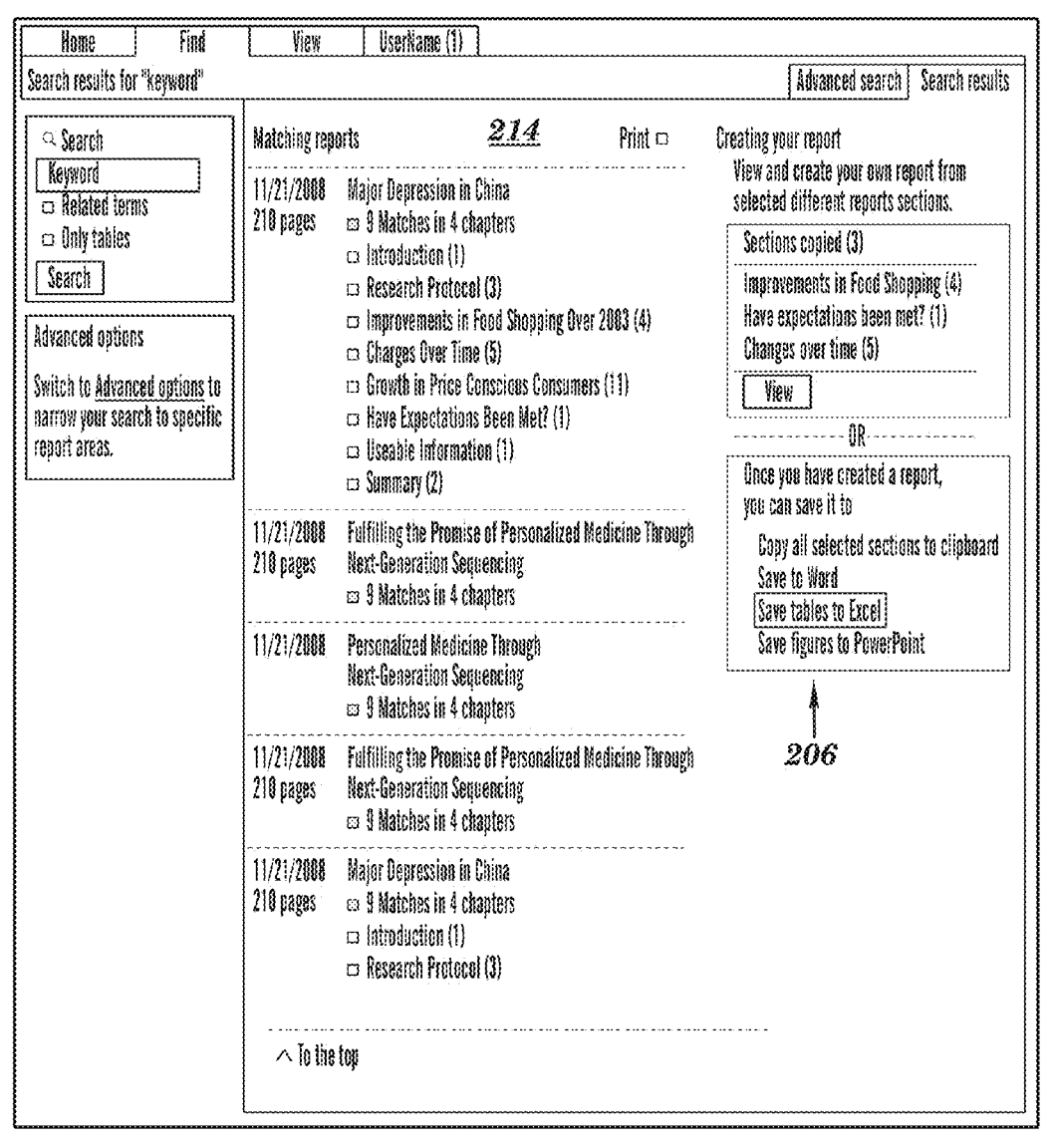

User search module 108 is configured to generate a search interface, such as shown at 214 in FIG. 11. The document storage format embodied in the various tables described above, enables the search module 108 to implement a relatively precise search, based on keywords entered via this interface 214. As shown, search results are displayed, including relevant sections within a document. The interface 214 may then directly access the relevant sections by highlighting and using toolbox 206.

Figure 12:
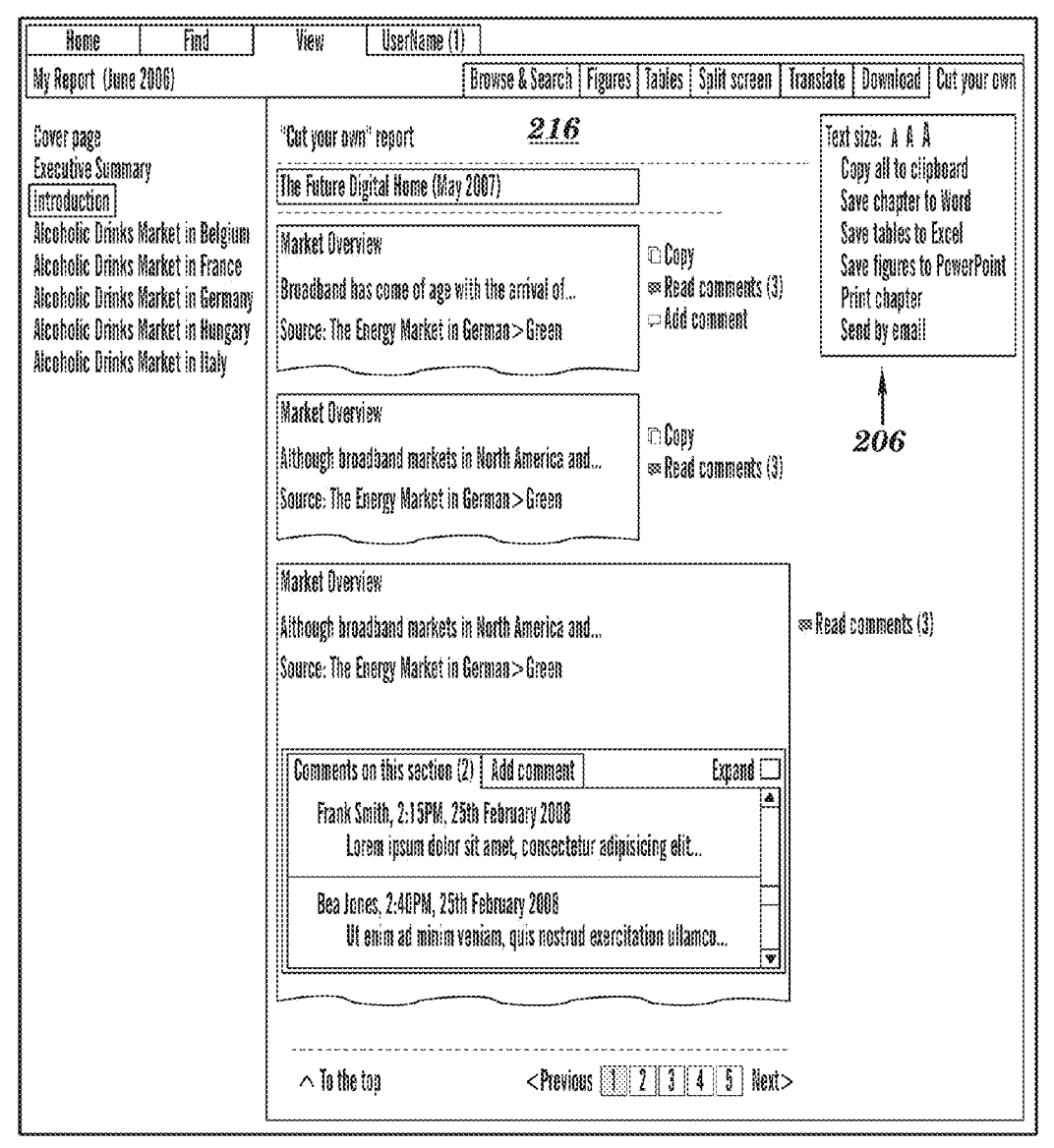

The custom report module 110 is configured to generate a custom report interface such as shown at 216 of FIG. 12. As shown, the sections selected via the various interfaces shown and described herein, may be displayed by this custom report interface 216. This interface thus displays the user's custom report, which includes the various sections copied from the aforementioned source documents. In the particular embodiment shown, the personal report is presented with 'page tear' graphics to differentiate the sections obtained from different source documents. The source information for the original source document and/or section, as tracked in the aforementioned tables, is also displayed. In addition to tracking the source information for the source document/section, custom report module 110 also includes a version control module 111. The version control table 111 uses the aforementioned version tables to enable a user, e.g., via interface 216, to display particular versions of a custom report.

It is noted that this custom report interface 216 also enables the user to perform the same functions with this custom report, as they can perform with the various source documents, such as add comments, translate, copy sections and share with colleagues, etc.

As also shown, series 100 of FIG. 6 may include a series of format modules, each format module being configured to enable source documents of a particular format to be searched, sorted, and aggregated using the search module 108 and customized report module 110. In particular embodiments, the format modules may be configured to handle formats of mutually distinct types. For example, as shown, the format modules may be selected from among PDF, PPT and EXCEL handlers 112, 114 and 116, respectively. Moreover, although shown as separate modules, the skilled artisan will recognize that two or more of the individual modules shown and described herein, may be combined with one another without departing from the scope of the present invention.

Figure 13:
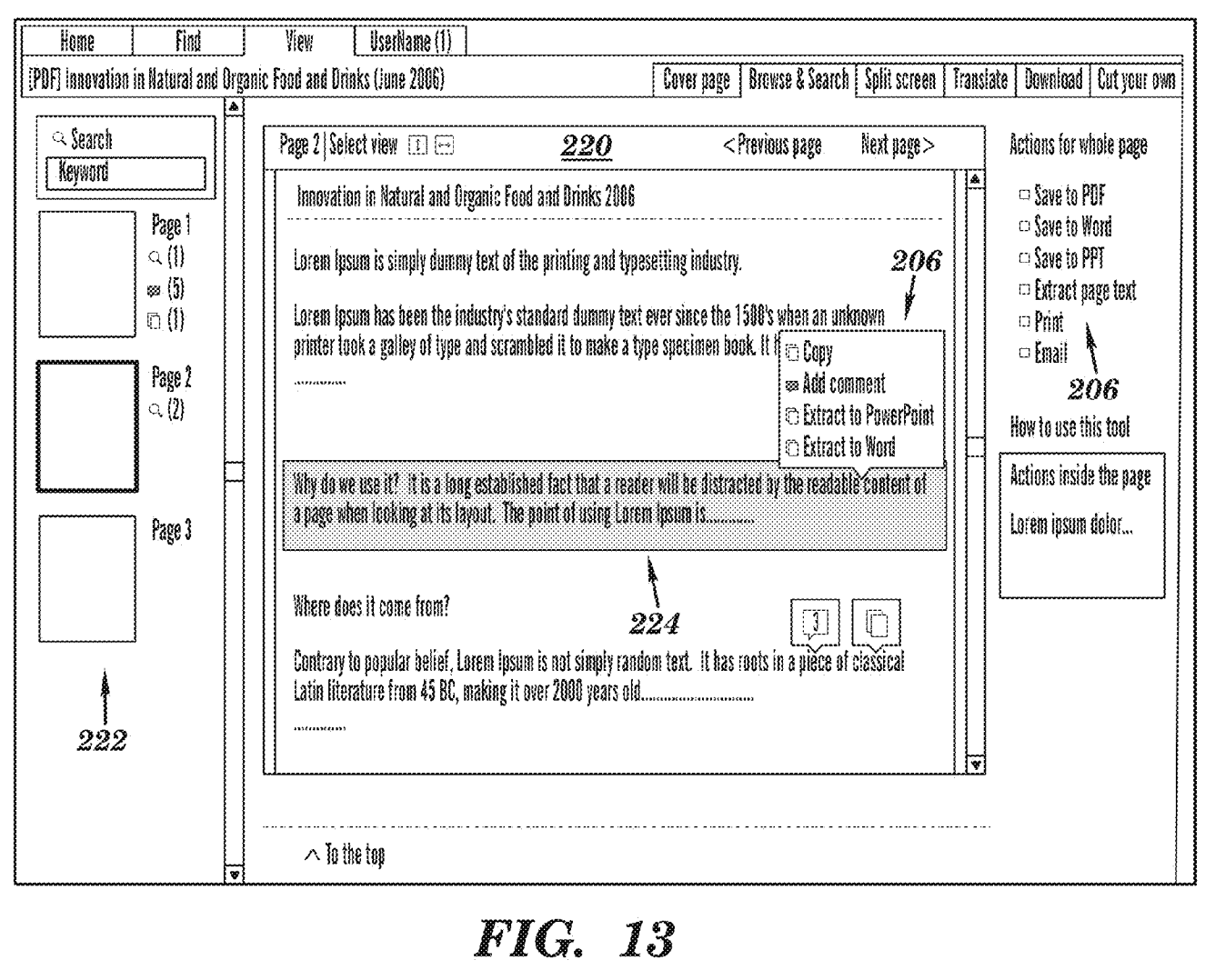

PDF Handler 112 is configured to generate a PDF Handler interface, such as shown at 220 in FIG. 13. The PDF Handler 112 splits PDF documents into pages 222, and saves each separately as: (i) a high resolution image; (ii) a single page PDF; and through the use of conventional text extraction and/or optical character recognition tools, (iii) text in the aforementioned database tables. This enables the PDF content to be viewed and used in similar ways to the other documents on the system. In particular, the search module 108 may use the text in the database to present matches that link to the relevant page within a PDF document. The page text stored in the database tables may also be accessed by the toolbox 206 when the user seeks to extract the text to other (e.g., MICROSOFT OFFICE™) formats and/or translation. Other capabilities include enabling the user to comment on individual pages as described above. In addition, the high resolution image may be resized and inserted into the users' online personal reports and Office documents. The individual PDF pages may also be assembled when the user wants to save multiple pages to a new PDF file.

It is noted that the foregoing functionality, while providing for such capability as text extraction and manipulation, still provides for maintaining and using PDF files in their native format. In this regard, PDF Handler 112 is configured to permit the user, via interface 220, to draw a rectangle 224 to select page sections they would like to use (e.g., operate extraction functions on). This rectangle may then be manipulated (e.g., extracted to MICROSOFT OFFICE™ files), using toolbox 206 as shown. In this regard, PDF Handler 112 will capture and populate the coordinates of the rectangle(s), along with the filename of the image (or PDF file), to the table(s) of database 23. Thus, when saving to the user's personal library, only the co-ordinates and the image filename need to be stored in the tables.

Figure 14:
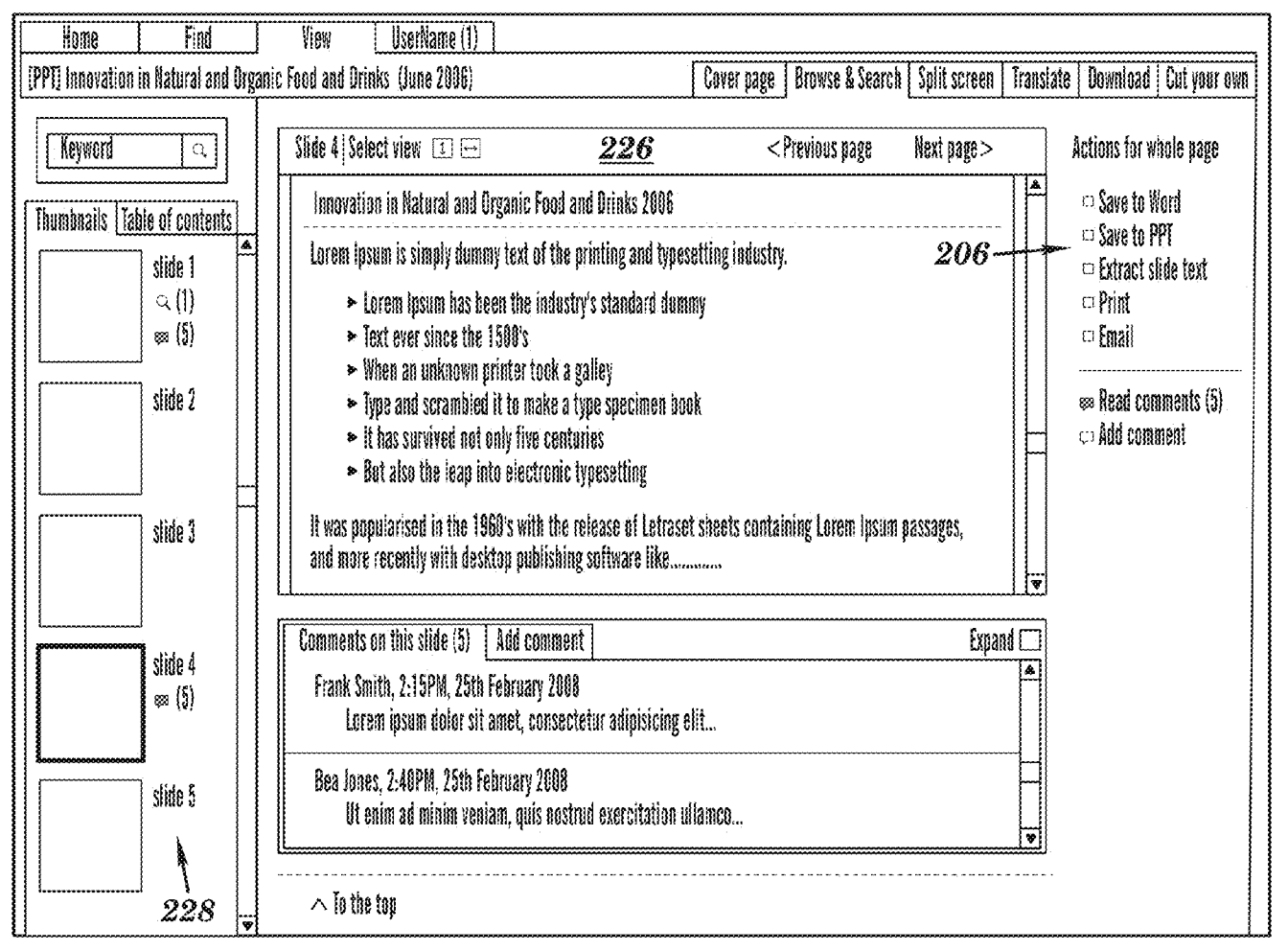

PPT Handler 114 is configured to generate a PPT Handler interface, such as shown at 226 in FIG. 14. As shown, POWERPOINT® (Microsoft) files are integrated in much the same way as PDFs, except that each slide 228 of the PPT files (rather than each page of the PDF files) are saved as individual PPT files (rather than as PDF files).

Figure 15:
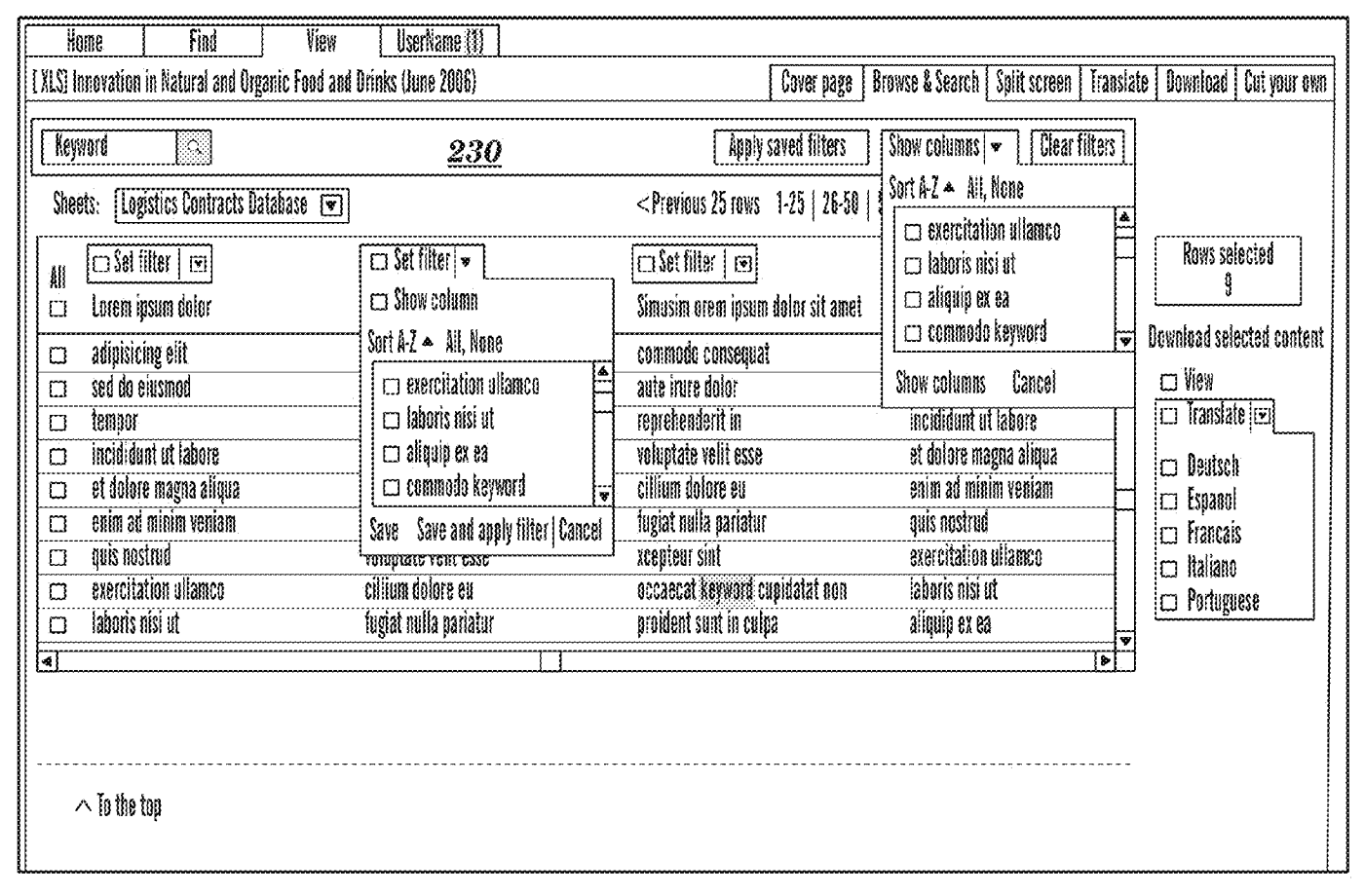

EXCEL® (XL) Handler 116 is configured to generate an EXCEL® (XL) Handler interface, such as shown at 230 of FIG. 15. As shown, handler 116 provides a mechanism, via interface 230, in combination with the tables (e.g., table 51) of database 23, for saving XL files and integrating these with the substantially the same search, personal library, translation and 'save to Office' functions as described above for documents in other formats. The interface 230 also provides mechanisms to filter the table content and save these views to the personal library, etc.

Figure 20:

A Tracking Handler (module) 118 may be configured to generate a Communication interface, such as shown at 254 of display 248 of FIG. 20. As shown, module 118 provides a mechanism, via interface 254, in combination with the tables of database 23, and communication servers 21, to enable communication between a user and a service provider. Tracking module 118 is configured to track these communications using Message table 140 and to link them to specific portions of a custom report, e.g., using Comments table 48, as discussed in hereinabove.

Tracking module 118 may also use Advisory table 144 to maintain and display data on various service providers to users via user interface 254, etc. In this regard, any of the data maintained within table 144, including fee rates, and areas of expertise (skills) listed in columns 184-190, may be displayed to the user.

Figure 21:
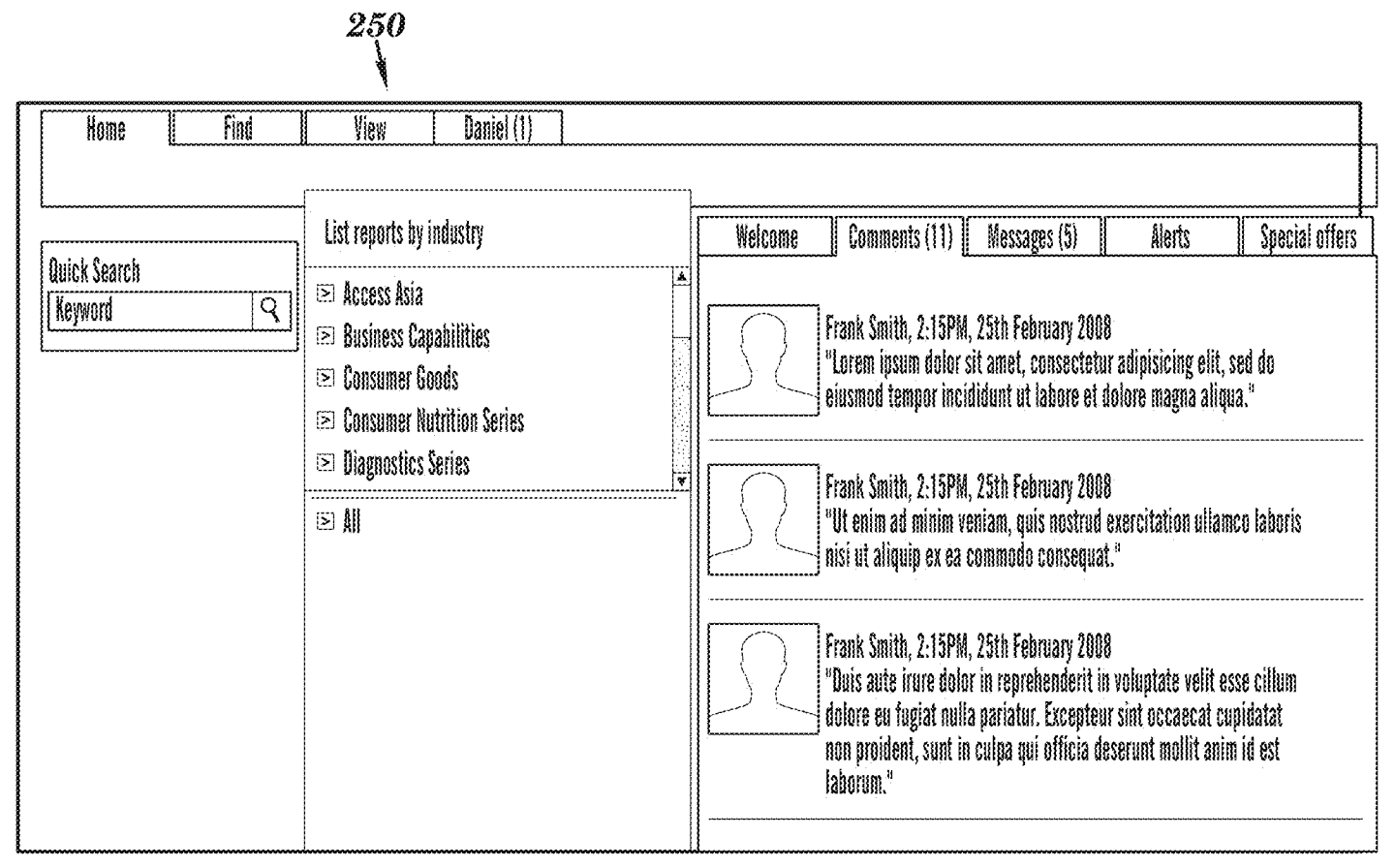
Figure 22:
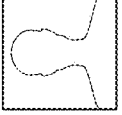
Figure 23:
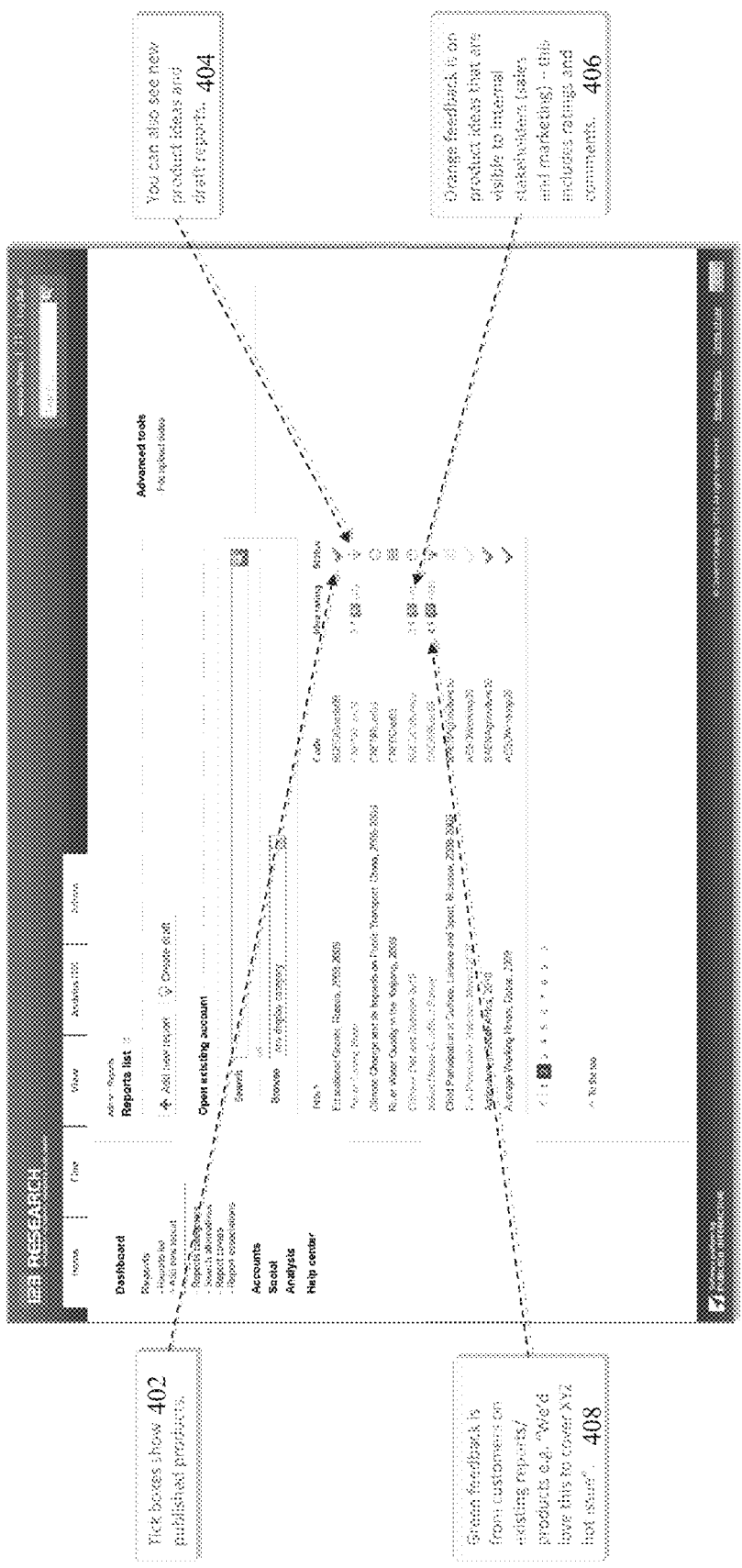
FIGS. 23-41 are exemplary representations of still further interfaces provided by the objects of FIG. 6.

Moreover, Tracking module 118 may use Fee Tracking table 142 to track fees associated with the service provided by the various service providers, including the individual messages and/or comments in which the user requested and/or authorized the service provider to provide particular services, access, etc. As mentioned above, these authorization messages/comments may be linked to particular locations within the document by using Comments table 48 as discussed hereinabove. These linked messages/comments may be displayed along with the document in any convenient "inline" manner, such as within or below the linked text as shown in FIGS. 8 and 9, or alongside the linked text as shown in displays 250 and 252 of FIGS. 21 and 22.

Additional embodiments include one or more of a CMS (Content Management System) Module 120, including a User Analytics Module 122, and/or a Data Viewer Module 124.

CMS Module 120 may use the Customized Report module 110 and the Version Control module 111, along with the User Login 102 and the various interfaces generated by system 100, to enable a broad range of users to access system 100 to perform various functions associated with conventional content management systems, such as collaborating in the generation, editing, modifying, and organizing of content from a central interface.

The CMS Module 120 generates the interfaces shown in FIGS. 23-29. The Data Viewer Module 124 may use the various modules of system 100, including the EXCEL Handler 116, e.g., modified to provide the additional capabilities of this embodiment, and Tracking Handler 118, to generate the interfaces shown in FIGS. 30-35, which illustrate how data may be pivoted and filtered. It should be noted that the additional capabilities provided by EXCEL Handler 116 as modified herein, provide data viewer module 124 with the ability to use substantially any tabular data source (which can include Excel worksheets), and do various forms of analysis and visualization, including filter/pivot as described hereinbelow. The User Analytics Module 122, which may be incorporated into the CMS Module 120, may use User Table 40, modified to store various metrics such as time spent logged into system 100, the particular reports accessed by each user and the time spent viewing them, including the subject matter of the accessed reports. In particular embodiments, User Analytics Module 122 generates the interfaces shown in FIGS. 36-41, which illustrate how the user information and data may be extracted.

In particular embodiments, the content management system (CMS) module is configured to generate a CMS interface displayable to the client, and responsive to user instructions received via the CMS interface, to display a list of customized reports in various stages of completion ranging from report ideas to drafts to versions of completed reports. The CMS module also uses the tool module to link user comments to any of the customized reports in the various stages of completion, so that users are permitted to provide feedback on the customized reports at substantially any stage of completion.

The CMS module also includes a user analytics module configured to capture user-derived metrics including: (i) how often each sub-document portion of a report is accessed by users; (ii) the amount of time users spent looking at each of the sub-document portions of a report; and (iii) ratings applied to the customized reports and/or the sub-document portions of a report. The captured user-derived metrics are stored in the tables with links to the sub-document portions, for display in the CMS interface.

The user analytics module may also include a targeting module configured to generate a targeting interface displayable to the client, and responsive to user instructions received via the targeting interface, to display the captured user-derived metrics along with a targeting tab configured to permit a user to select from among various customers and to select from among a list of keywords. The targeting module also displays a content wizard having various user-selectable offer templates targeted to users of particular reports based on the captured user-derived metrics and keywords. A list of offers created by the targeting module may be displayed along with tools to filter the list by account, account manager, and/or time period.

The data module is in operative engagement with the presentation module and the spreadsheet module, and is configured to generate a data viewer interface displayable to the client. In response to user instructions received via the data viewer interface, the data module is configured to: (i) capture data from the source documents in the presentation format; (ii) capture data from the source documents in the spread sheet format; (ii) aggregate the captured data; and (iv) display the captured data in the data viewer interface.

Referring now to FIGS. 23-41, various exemplary user screens generated by modules 120, 122, and 124 will be described. As shown in FIGS. 23-29, CMS Module 120 generates a screen 400 which includes a list of reports/ products currently within system 100. It is noted that this list 400 includes not only completed reports produced using system 100, such as shown at 402, but also includes those that are in various stages of progress, ranging from mere concepts or ideas, shown at 404, to those that are nearing completion. CMS Module 120 thus extends the platform which would normally have a list of completed reports, to embodiments configured to allow the seamless creation of reports, collaboratively, within the system. Part of the idea here is that reports are like any other publication, with publishers being concerned with whether or not a particular report sells well. So it is important for publishers to understand which topics are going to be in demand and good sellers, and to try to focus editorial efforts on those.

Embodiments of the present invention address these concerns by first creating reports as ideas 404, and then allowing discussion of these either internally, as at 406, or within the business, so people in different business units and/or those involved with other aspects of the business can comment and get feedback on report concepts as they evolve. They can also put this out to a limited review with some customers, as at 408, so customers can say what interests them.

In particular embodiments, as the report builds in the system, marketing materials build. The generation of marketing materials used to be, in the traditional model, secondary processes which were very time intensive. These embodiments allow for the evolution of the report to automatically generate these secondary materials, like eshots, marketing brochures, advertisements, etc., as discussed in greater detail hereinbelow. These also allow the content to evolve in a way which is visible throughout the whole organization, e.g., to users with requisite permissions logging into the system.

The sales and marketing director for example, might want to know what the progress has been on the next batch of reports that's due to come out. This initial screen 400 provides some understanding of that, by displaying different stages of reports, such as the light bulb icon denoting an idea 404, and the tick (checkmark) icon to denote a published report at 402. In the middle you have the summary of the feedback (color-coded "Ideas Rating" 406, 408, which also include numerical ratings in the embodiment shown).

Figure 24:
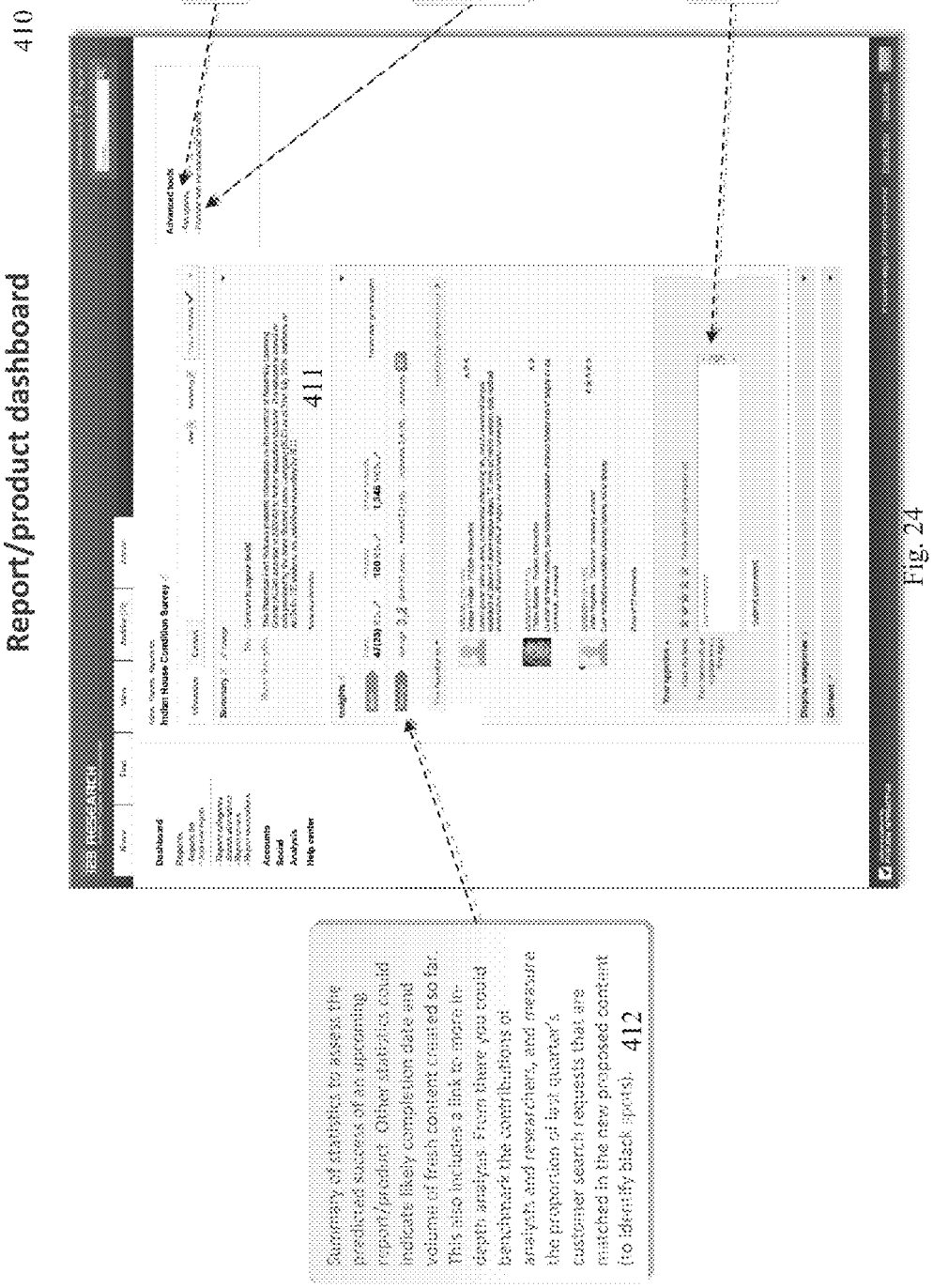

Turning now to FIG. 24, a dashboard screen 410 is generated after having selected (clicked on) one of the reports shown in screen 400. In this embodiment, we see the report attributes, title and description at 411. We also see a data summary 412 of its usage and popularity. This helps publishers to know how topical a report is, whether it needs to be replaced or it needs additional content. There is also a summary of the feedback 414 with a star rating system. Additional tools may include a send tool 416 to notify internal and/or customer users to review a particular report, and a promote tool 418 to promote products to particular customers via targeted advertisements/marketing pages. The functionality of promote tool 418 may be expanded upon as shown and described hereinbelow with respect to the targeting module and FIGS. 38-41.

These embodiments, in which aspects of the report generation facility shown and described with respect to FIGS. 8-22 are used within the context of a CMS, provide a great deal of extra benefit, due to the capture and storage in the various tables 40-52, 140-144, of the various user-derived metrics as described above. For example, as mentioned above, the CMS Module may track the amount of time the user spent looking at each different element of content. We can now link, at a very granular level, various metrics, such as the content creator/analyst, with the amount of time spent by the content creator/analyst on a particular report, with the ratings of their reports by other users. This data can help to identify the best analysts, e.g., based on productivity and ratings.

This data can also show, for example, that certain popular content is being accessed frequently, but has a high bounce rate (users are initially accessing content, but then quickly leaving), so the content is not judged as being good enough, even though it's popular. The publisher may then decide to invest more time in improving the content. This information also allows the publisher to see which content isn't so useful, or isn't accessed so much, and spend less time developing that content. The publisher may also identify content which gets low ratings and look at revising it. These embodiments thus provide a better model for publishers who, in the past, would have had to dedicate equal effort to each of the areas they cover, but may now efficiently target their expensive resources.

Figure 25:
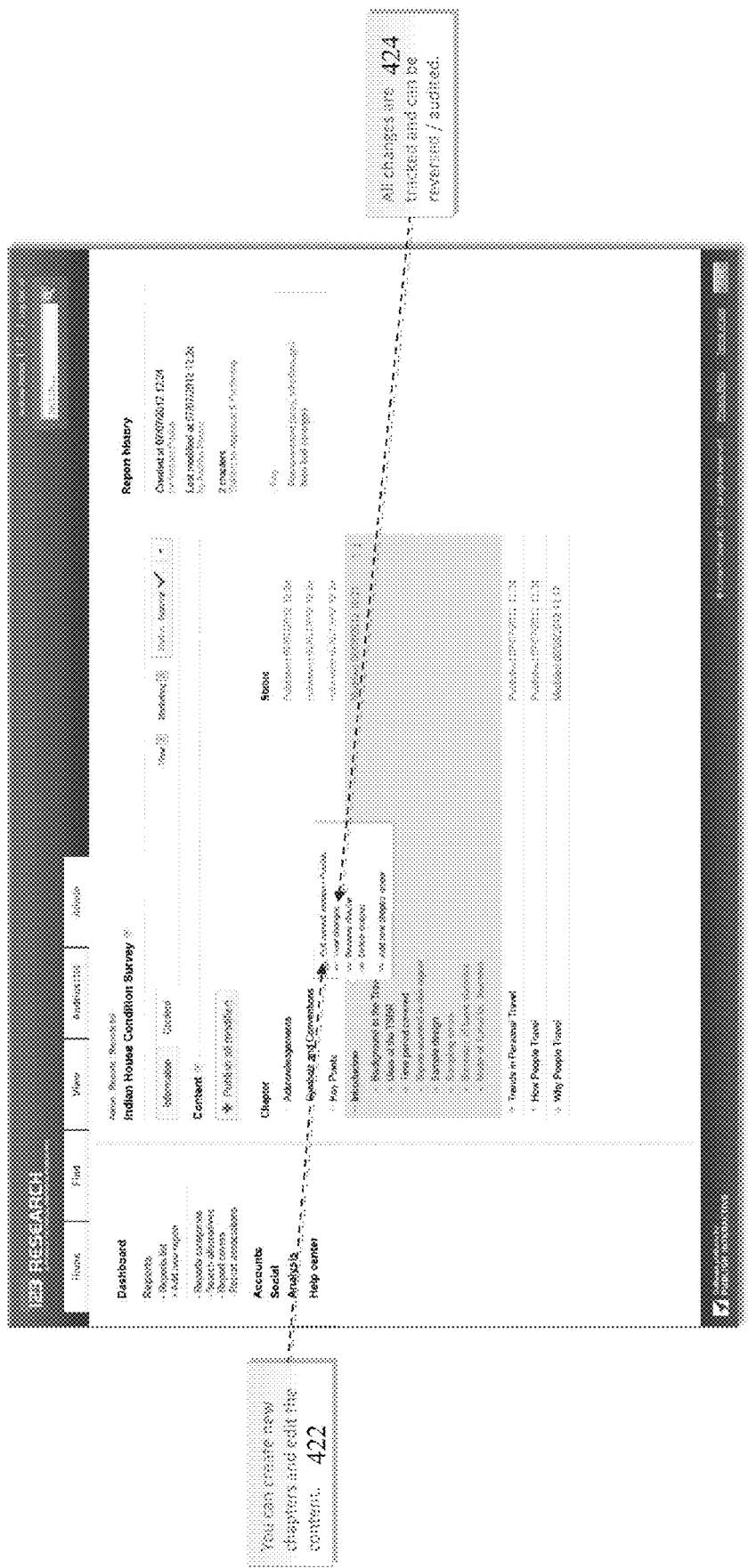

Turning now to FIG. 25, a sample content management screen 420 of the CMS application is shown. This screen 420 displays a summary of a publication. Editing tools 422 enable chapters to be viewed, moved around or renamed, and compared with different versions, e.g., using Version Control Module 111. Changes can be tracked and reversed/audited as shown at 424. As publications on this system may be constantly evolving, these features provide a number of powerful benefits. For example, end users can subscribe to a topic area and can subscribe over particular dates. When their subscription expires, they can still log in and see the content as it was on the day their subscription expired. Their view is locked at that view. Whenever the publication is updated, all people who have active subscriptions may receive an update, which tells them exactly what has changed in this topic. Those who don't have an active subscription receive only a summary of what they can't access. This is expected to be a useful marketing tool to move customers over to long term subscriptions which tend to be more profitable for publishers.

Figure 26:
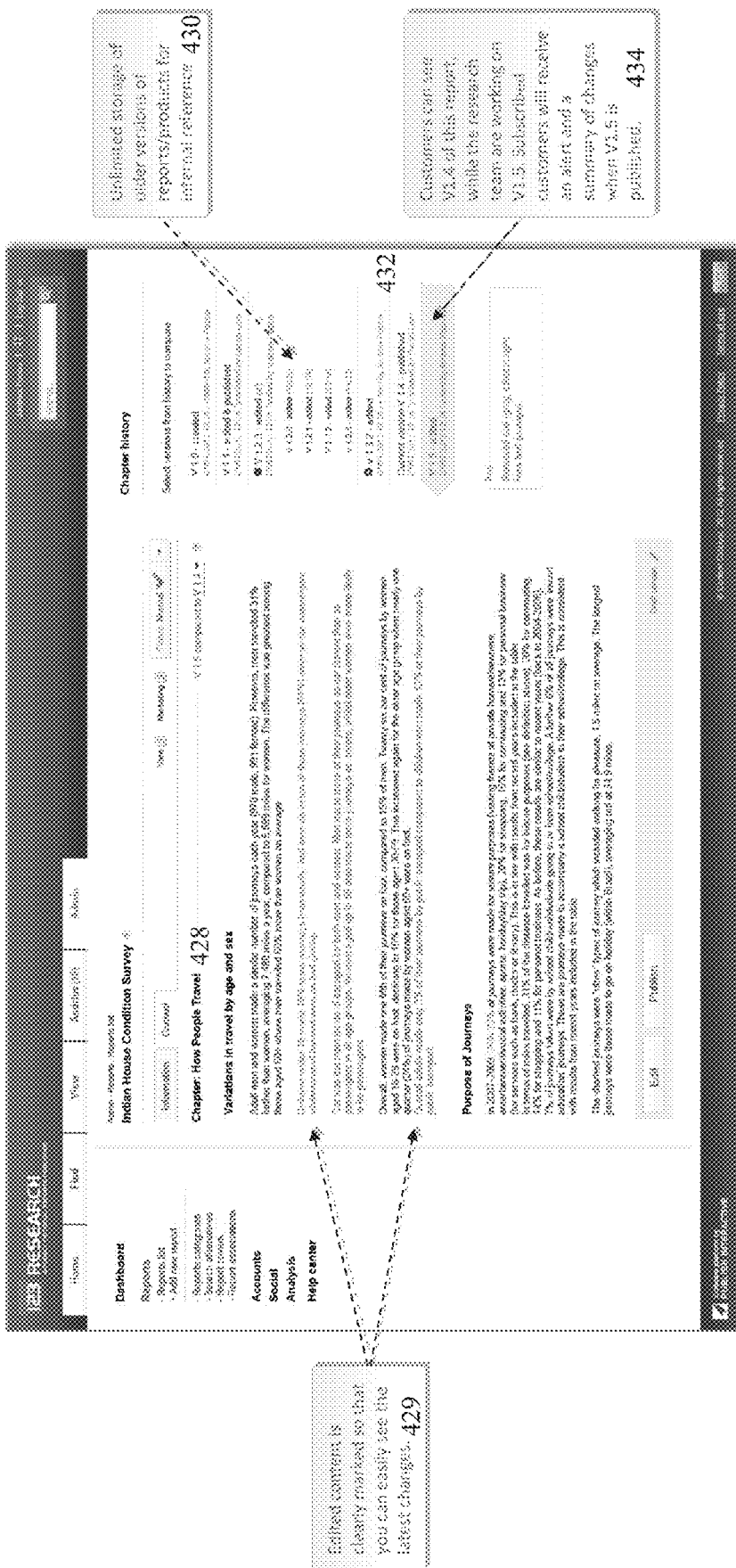

Turning now to FIG. 26, we can see an example of how this versioning works in particular embodiments. Here, a subscription report screen 426 displays a chapter 428 that is currently being edited, with changes being tracked and displayed at 429. A list 430 of all the versions is also shown. The current version is indicated at 432 (version 1.4, shown in green in this example) and is the version which a customer of the publisher would see upon log in to the system. As soon as anybody internal, e.g., an administrator, an analyst, an editor, etc., makes a change to a publication, an internal new version, in this case, version 1.5 is created and shown at 434. Any of these internal users may continue to work on this internal version 1.5. It is also noted that if some of the reference data used in the chapter is changed, then this may automatically create a new version as well. Later on an authorized user can click to publish, then the green published version 432 rolls onto this version 1.5. Again, this is an efficient way for research teams to collaborate and roll out updated publications.

The use of Version Control Module 111 in the background gives it a great deal of flexibility and potential application in new areas. For example, in particular embodiments, legal contracts may be managed in this system, with particular clauses negotiated and changed in the system. The system may then require particular parties to approve the final changes before they are incorporated into new versions. The system may also display comparisons versus the original templates, e.g., with prior versions the users have previously used and/or are otherwise familiar with. Similarly, a company may put all of its contracts and modifications in this system. Then, for example, the customer support team of the company could view the full contract database and pull up a list of previous changes to get an idea of how the contracts may be modified for other customers.

In other embodiments, government documents may be stored and manipulated in the system, e.g., for guidance and regulations. Then as the regulations evolve it means that the people who have to keep on top of that, the practitioners in whatever area it is, they can log in and see the differences since they last had a look. If there's some litigation which happens around that, then the litigators can do a comparison or they can log in to see what the rules were on a particular date that the issue occurred.

Figure 27:
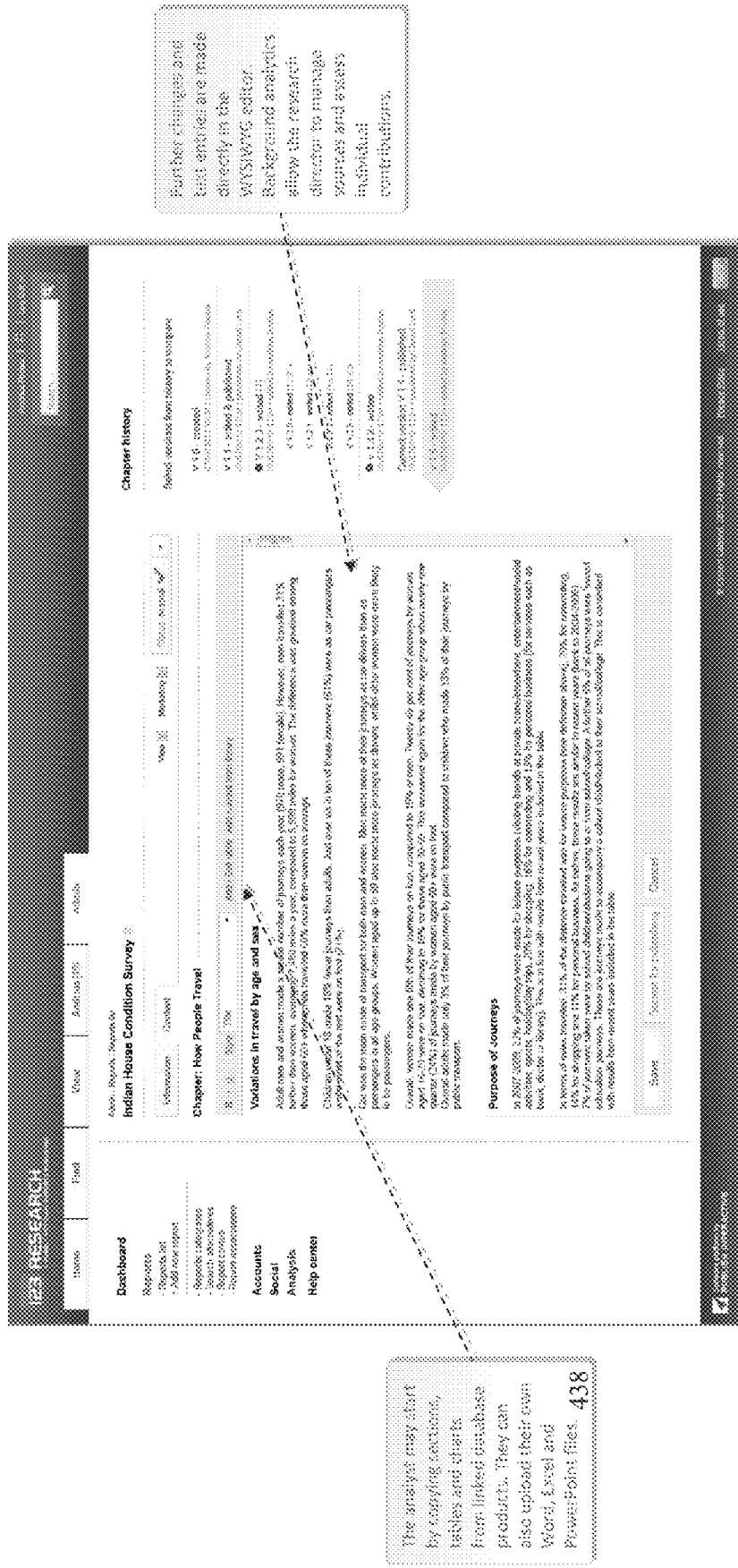

Turning now to FIG. 27, here we see more detail regarding how content may be edited using Report Module 110 and Version Control Module 111, etc. As shown, there is a WYSIWYG (what you see is what you get) editor, but the user may also import and export Microsoft WORD™ documents. In particular embodiments, when content is exported as a WORD document, the system automatically locks the underlying content. Then the WORD document can be edited outside of the system e.g., using MICROSOFT OFFICE™ running on a user's computer, and once the user has finished editing, may re-import the WORD document into the system. Once re-imported, the underlying content is unlocked for editing by others. This ability to edit content in WORD may be particularly attractive to publishers who have systems in which WORD is heavily embedded within their organization, with analysts and writers who may be otherwise resistant to using online CMS systems.

As discussed hereinabove, a significant advantage of CMS Module 120 is the leveraging of Customized Report Module 110 and the various Handlers 112, 114, 116, 118, etc., to hook up a lot of existing data objects and tie content to them. It's in a sense, an assembly of references to different sources, and it means that when those sources update in the future, it makes renewing the content of a customized report quite efficient. As we saw in the versioning, if a data table were embedded in a report, and the data changed, for example, stock market information, then this change would create a new version of the report. The owner or analyst for the affected section could be notified, then he comes in, updates the commentary and clicks publish, which moves the data and commentary together to the new published version.

Figure 28:
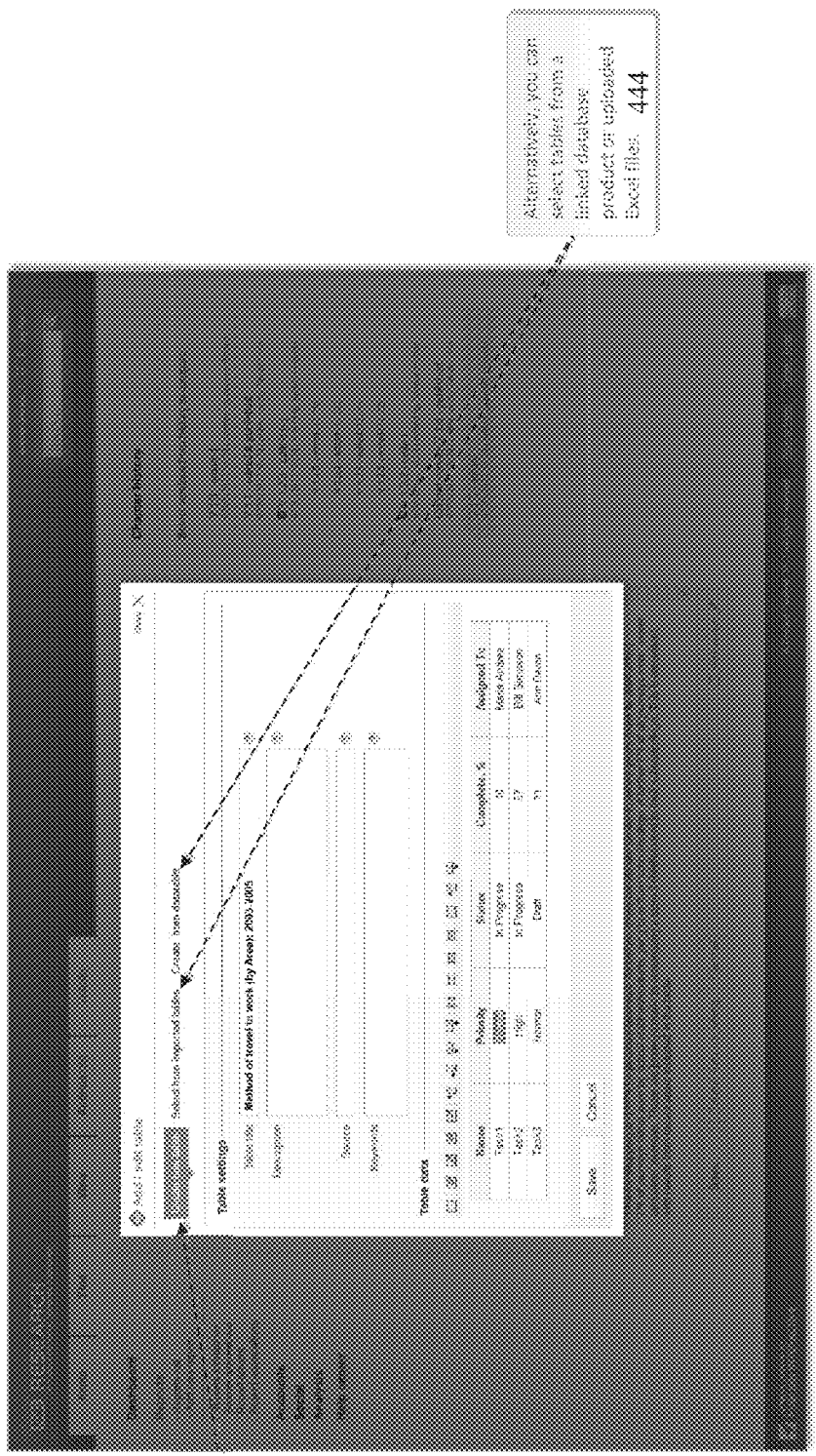
Figure 29:
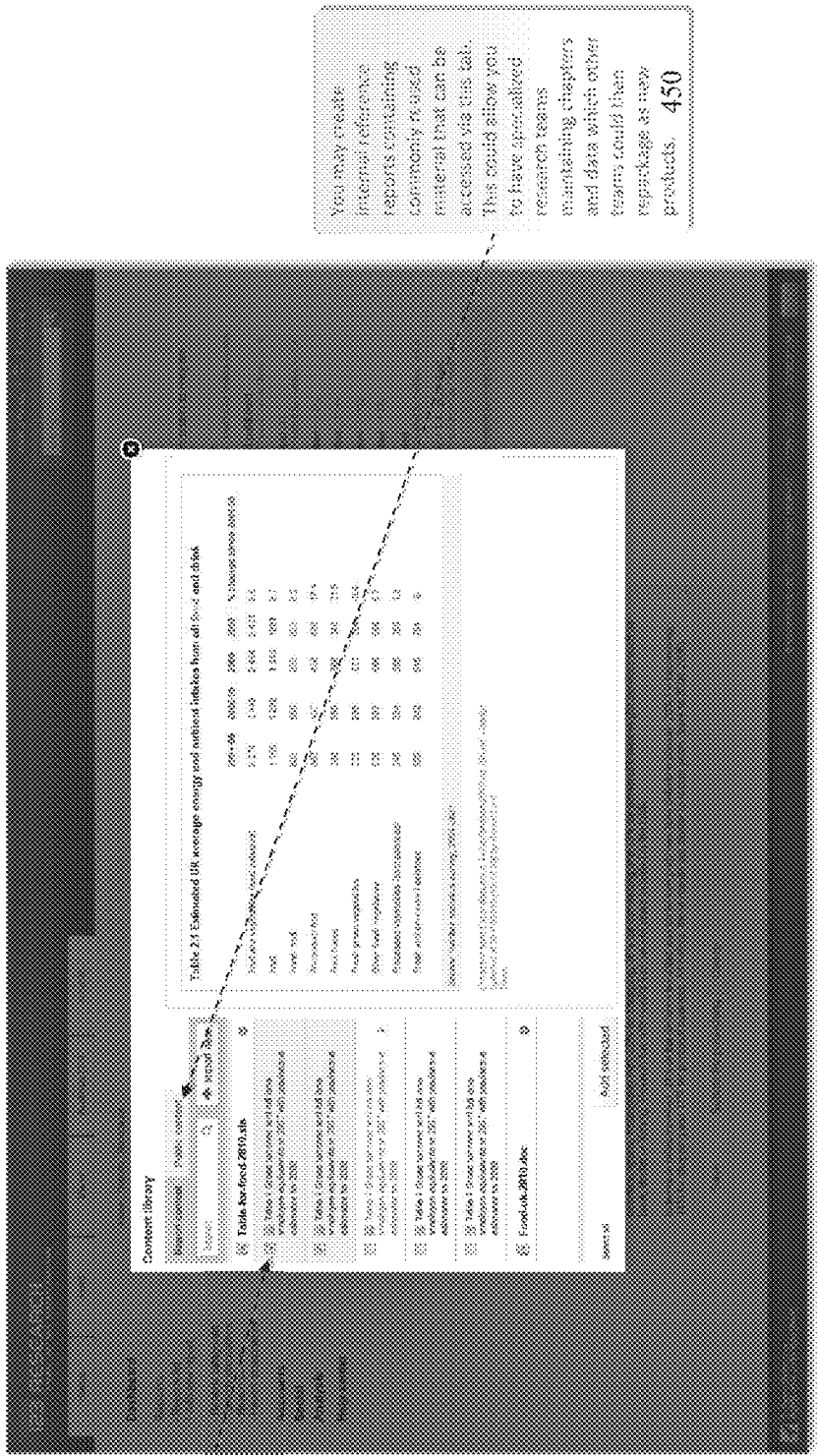

Turning now to FIG. 27, content screen 436 enables a user to select tab 438 to open a Table Editor 440, shown at FIG. 28. The user may then either create a new table directly, at 442, or open files from an external source, e.g., using Handlers 112, 114, 116, for PDF, PPT, EXCEL files, etc., at 444. These externally sourced files may be previously uploaded spread sheets, etc., or may be on-line data products, e.g., from a linked database. Screen 446 of FIG. 29 is an example in which an analyst has uploaded a spread sheet at 448. Screen 446 also enables the user to alternatively select the public content tab 450, to select shared resources within the publisher, which may include data products, reference materials, etc., that are available for use by analysts associated with the publisher.

Referring to FIGS. 30-35, particular embodiments include a Data Viewer, instantiated by Data Viewer Module 124 (FIG. 6), which allows for tables to be created for large data bases. Typically a research report would have behind it, a very large data base, which is filtered, pivoted in various ways to show cuts of that data, maybe a table for each country and a table for each market sector. The process of creating on-line data is to essentially cut that source data base and embed the tables and the charts that you've made from those tables, into the report. Data Viewer Module 124 may provide this functionality by leveraging Source Document Module 103 and EXCEL Handler 116 to access and manipulate source data, e.g., in a tabular format such as EXCEL.

Figure 30:
Figure 31:
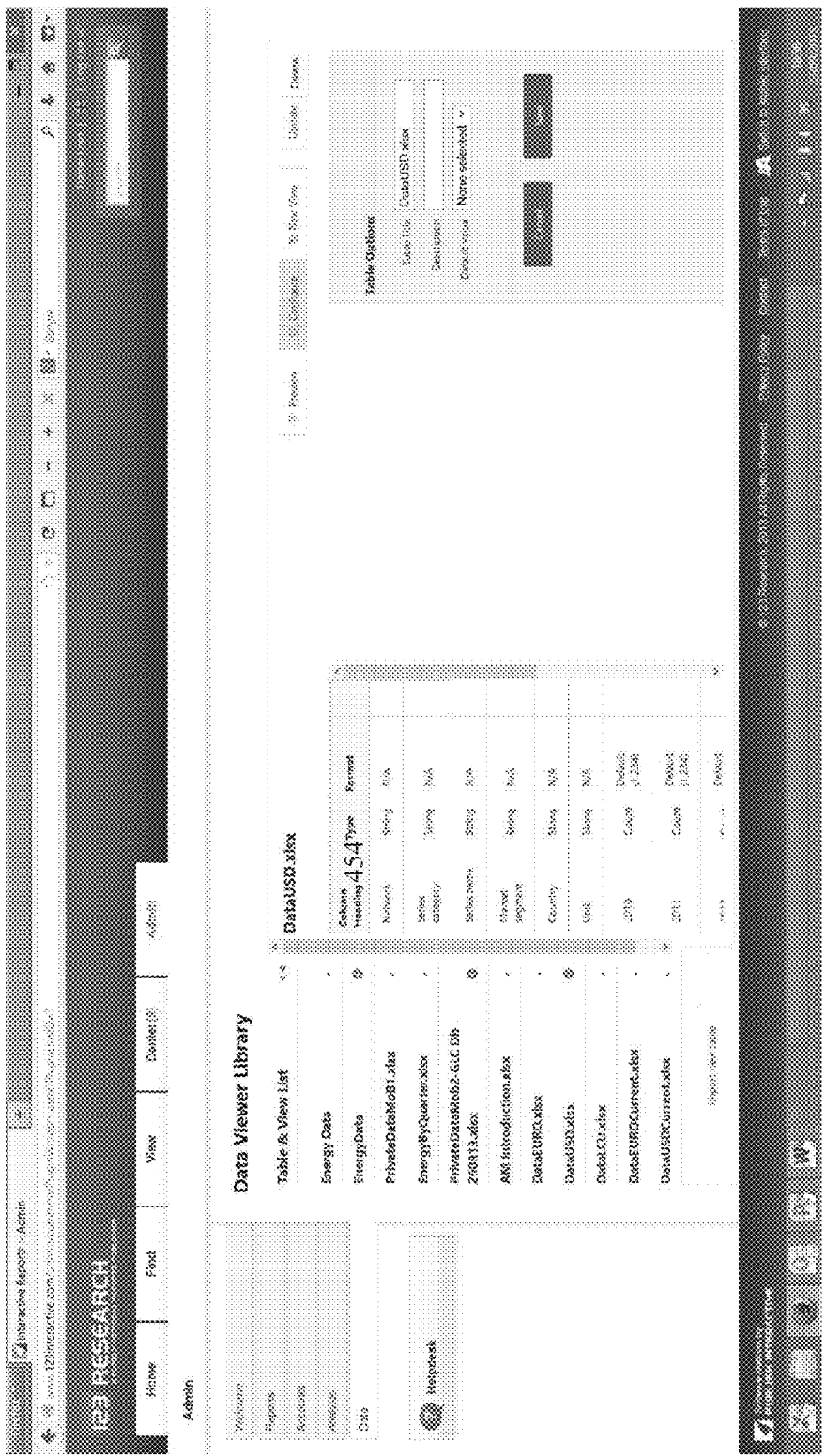
Figure 32:
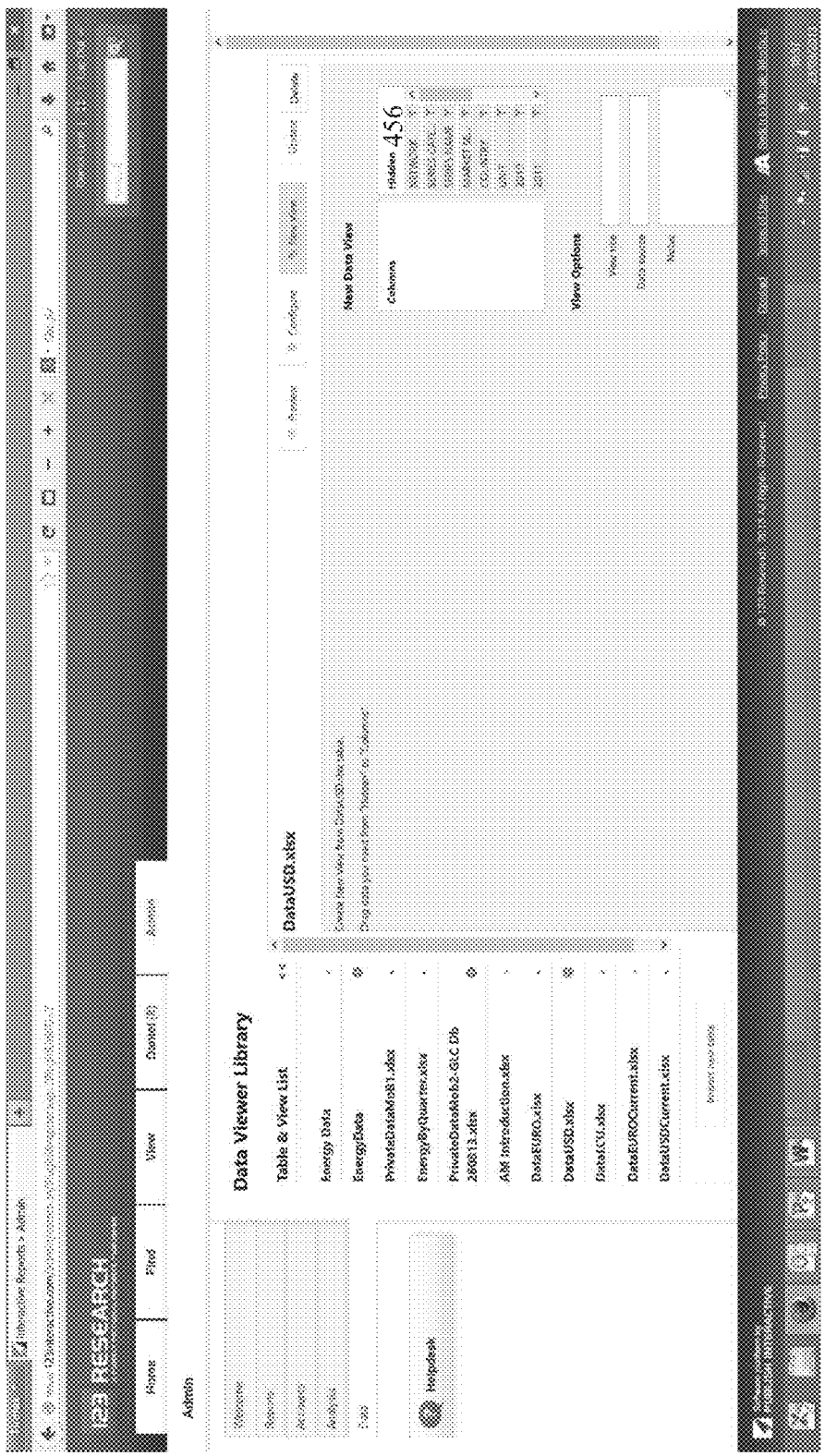
Figure 33:
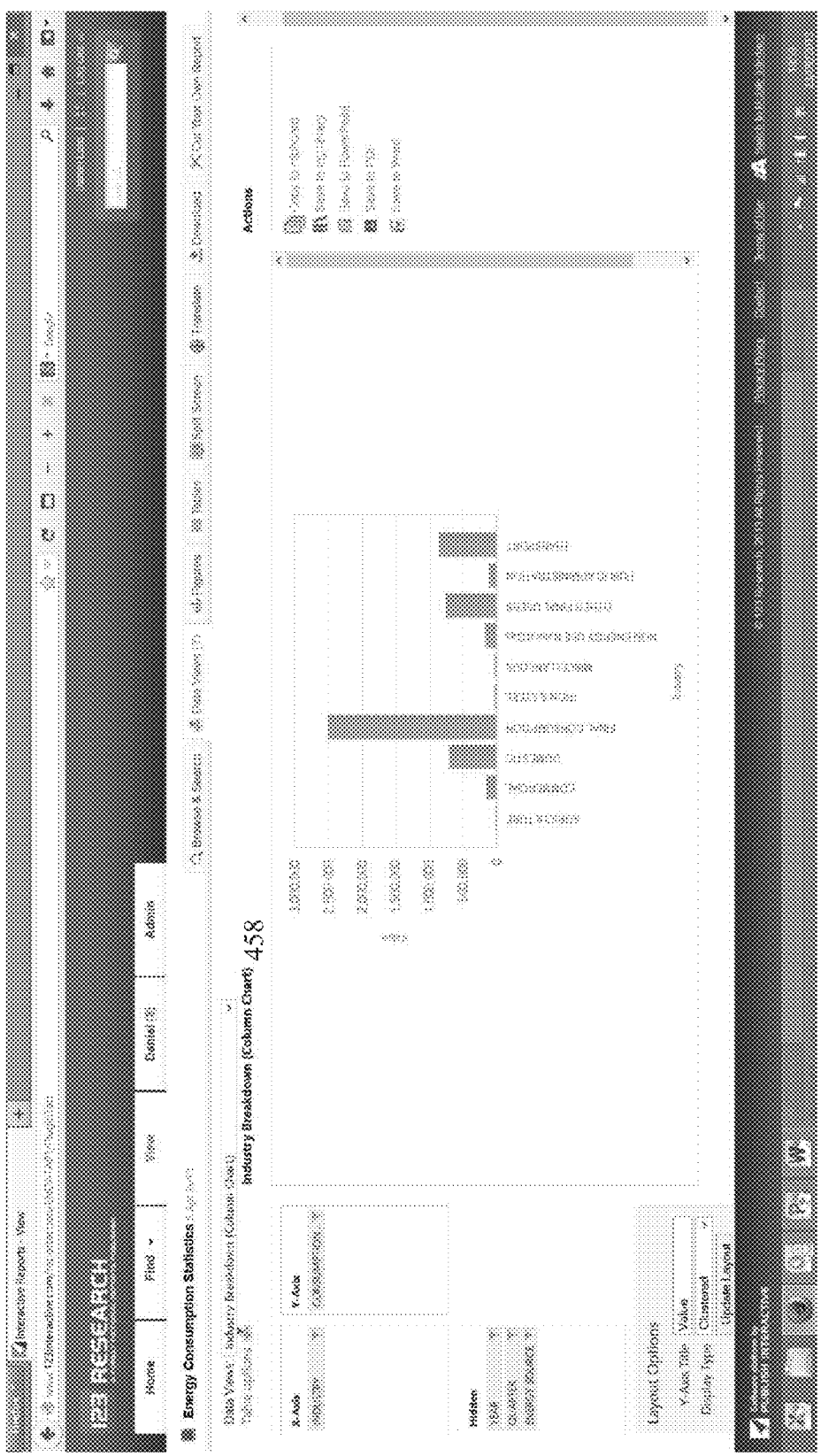
Figure 34:
Figure 35:
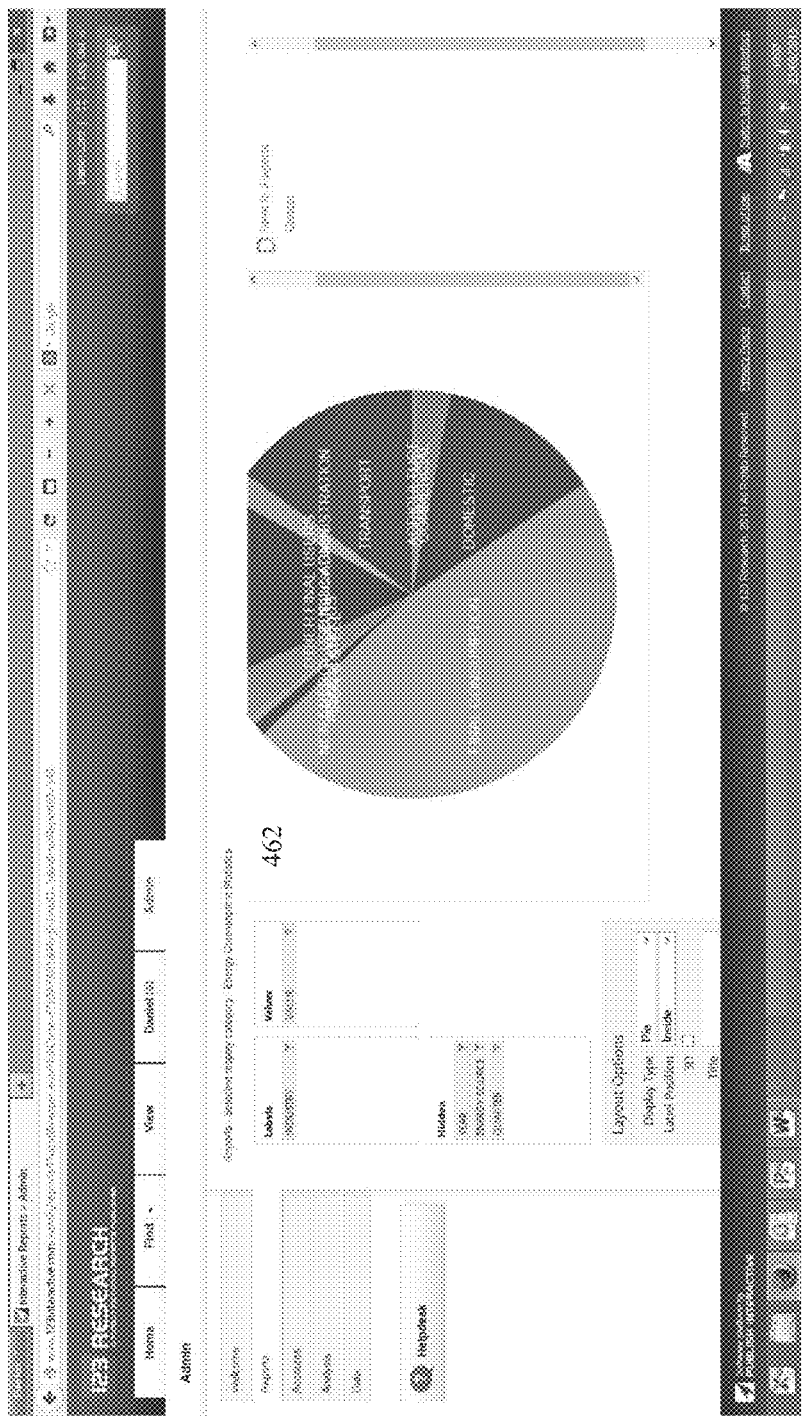

Turning now to the Data Viewer slides (FIGS. 30-35), the basic concept is that we take very large tabular data, like you see in this first table 452 (FIG. 30). Then we provide the sources to filter this, or to pivot it. If we go to FIGS. 31-35, one can see how this pivot type interface can then lead to visualization of that data and also of the calculated data table. For example, the data may be sorted by column heading 454 in FIG. 31. In FIG. 32, the user may create a new data view by selecting and dragging from a list of hidden attributes, as shown at 456. Data may be displayed in Chart form, as at 458 of FIG. 33, from a list of various visualization types shown at 460 of FIG. 34. An exemplary pie chart visualization is shown at 462 of FIG. 35. This is very useful for all types of analysts. This is because traditionally, data products were seen as being distinct from the commentary products. Typically the data product would be sold as a spread sheet, while the commentary product would be sold as a PDF. The incorporation of the Data Viewer within system 100 of the present invention effectively combines these two distinct areas, which makes a lot of sense for a lot or organizations. These embodiments allow this content to be embedded in publications, making it faster for the analyst, saving costs for the publisher and allowing the reports to be published much more quickly. It also provides the end user with a lot of extra functionality, because if they are looking at one of these data tables, which might be filtered for the American market, but they want to filter that further and they want see what does that look like in New York, then they can drill down into that data. If they access the data table, they can go seamlessly into the underlying data product, which is a significant improvement in how these two historically distinct types of information can be published.

Figure 36:
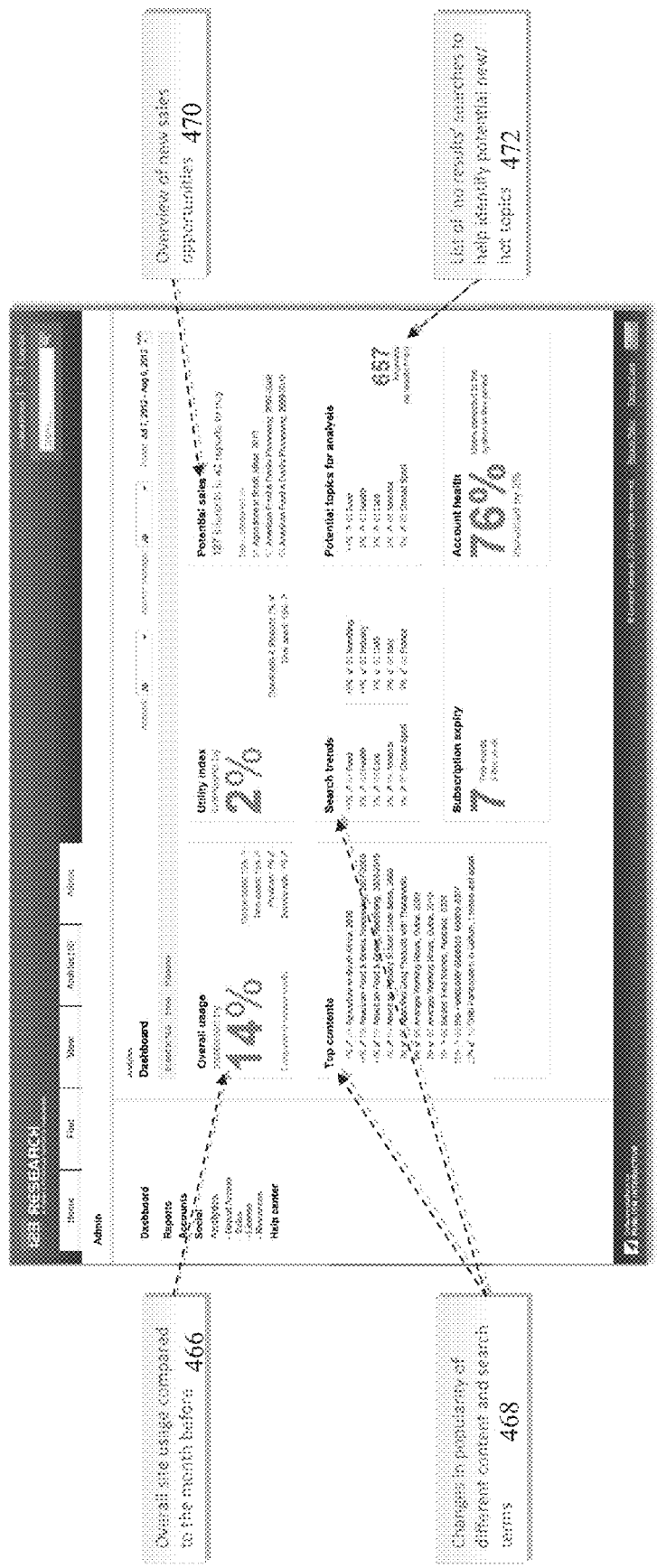

Turning now to FIGS. 36-41, several optional user interface screens are shown and described, which may be implemented by CMS Module 120. As shown in FIG. 36, an analytics dashboard provides visibility for the publishers of the various metrics tracked by CMS Module 120 as described hereinabove. For example, overall site usage may be shown at 466, changes in popularity of content and search terms may be shown at 468, potential sales opportunities, e.g., based on user's expressing interest may be shown at 470, and a list of 'no results' searches shown at 472 to help identify new topics for future research.

Figure 37:
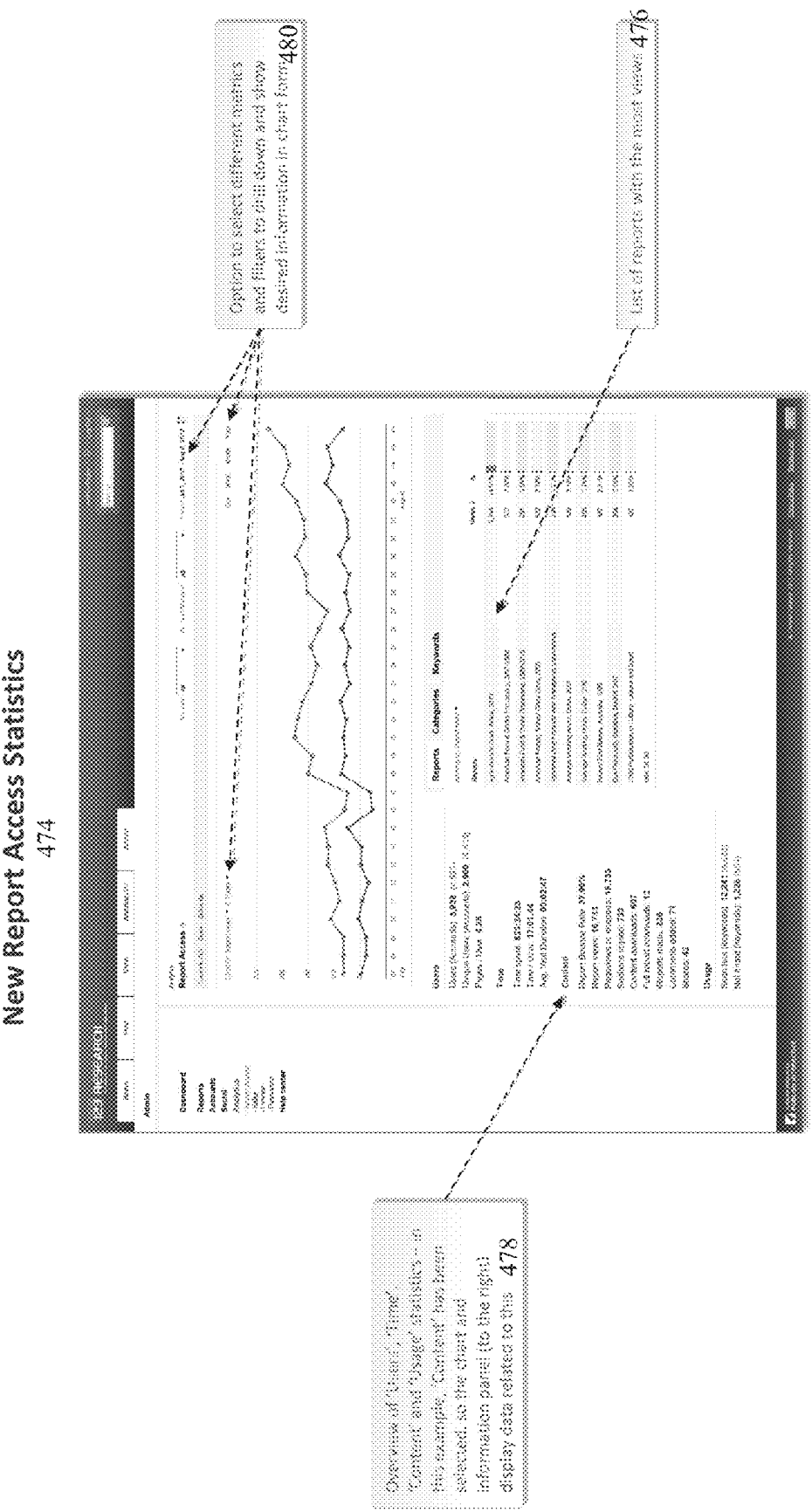

As shown in FIG. 37, an enhanced access statistic screen 474 may display a list of reports with the most views at 476, with an overview of various parameters such as unique users accessing the site, the time spent by the users, and various usage statistics such as the particular content viewed, bounce rate, selections copied and/or downloaded, etc., at 478. These parameters/metrics may be viewed in chart form at 480.

Figure 38:
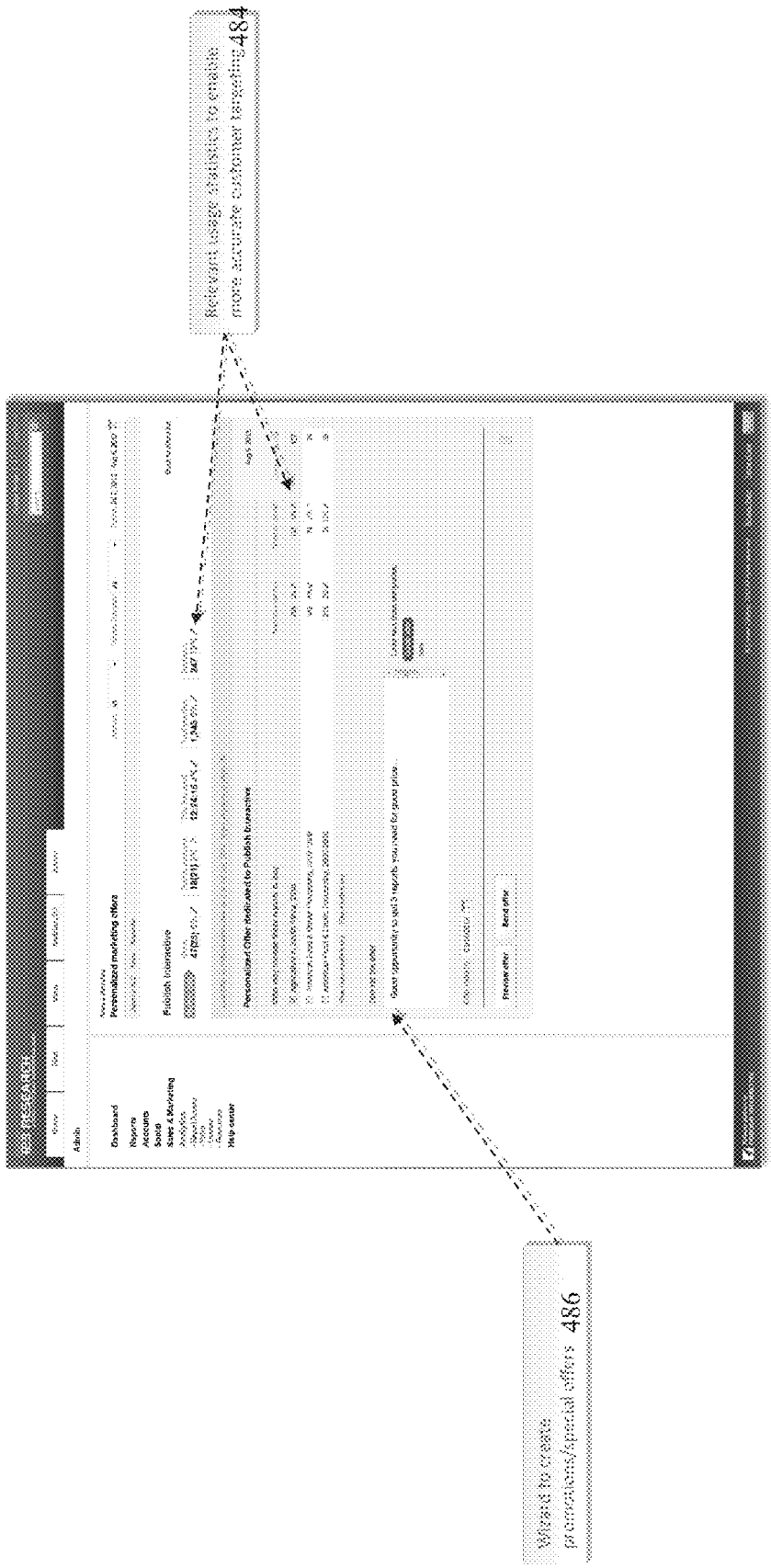
Figure 39:
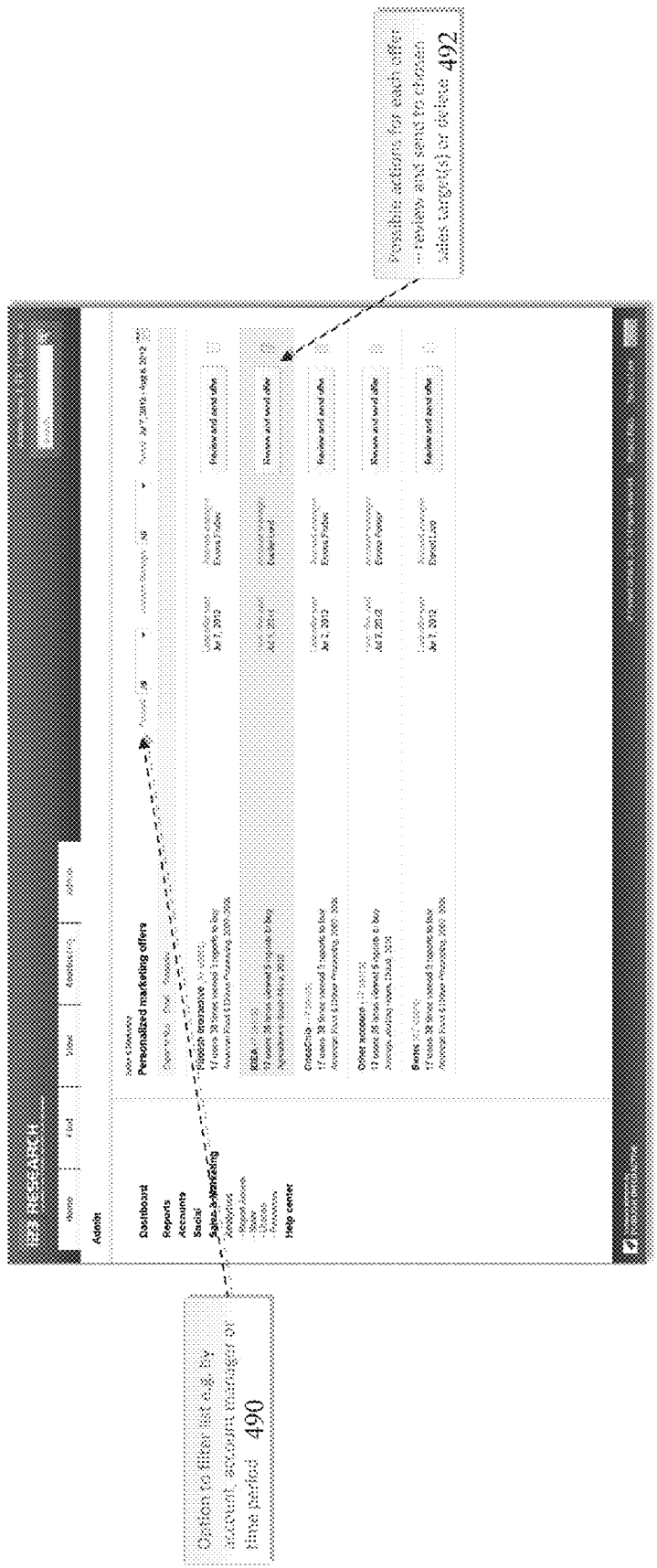
Figure 40:
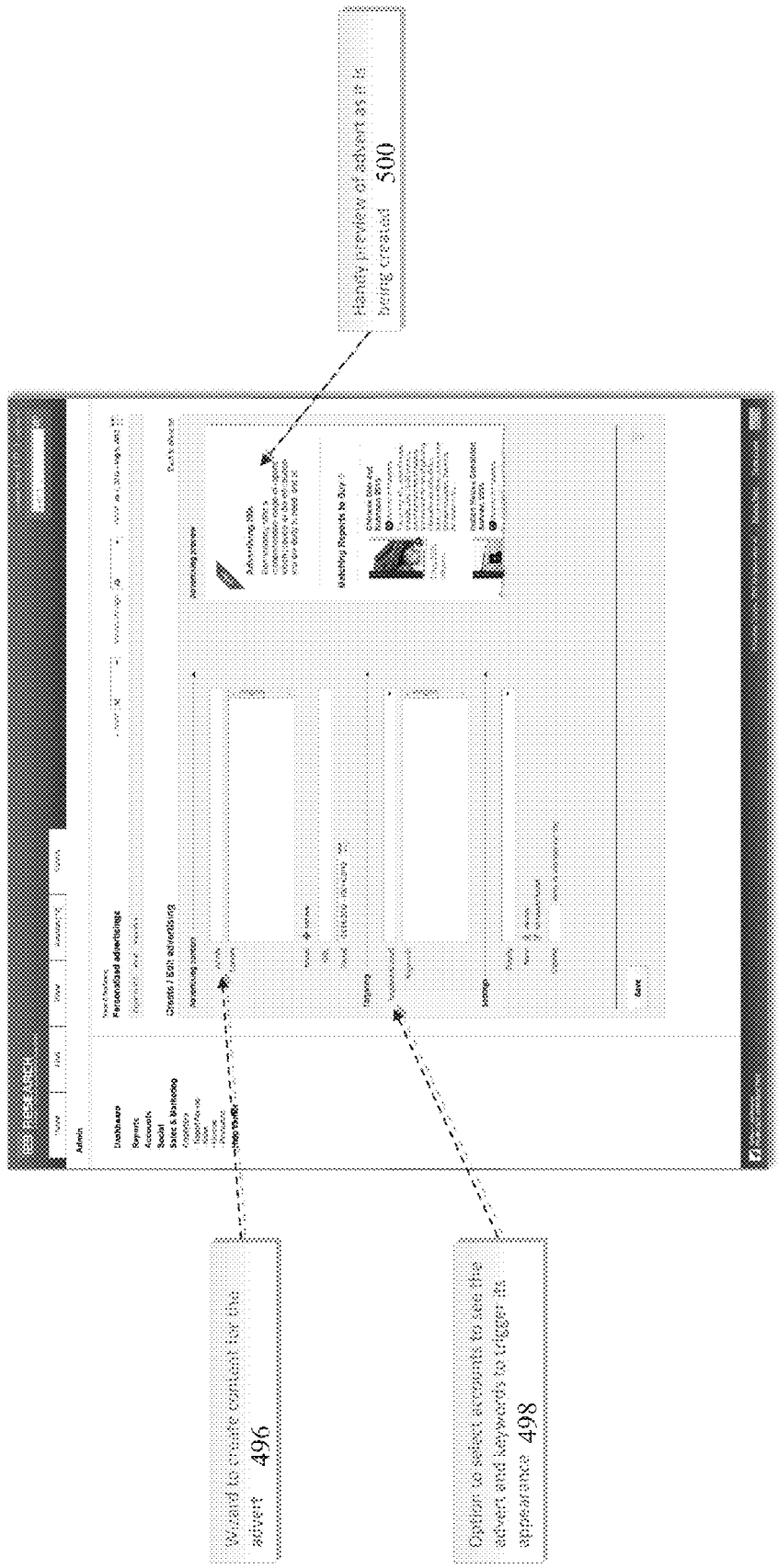
Figure 41:
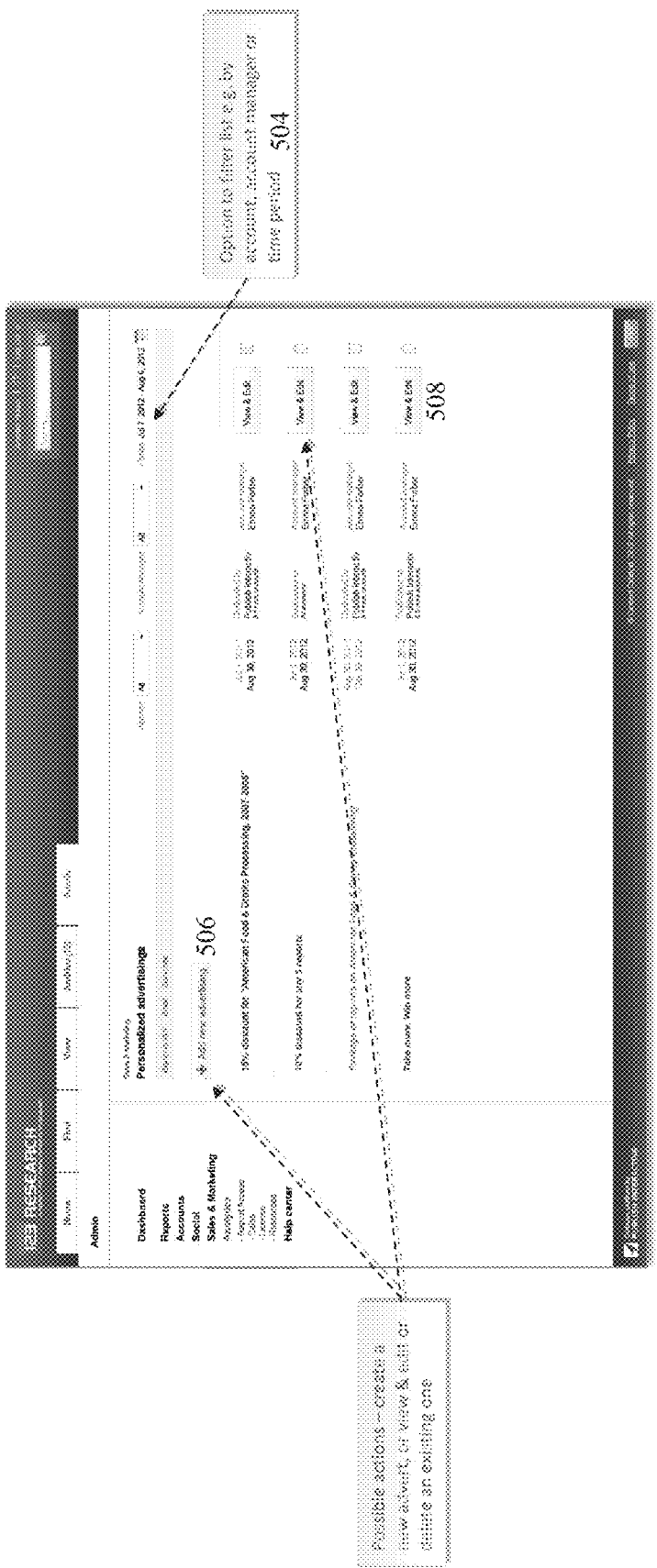

Examples of screens generated by a targeting module for enabling users to efficiently generate the above-described marketing/advertising materials associated with report content are shown in FIGS. 38-41. Turning to FIG. 38, a personalized marketing offer creation screen 482 presents the aforementioned usage statistics/metrics at 484, e.g., the number of users accessing a report, time spent accessing the report, etc. At 486, a wizard is provided, with various user-selectable templates of text for the offer. Turning to FIG. 39, a list view screen 488 displays a list of various personalized offers created by the user, with tools such as filter tab 490 to enable a user to filter the list by account, account manager, or time period, etc. An action tab 492 enables users to review and send the offer to a particular sales target(s), or delete. Turning to FIG. 40, a personalized advertisement creation screen 494 includes a content wizard 496 to enable a user to create content, and a targeting tab 498 with which a user may select from among various customers, and to select from among various keywords to trigger the advertisement's appearance to the targeted customer. A preview window 500 enables the user to preview the advertisement as it is being created. Turning to FIG. 41, a list view screen 502 displays a list of the various advertisements created by the user(s). As shown, a filter tab 504 enables the list to be filtered by various parameters such as by account, account manager, or time period. Action tabs include an Add New Advertising tab 506 and a View/Edit/Delete tab 508.

The screens shown and described with respect to FIGS. 23-41 provide examples of how various embodiments of the present invention may capture and manage user access content and use it in combination with content generated by the report generation system. These embodiments pull out a great deal of very granular data about the usage of content and the opinions of their end users. It helps the users to manage their business. It also helps give them a much better idea of where the sales are coming from, where their costs are, where their value is.

Figure 7A:
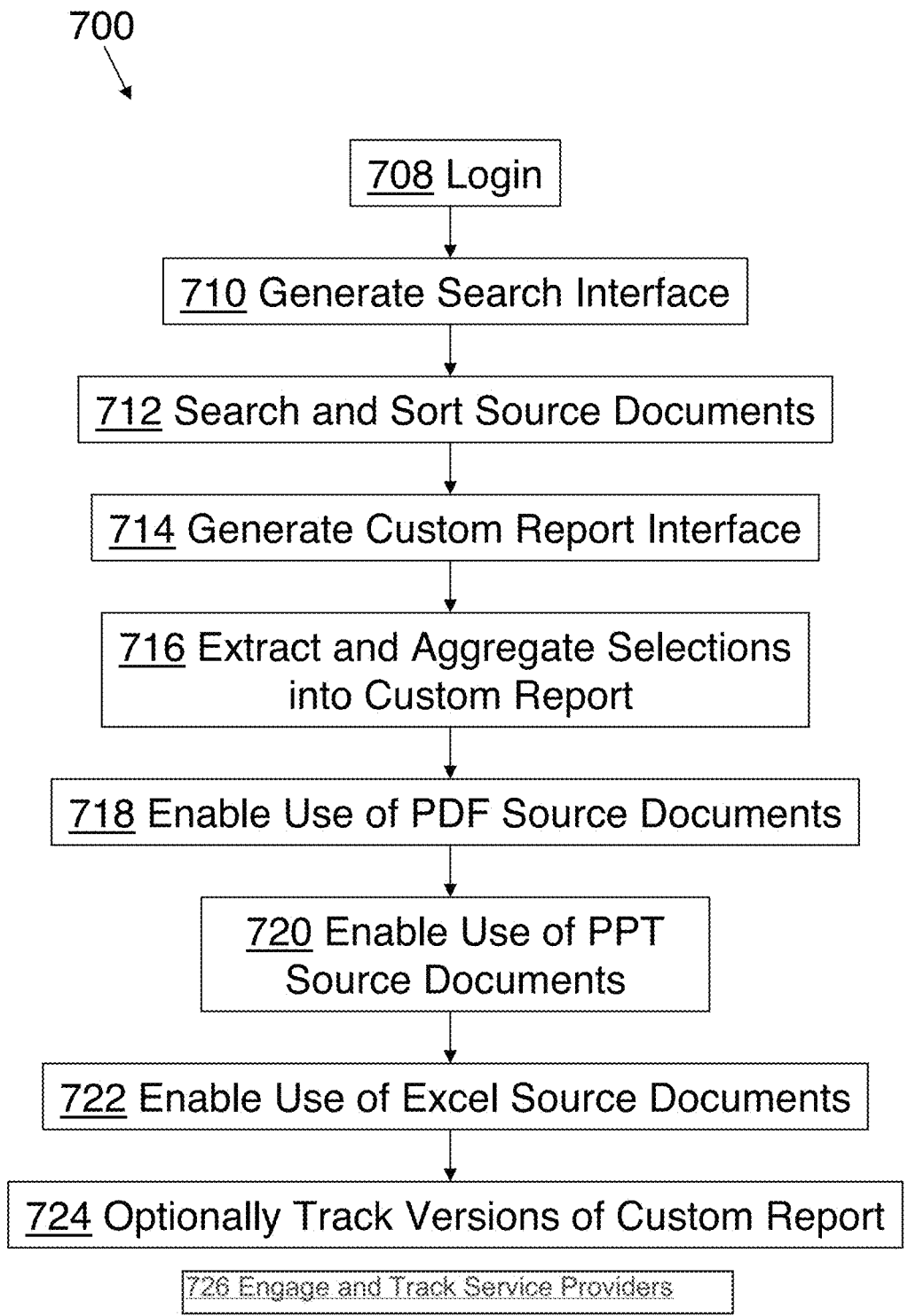
FIG. 7A is a flow chart of one embodiment of a method of present invention.

A method for automated document research, aggregation, and compilation, in a client-server environment, using a network-based transaction facility, such as the report generation facility 10, will now be described as illustrated by the flow chart of FIGS. 7A, 7B and 7C. As shown in FIG. 7A, the method 700 commences with communicating 708 user interface information to a user of the transaction facility at client 32 (FIG. 1). More specifically, the user interface information may provide a login interface via login module 102, described above with reference to FIG. 6.

Subsequent to the login by the user, at 710 the user is provided with a search interface, such as shown and described with respect to FIG. 8. At 712, in response to instructions received via the search interface, the facility 10 searches and sorts selections of interest within a plurality of source documents. At 714, the facility generates a custom report interface displayable to the client. At 716, in response to user selection instructions received via the custom report interface, the facility extracts and aggregates the selections of interest into a customized report. As may be required in response to the user selection instructions, at 718, the facility optionally enables documents in the PDF format to be searched, sorted, extracted and aggregated into the customized report. At 720 and 722, the facility provides similar optional functionality for documents in the PPT and XLS formats, respectively. At 724, the facility 10 optionally tracks and outputs various versions of the custom report.

Moreover, at substantially any point within method 700, a user may use interface 254, such as by clicking on a "Help" or question mark "?" icon to actuate Tracking Handler 118 (FIG. 6), including User Interface 254 (FIG. 20), to engage and track the assistance of a suitable service provider, as discussed hereinabove.

Figure 7B:
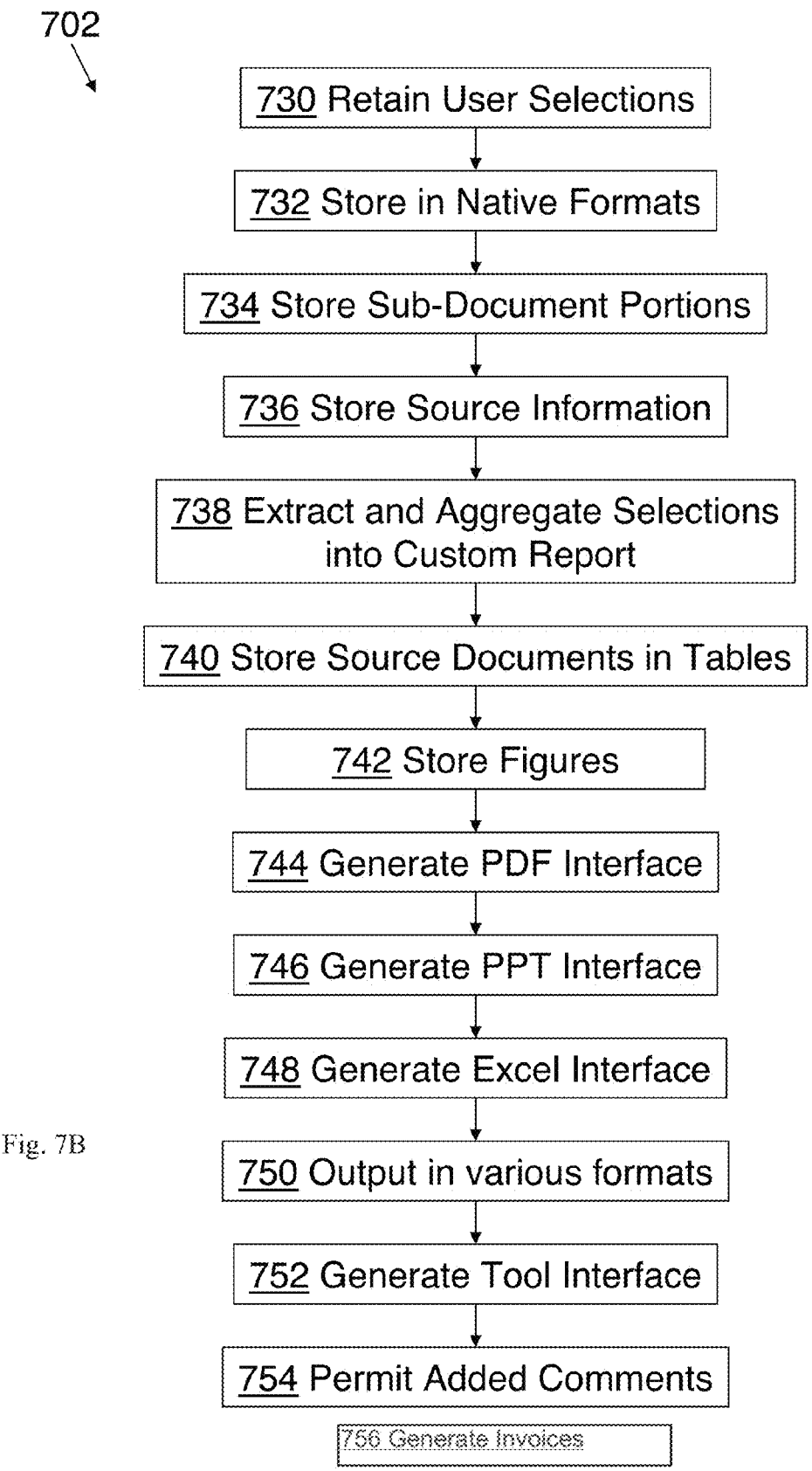
FIG. 7B is a flow chart of optional aspects of the embodiment of FIG. 7A.

Turning now to FIG. 7B, various optional steps shown as method 702 include retaining 730 the user selection instructions in order to regenerate the desired version of the custom report. At 732, the facility stores and indexes a plurality of source documents in a plurality of native formats including text (e.g., DOC or XML), PDF, PPT, and XLS. (It is noted that this step 732 may be effected independently of any particular user selection instructions, and typically occurs prior thereto, for an entire library of source documents.) At 734, the facility stores each of the plurality of source documents in a plurality of sub-document portions. At 736, source information is stored for each of the plurality of sub-document portions. At 738, the stored source information may include the author, publisher, publication date, copyright notice, and terms of use of the sub-document portions. At 740, the facility stores the plurality of source documents in one or more tables populated with the sub-document portions, source information, and with coordinate information for location of the sub-document portions within its source document. Figures are stored as sub-document portions of the source document at 742. At 744, 746 and 748, the facility respectively generates PDF, PPT, and XLS interfaces, for capturing user selection instructions associated with searching and sorting source document selections of interest in these formats. At 750, the facility outputs the custom report in any of a plurality of formats, such as XML, DOC, PDF, PPT, XLS, and substantially any other desired format. In this regard, the various embodiments of the invention are not limited to the particular formats shown and described herein, but rather, the embodiments shown and described herein may be used with substantially any file formats without departing from the scope of the invention. The facility generates, at 752, a tool interface displayable to the client for capturing user comments and/or messages (e.g., via interface 254, FIG. 20) to be linked to individual sub-document portions. At 754, the tool interface permits a plurality of users to add comments to the custom report. At 756, the system may automatically generate an itemized invoice, e.g., using the various data tracked by Tracking Handler 118, for services and/or access provided by the various service providers.

Figure 7C:
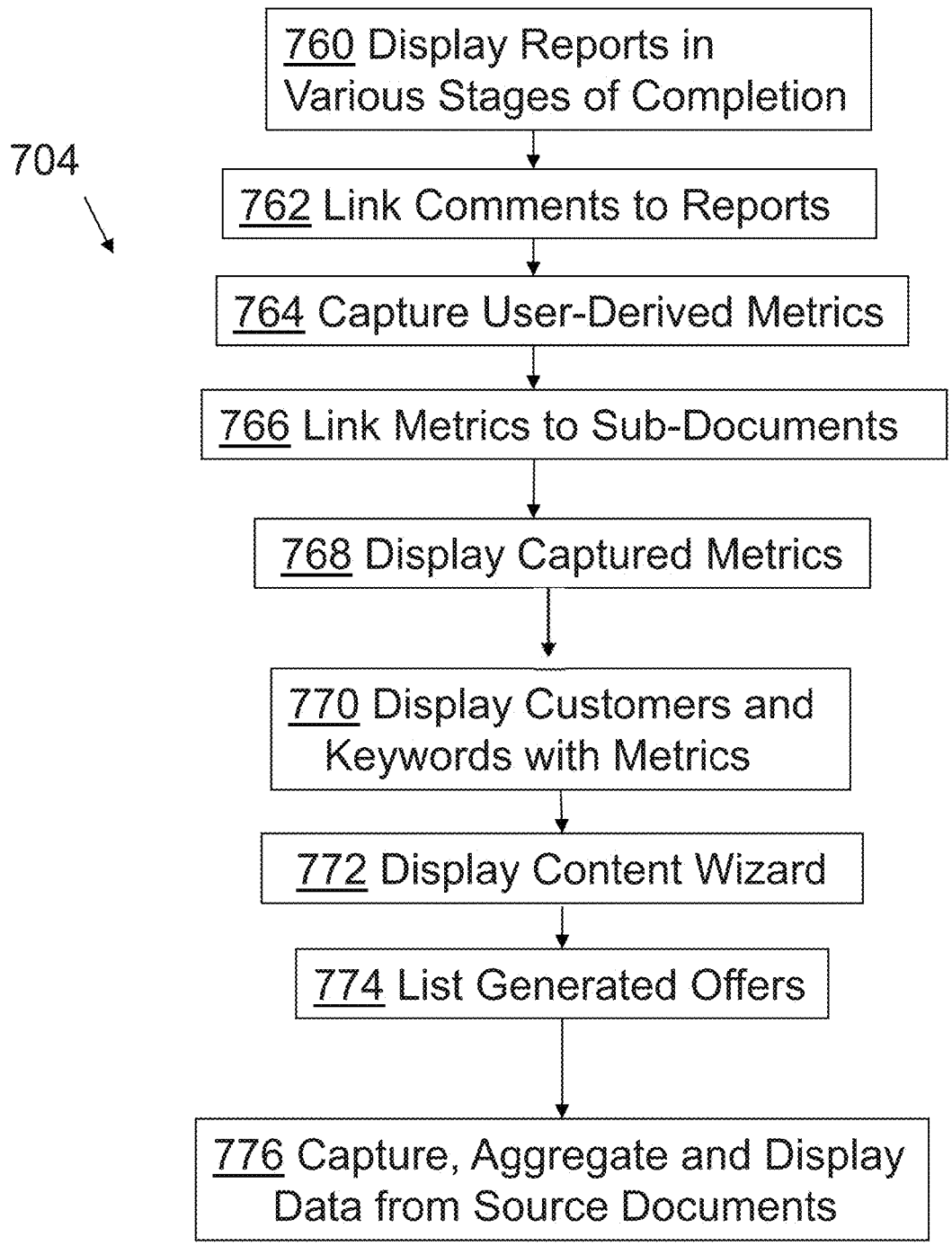
FIG. 7C is a flow chart of another embodiment of a method of present invention.

Turning now to FIG. 7C, various steps associated with the embodiments shown and described with reference to FIGS. 23-41, are shown in method 704. At 760, CMS Module 120 is used to display the list of customized reports in various stages of completion ranging from report ideas to drafts to versions of completed reports. At 762, user comments are linked to any of the customized reports on the list, so that users are permitted to provide feedback on the customized reports at any of the various stages of completion. Various optional steps are shown in steps 764-776. At 764, user analytics module 122 is used to capture user-derived metrics including: (i) how often each sub-document portion of a report is accessed by users; (ii) the amount of time users spent looking at each of the sub-document portions of a report; and (iii) ratings applied to the customized reports and/or the sub-document portions of a report. The captured user-derived metrics are stored 766 with links to the sub-document portions. At 768, the captured user-derived metrics are displayed in the CMS interface.

At 770, the captured user-derived metrics are displayed along with a targeting tab configured to permit a user to select from among various customers and to select from among a list of keywords. At 772, a content wizard is displayed, which has various user-selectable offer templates targeted to users of particular reports based on the captured user-derived metrics and keywords. At 774, a list of offers created by the targeting module is displayed and filterable by account, account manager, and/or time period. At 776, using data viewer module 124, capture, aggregate, and display data from source documents in the presentation and spreadsheet formats. In summary, it will be appreciated that the above described interfaces, and underlying technologies, provide a convenient vehicle for document research, aggregation, and compilation, in a real-time, multi-user collaborative environment using a seamlessly integrated transaction facility. Moreover, in particular embodiments, the publisher's authors and sales team may maintain profiles with photo and description of skills etc, and a fee rate. The customers (users) may then initiate a dialogue by looking up specialists on a directory of the publisher's authors/service providers. Each time the publisher's staff enters a response via the system, they enter how much time or fees are due for that response. This enables micro-consulting projects, e.g. the experts may bill for their time on 6 minute increments, hourly increments, or on a flat fee basis. The sales team or service providers may also repackage content from sections of content to which the particular user may not subscribe, and provide access to these for use in the custom report. The service provider may enter the agreed-upon fee/price into the system when they help create the document.

Figure 16:
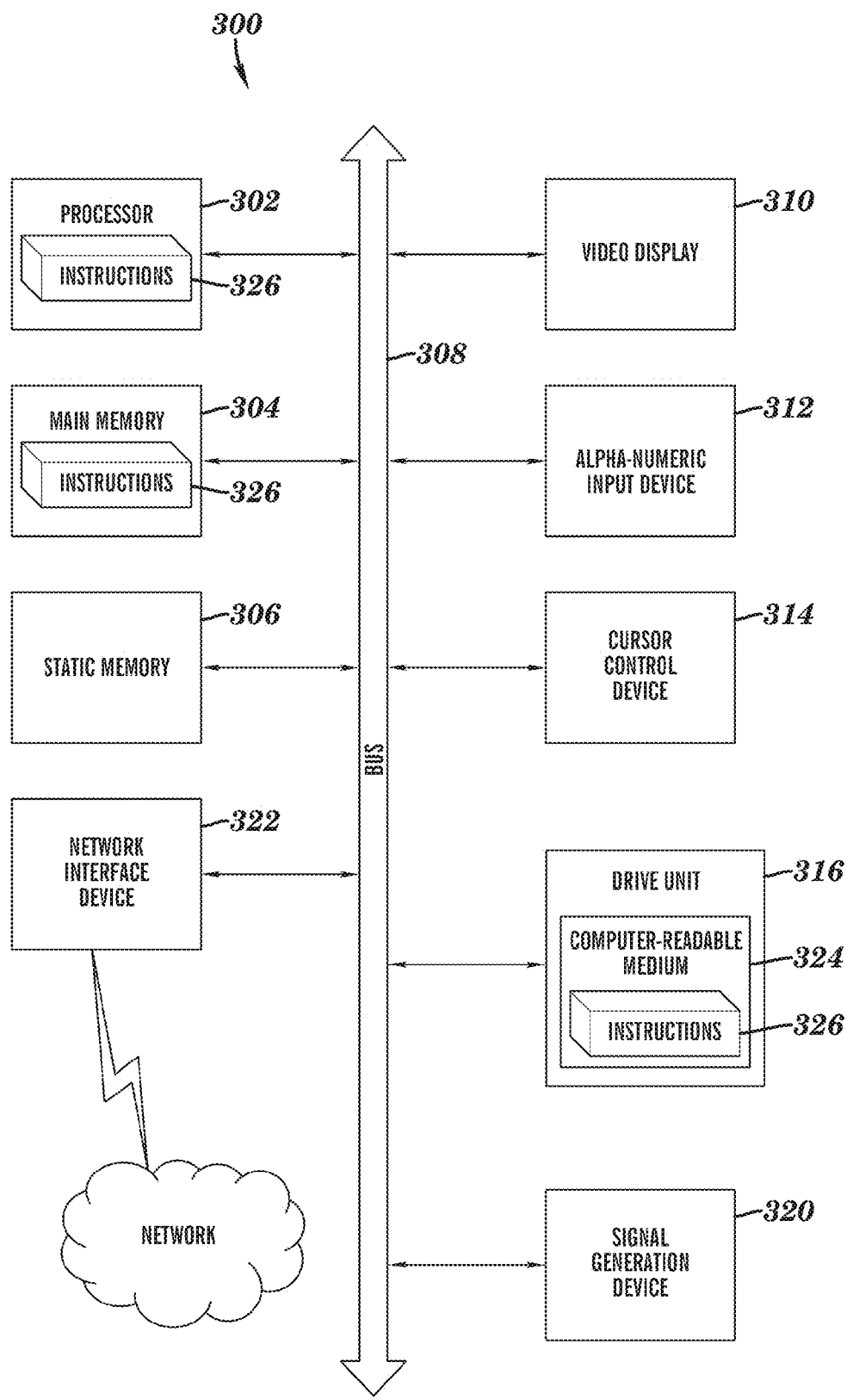
FIG. 16 is a block diagram of an exemplary embodiment of a computer system usable in connection with the foregoing embodiments.

FIG. 16 shows a diagrammatic representation of a machine in the exemplary form of a computer system 300 within which a set of instructions, for causing the machine to perform any one of the methodologies discussed above, may be executed. In alternative embodiments, the machine may include a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.,) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Thus, a method and apparatus for generating custom reports in a network-based transaction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

In particular, it should be recognized that any of the foregoing embodiments shown and described herein may be used to automatically track, e.g., for invoicing purposes, any number of customized services and/or access to content, etc. These modified, alternate embodiments enable publishers to overcome traditional inefficiencies in providing specific advice that relates to their publications and/or areas of expertise on a relatively small scale, ad-hoc basis.

These alternate embodiments thus include an online publishing system that facilitates the sale of an author/expert's time and supporting information to answer specific reader queries relating to documents in the system. These embodiments are configured to restructure documents and store as sections within a database, so that such sections are easily referenced, provide communication between author/expert and the reader inline with the document view, track reader requests and author/expert time in order to enable the reader to pay for the precise time and information products that are provided, and provide user and content management functions that enable the author to grant the reader access to previously restricted (or new) documents/content.

Furthermore, embodiments of the present invention include a computer program code-based product, which includes a computer readable storage medium having program code stored therein which can be used to instruct a computer to perform any of the functions, methods and/or modules associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage devices.

It should be noted that the various modules and other components of the embodiments discussed hereinabove may be configured as hardware, as computer readable code stored in any suitable computer usable medium, such as ROM, RAM, flash memory, phase-change memory, magnetic disks, etc., and/or as combinations thereof, without departing from the scope of the present invention.

It should be further understood that any of the features described with respect to one of the embodiments described herein may be similarly applied to any of the other embodiments described herein without departing from the scope of the present invention.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

The above systems are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic or non-volatile, and may be retrieved by the user in any of: conventional computer storage, display (e.g., CRT, flat panel LCD, plasma, etc.) and/or hardcopy (i.e., printed) formats. The programming of the present invention may be implemented by one skilled in the art of computer systems and/or software design.

Having thus described the invention, what is claimed is:

1. A computer implemented system in a client-server environment, for document research, aggregation, and compilation, the system comprising:
    a server computer including:
        a search module configured to generate a search interface displayable to a client communicably coupled to the server, and responsive to instructions received via the search interface, to search and sort selections of interest within a plurality of source documents;
        a customized report module configured to generate a custom report interface displayable to the client, and responsive to user selection instructions received via the custom report interface, to extract and aggregate the selections of interest into a customized report configured to simultaneously display a plurality of the selections of interest;
        a portable document module configured to enable source documents in the portable document format to be searched, sorted, and aggregated by the search module and customized report module;
        a presentation module configured to enable source documents in the presentation format to be searched, sorted, and aggregated by the search module and customized report module;
        a spread sheet module configured to enable source documents in the spread sheet format to be searched, sorted, and aggregated by the search module and customized report module;
        a version control module in operative engagement with the customized report module, the version control module configured to retain the user selection instructions and location information for the selections of interest within the plurality of source documents;
        a source document module which is separate from a customized report, configured to store and index a plurality of source documents in a plurality of native formats including text, portable document, presentation, and spread sheet, wherein the results of said storing and indexing are in said plurality of native formats;
        the source document module being configured to store each of the plurality of source documents in a plurality of sub-document portions populated to one or more tables; and
        a tool module configured to generate a tool interface displayable to the client, and responsive to instructions received from the client, link user comments to any of the sub-document portions;
        wherein the customized report module is configured to extract and aggregate the sub-document portions of the selections of interest, along with any of said linked user comments, into the customized report while maintaining the original native formats of the selections of interest;
        a content management system (CMS) module in operative engagement with the customized report module, the tool module, and the version control module, the CMS module configured to generate a CMS interface displayable to the client, and responsive to user instructions received via the CMS interface, to display a list of customized reports in various stages of completion ranging from report ideas to drafts to versions of completed reports; and
        the CMS module being responsive to instructions received from the client, to use the tool module to link user comments to any of the customized reports in the various stages of completion, wherein users are permitted to provide feedback on the customized reports at any of the various stages of completion.

2. The system of claim 1, wherein the CMS module is configured to permit users to edit the customized reports by exporting portions of the customized reports from the server to the client for editing, and locking the exported portions at the server until re-imported by the server once editing at the client has been completed.

3. The system of claim 1, wherein the CMS module further comprises a user analytics module configured to capture user-derived metrics including: (i) how often each sub-document portion of a report is accessed by users; (ii) the amount of time users spent looking at each of the sub-document portions of a report; and (iii) ratings applied to the customized reports and/or the sub-document portions of a report;
    the CMS module configured to store the captured user-derived metrics in the one or more tables with links to the sub-document portions; and
    the CMS module configured to display the captured user-derived metrics in the CMS interface.

4. The system of claim 3, further comprising:
    a targeting module in operative engagement with the CMS module;
    the targeting module configured to generate a targeting interface displayable to the client, and responsive to user instructions received via the targeting interface, to display the captured user-derived metrics along with a targeting tab configured to permit a user to select from among various customers and to select from among a list of keywords;
    the targeting module configured to display a content wizard having various user-selectable offer templates targeted to users of particular reports based on the captured user-derived metrics and keywords; and
    the targeting module further configured to display a list of offers created by the targeting module, and to display tools responsive to user instructions received via the targeting interface, to filter the list by account, account manager, and/or time period.

5. The system of claim 1, further comprising a data module in operative engagement with the presentation module and the spreadsheet module, the data module configured to generate a data viewer interface displayable to the client, and responsive to user instructions received via the data viewer interface, to: (i) capture data from the source documents in the presentation format; (ii) capture data from the source documents in the spread sheet format; (ii) aggregate the captured data; and (iv) display the captured data in the data viewer interface.

6. The system of claim 1, wherein the service tracking module is configured to enable communications between a service provider and the client inline with the customized report using the customized report module.

7. The system of claim 6, wherein the service tracking module is configured to at least one of link and selectively display said communications with one or more individual portions of the customized report.

8. The system of claim 7 configured to enable the service provider to grant selective access to other source documents including access-restricted source documents, wherein the service tracking module is configured to track said selective access.

9. The system of claim 7, wherein the service tracking module is configured to perform at least one of:

identify any of said communications from the client authorizing the service provider to proceed with a particular service; and track any of said communications from the client authorizing the service provider to proceed with a particular service.

10. The system of claim 9, wherein the search, customized report, portable document, presentation, and spread sheet modules are all disposed on computer readable media.

11. The system of claim 1, wherein the customized report module is configured to extract and aggregate selections of interest disposed in one or more text formats.

12. The system of claim 1, wherein the version control module is configured to track the version of the custom report generated by the customized report module, and, responsive to instructions received from the client, output a desired version of the custom report to the client.

13. The system of claim 1, wherein the source document module is configured to store source information for each of the plurality of sub-document portions.

14. The system of claim 13, wherein the source information is selected from the group consisting of author, publisher, publication date, copyright notice, and terms of use.

15. The system of claim 13, wherein the source document module is configured to store the plurality of source documents in one or more tables populated with the sub-document portions, source information, and with coordinate information for location of the sub-document portions within its source document.

16. The system of claim 15, comprising a figure handler configured to generate a figure interface displayable to the client, and responsive to instructions received via the figure interface to search and sort selections of interest in the form of figures within the plurality of source documents.

17. The system of claim 15, comprising a portable document handler configured to generate a portable document interface displayable to the client, and responsive to instructions received via the portable document interface to search and sort selections of interest in the portable document format within the plurality of source documents.

18. The system of claim 15, comprising a presentation handler configured to generate a presentation interface displayable to the client, and responsive to instructions received via the presentation interface to search and sort selections of interest in the presentation format within the plurality of source documents.

19. The system of claim 15, comprising an spread sheet handler configured to generate an spread sheet interface displayable to the client, and responsive to instructions received via the spread sheet interface to search and sort selections of interest in the spread sheet format within the plurality of source documents.

20. The system of claim 15, comprising a translation handler configured to generate a translation interface displayable to the client, and responsive to instructions received via the translation interface to provide language translation for selections of interest within the plurality of source documents.

21. The system of claim 15, wherein the customized report module is configured to output the custom report in any of a plurality of formats.

22. The system of claim 21, wherein the plurality of formats is selected from the group consisting of XML, text, portable document, presentation, spread sheet, and combinations thereof.

23. The system of claim 1, wherein the tool module is configured to permit the custom report to be displayed to, and comments to be added by, a plurality of clients.

24. The system of claim 1, further comprising a service tracking module, configured to automatically track client requests and service provider activity to facilitate billing for services rendered.

25. A method for automated document research, aggregation, and compilation, in a client-server environment, the method comprising:
  (a) generating, with a server computer, a search interface displayable to a client communicably coupled to the server;
  (b) searching and sorting, with the server computer in response to instructions received via the search interface, selections of interest within a plurality of source documents;
  (c) generating, with the server computer, a custom report interface displayable to the client;
  (d) extracting and aggregating, with the server computer in response to user selection instructions received via the custom report interface, the selections of interest into a customized report configured to simultaneously display a plurality of the selections of interest;
  (e) enabling, with the server computer in response to user selection instructions, documents in portable document format to be searched, sorted, extracted and aggregated into the customized report;
  (f) enabling, with the server computer in response to user selection instructions, documents in presentation format to be searched, sorted, extracted and aggregated into the customized report;
  (g) enabling, with the server computer in response to user selection instructions, documents in spread sheet format to be searched, sorted, extracted and aggregated into the customized report;
  (h) retaining, with the server computer, the user selection instructions and location information for the selections of interest within the plurality of source documents;
  (i) storing and indexing, with the server computer, the plurality of source documents in a plurality of native formats including XML, text, portable document, presentation, and spreadsheet, wherein the results of said storing and indexing are in said plurality of native formats, and storing each of the plurality of source documents in a plurality of sub-document portions populated to one or more tables; and
  (j) generating, with the server computer, a tool interface displayable to the client for capturing at least one of user comments and messages to be linked to individual sub-document portions;
  (k) wherein said extracting and aggregating (d) includes extracting and aggregating the sub-document portions of the selections of interest, along with any of the linked user comments and messages, into the customized report while maintaining the original native formats of the selections of interest;
  (l) generating, with the server computer, a content management system (CMS) interface displayable to the client, and responsive to user instructions received via the CMS interface, displaying a list of customized reports in various stages of completion ranging from report ideas to drafts to versions of completed reports; and
  (m) linking, with the server computer, in response to instructions received from the client via the CMS interface, user comments to any of the customized reports in the various stages of completion, wherein users are permitted to provide feedback on the customized reports at any of the various stages of completion.

26. The method of claim 25, wherein said generating (1) further comprises permitting users to edit the customized reports by exporting portions of the customized reports from the server to the client for editing, and locking the exported portions at the server until re-imported by the server once editing at the client has been completed.

27. The method of claim 25, wherein said generating (1) further comprises:
capturing user-derived metrics including: (i) how often each sub-document portion of a report is accessed by users; (ii) the amount of time users spent looking at each of the sub-document portions of a report; and (iii) ratings applied to the customized reports and/or the sub-document portions of a report;
storing the captured user-derived metrics in the one or more tables with links to the sub-document portions; and
displaying the captured user-derived metrics in the CMS interface.

28. The method of claim 27, wherein said generating (1) further comprises:
generating a targeting interface displayable to the client, and responsive to user instructions received via the targeting interface, displaying the captured user-derived metrics along with a targeting tab configured to permit a user to select from among various customers and to select from among a list of keywords;
displaying a content wizard having various user-selectable offer templates targeted to users of particular reports based on the captured user-derived metrics and keywords; and
displaying a list of offers created by the targeting module, and displaying tools responsive to user instructions received via the targeting interface, to filter the list by account, account manager, and/or time period.

29. The method of claim 25, further comprising generating, with the server computer, a data viewer interface displayable to the client, and responsive to user instructions received via the data viewer interface: (i) capturing data from the source documents in the presentation format; (ii) capturing data from the source documents in the spread sheet format; (ii) aggregating the captured data; and (iv) displaying the captured data in the data viewer interface.

30. The method of claim 24, wherein said automatically tracking (i) further comprises enabling communications between a service provider and the client inline with the customized report.

31. The method of claim 30, wherein said automatically tracking (i) further comprises at least one of linking and selectively displaying the communications with one or more individual portions of the customized report.

32. The method of claim 31, wherein said automatically tracking (i) further comprises enabling and tracking selective user access to other source documents including access-restricted source documents.

33. The method of claim 31, wherein said automatically tracking (i) further comprises at least one of: identifying any of said communications from the client authorizing the service provider to proceed with a particular service; and tracking any of the communications from the client authorizing the service provider to proceed with a particular service.

34. The method of claim 33, wherein said retaining (h) comprises tracking, with the server computer, versions of the custom report, and outputting, in response to instructions received from the client, a desired version of the custom report.

35. The method of claim 25, wherein said extracting and aggregating (d) comprises extracting and aggregating selections of interest disposed in one or more text formats.

36. The method of claim 25, comprising translating, with the server computer, in response to instructions received from the client, a plurality of the sub-document portions.

37. The method of claim 25, comprising storing, with the server computer, source information for each of the plurality of sub-document portions.

38. The method of claim 37, comprising storing, with the server computer, source information selected from the group consisting of author, publisher, publication date, copyright notice, and terms of use.

39. The method of claim 37, comprising storing, with the server computer, the plurality of source documents in one or more tables populated with the sub-document portions, source information, and with coordinate information for location of the sub-document portions within its source document.

40. The method of claim 39, wherein said storing comprises storing figures as sub-document portions of the source document.

41. The method of claim 39, comprising generating, with the server computer, a portable document interface displayable to the client for capturing user selection instructions associated with searching and sorting selections of interest in the portable document format within the plurality of source documents.

42. The method of claim 39, comprising generating, with the server computer, a presentation interface displayable to the client for capturing user selection instructions associated with searching and sorting selections of interest in the presentation format within the plurality of source documents.

43. The method of claim 39, comprising generating, with the server computer, a spread sheet interface displayable to the client for capturing user selection instructions associated with searching and sorting selections of interest in the spread sheet format within the plurality of source documents.

44. The method of claim 39, comprising generating, with the server computer, a translation interface displayable to the client for capturing user selection instructions associated with language translation of selections of interest within the plurality of source documents.

45. The method of claim 39, comprising outputting, with the server computer, the custom report in any of a plurality of formats.

46. The method of claim 45, comprising outputting, with the server computer, the custom report in a plurality of formats selected from the group consisting of XML, text, portable document, presentation, spread sheet, and combinations thereof.

47. The method of claim 25, comprising permitting, with the server computer via the tool interface, a plurality of users to add at least one of comments and messages to the custom report.

48. The method of claim 25, further comprising automatically tracking, with the server computer, client requests and service provider activity to facilitate billing for services rendered.

49. An article of manufacture for automated document research, aggregation, and compilation, in a client-server environment, said article of manufacture comprising:

a non-transitory computer usable medium having a computer readable program code embodied therein, said computer usable medium having computer readable program code for:
  generating, with a server computer, a search interface displayable to a client communicably coupled to the server;
  searching and sorting, with the server computer in response to instructions received via the search interface, selections of interest within a plurality of source documents;
  generating, with the server computer, a custom report interface displayable to the client;
  extracting and aggregating, with the server computer in response to user selection instructions received via the custom report interface, the selections of interest into a customized report configured to simultaneously display a plurality of the selections of interest;
  enabling, with the server computer in response to user selection instructions, documents in portable document format to be searched, sorted, extracted and aggregated into the customized report;
  enabling, with the server computer in response to user selection instructions, documents in presentation format to be searched, sorted, extracted and aggregated into the customized report;
  enabling, with the server computer in response to user selection instructions, documents in spread sheet format to be searched, sorted, extracted and aggregated into the customized report;
  retaining, with the server computer, the user selection instructions and location information for the selections of interest within the plurality of source documents; and
  storing and indexing, with the server computer, the plurality of source documents in a plurality of native formats including XML, text, portable document, presentation, and spreadsheet, wherein the results of said storing and indexing are in said plurality of native formats, and storing each of the plurality of source documents in a plurality of sub-document portions populated to one or more tables;
  generating, with the server computer, a tool interface displayable to the client for capturing at least one of user comments and messages to be linked to individual sub-document portions;
  wherein said extracting and aggregating includes extracting and aggregating the sub-document portions of the selections of interest, along with any of the linked user comments and messages, into the customized report while maintaining the original native formats of the selections of interest;
  generating, with the server computer, a content management system (CMS) interface displayable to the client, and responsive to user instructions received via the CMS interface, displaying a list of customized reports in various stages of completion ranging from report ideas to drafts to versions of completed reports; and
  linking, with the server computer, in response to instructions received from the client via the CMS interface, user comments to any of the customized reports in the various stages of completion, wherein users are permitted to provide feedback on the customized reports at any of the various stages of completion.

50. The article of manufacture of claim 49, further comprising computer readable code for permitting users to edit the customized reports by exporting portions of the customized reports from the server to the client for editing, and locking the exported portions at the server until re-imported by the server once editing at the client has been completed.

51. The article of manufacture of claim 49, further comprising computer readable program code for:
  capturing user-derived metrics including: (i) how often each sub-document portion of a report is accessed by users; (ii) the amount of time users spent looking at each of the sub-document portions of a report; and (iii) ratings applied to the customized reports and/or the sub-document portions of a report;
  storing the captured user-derived metrics in the one or more tables with links to the sub-document portions; and
  displaying the captured user-derived metrics in the CMS interface.

52. The article of manufacture of claim 51, further comprising computer readable program code for:
  generating a targeting interface displayable to the client, and responsive to user instructions received via the targeting interface, displaying the captured user-derived metrics along with a targeting tab configured to permit a user to select from among various customers and to select from among a list of keywords;
  displaying a content wizard having various user-selectable offer templates targeted to users of particular reports based on the captured user-derived metrics and keywords; and
  displaying a list of offers created by the targeting module, and displaying tools responsive to user instructions received via the targeting interface, to filter the list by account, account manager, and/or time period.

53. The article of manufacture of claim 49, further comprising computer readable program code for generating, with the server computer, a data viewer interface displayable to the client, and responsive to user instructions received via the data viewer interface: (i) capturing data from the source documents in the presentation format; (ii) capturing data from the source documents in the spread sheet format; (ii) aggregating the captured data; and (iv) displaying the captured data in the data viewer interface.

54. The article of manufacture of claim 49, further comprising computer readable program code for enabling communications between a service provider and the client inline with the customized report.

55. The article of manufacture of claim 54, further comprising computer readable program code for at least one of linking and selectively displaying the communications with one or more individual portions of the customized report.

56. The article of manufacture of claim 55, further comprising computer readable program code for enabling and tracking selective user access to other source documents including access-restricted source documents.

57. The article of manufacture of claim 55, further comprising computer readable program code for at least one of:
  identifying any of said communications from the client authorizing the service provider to proceed with a particular service; and
  tracking any of the communications from the client authorizing the service provider to proceed with a particular service.

58. The article of manufacture of claim 49, further comprising computer readable program code for automatically tracking, with the server computer, client requests and service provider activity to facilitate billing for services rendered.

* * * * *